(12) United States Patent
Oh

(10) Patent No.: US 11,428,277 B2
(45) Date of Patent: Aug. 30, 2022

(54) JOINT AND CLUTCH ASSEMBLY

(71) Applicant: Dana Automotive Systems Group, LLC, Maumee, OH (US)

(72) Inventor: Seung Tark Oh, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 290 days.

(21) Appl. No.: 16/677,739

(22) Filed: Nov. 8, 2019

(65) Prior Publication Data

US 2020/0158192 A1 May 21, 2020

Related U.S. Application Data

(60) Provisional application No. 62/770,222, filed on Nov. 21, 2018.

(51) Int. Cl.
| | |
|---|---|
| *F16D 43/04* | (2006.01) |
| *F16D 13/64* | (2006.01) |
| *F16D 43/21* | (2006.01) |
| *F16D 27/11* | (2006.01) |
| *F16D 3/223* | (2011.01) |
| *F16D 27/115* | (2006.01) |
| *F16D 23/12* | (2006.01) |

(52) U.S. Cl.
CPC .............. *F16D 43/04* (2013.01); *F16D 3/223* (2013.01); *F16D 13/646* (2013.01); *F16D 27/11* (2013.01); *F16D 27/115* (2013.01); *F16D 43/21* (2013.01); *F16D 2023/123* (2013.01)

(58) Field of Classification Search
CPC ................ F16D 3/16–48; F16D 13/04; F16D 13/60–66; F16D 13/72; F16D 2023/123; F16D 27/08; F16D 27/10; F16D 27/108–115; F16D 47/02; F16H 57/0424

USPC ........ 192/35, 52.3, 66.21, 66.23, 84.7, 84.9, 192/84.93

See application file for complete search history.

(56) References Cited

U.S. PATENT DOCUMENTS

| | | | |
|---|---|---|---|
| 441,998 A * | 12/1890 | Williams | F16D 13/28 192/66.21 |
| 990,906 A * | 5/1911 | Saecker | F16D 13/28 192/66.21 |
| 1,157,789 A * | 10/1915 | Lanzdorf | F16D 13/64 192/52.3 |
| 4,346,616 A | 8/1982 | Geisslinger | |
| 4,817,752 A | 4/1989 | Lobo | |
| 5,803,811 A | 9/1998 | Fechter | |

(Continued)

*Primary Examiner* — Richard M Lorence
(74) *Attorney, Agent, or Firm* — Marshall & Melhorn, LLC

(57) ABSTRACT

A joint assembly and clutch assembly for use in a vehicle. The joint assembly includes a first joint member that is drivingly connected to a second joint member by using one or more third joint members. A first shaft is drivingly connected to the first joint member. The clutch assembly includes a first clutch member, a second clutch member, and an actuation assembly that is operably configures to selectively drive the second clutch member into engagement with the first clutch member of the clutch assembly. The actuation assembly utilizes an amount of rotational force that is transmitted from the first shaft in order to transition the second clutch member into engagement with the first clutch member. At least a portion of a second shaft is drivingly connected to the second clutch member.

18 Claims, 23 Drawing Sheets

(56) References Cited

U.S. PATENT DOCUMENTS

| | | | |
|---|---|---|---|
| 5,984,039 A * | 11/1999 | Mayr | F16D 3/223 |
| | | | 180/248 |
| 6,109,411 A | 8/2000 | Bigley | |
| 6,318,533 B1 | 11/2001 | Krisher | |
| 6,557,660 B2 | 5/2003 | Averill | |
| 2003/0114263 A1* | 6/2003 | Inoue | F16D 65/186 |
| | | | 475/198 |
| 2005/0077137 A1 | 4/2005 | Nozaki | |
| 2008/0210508 A1 | 9/2008 | Heisey | |
| 2010/0219036 A1* | 9/2010 | Uchida | F16D 27/115 |
| | | | 192/84.91 |
| 2010/0256259 A1* | 10/2010 | Kozutsumi | F16D 69/026 |
| | | | 523/156 |
| 2016/0116003 A1 | 4/2016 | Kirchhoffer | |
| 2017/0028845 A1* | 2/2017 | Ohkawa | F16D 3/223 |
| 2018/0209486 A1 | 7/2018 | Haupt | |

\* cited by examiner

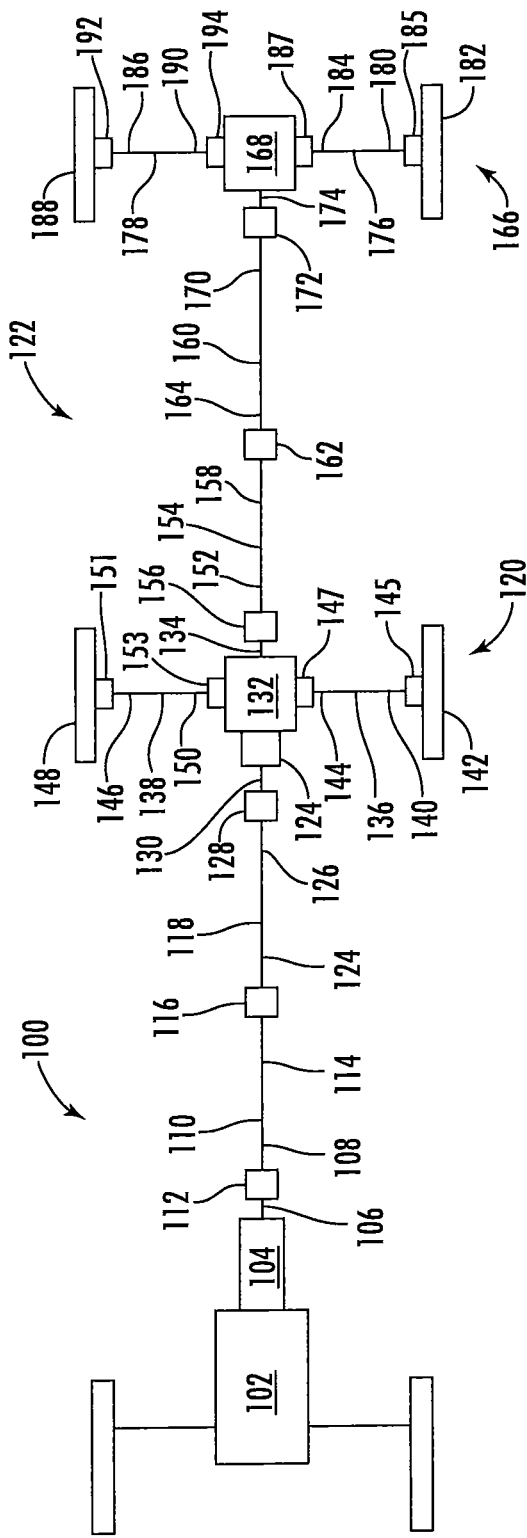
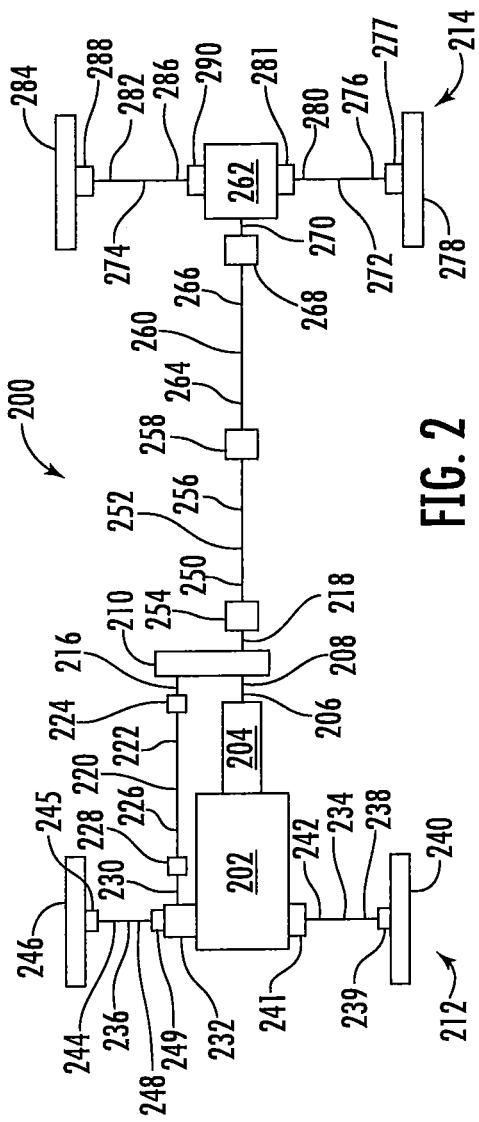
FIG. 1
FIG. 2

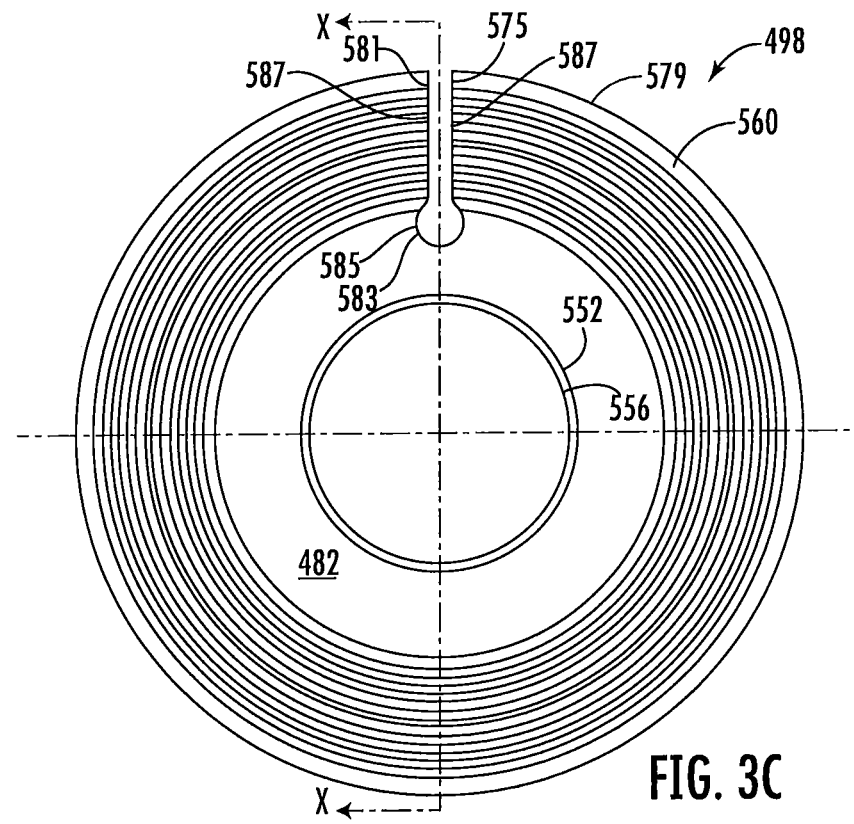
FIG. 3C
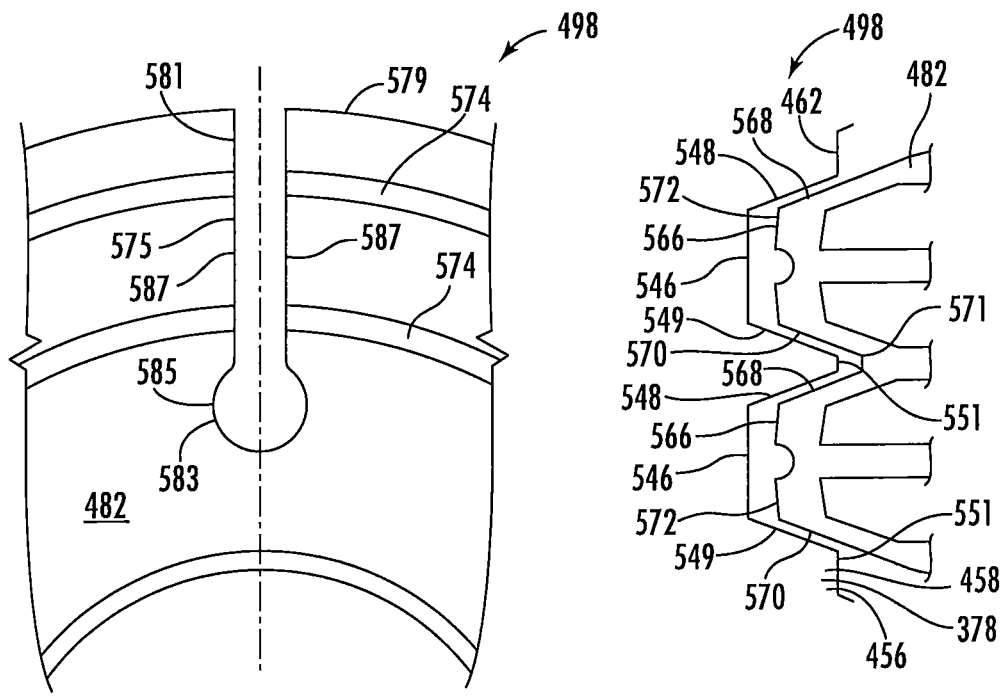
FIG. 3D
FIG. 3E

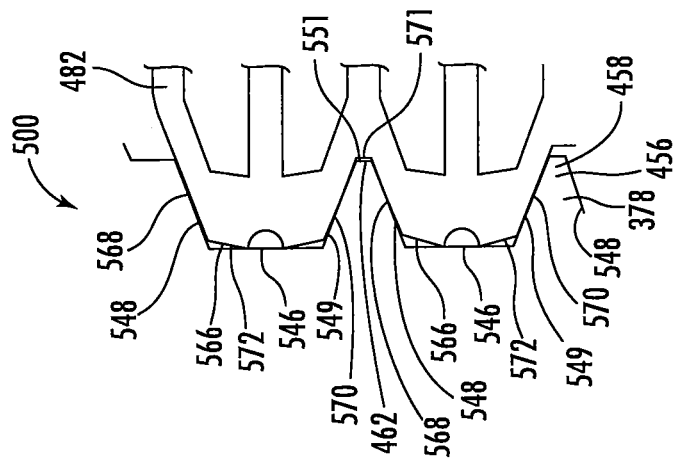
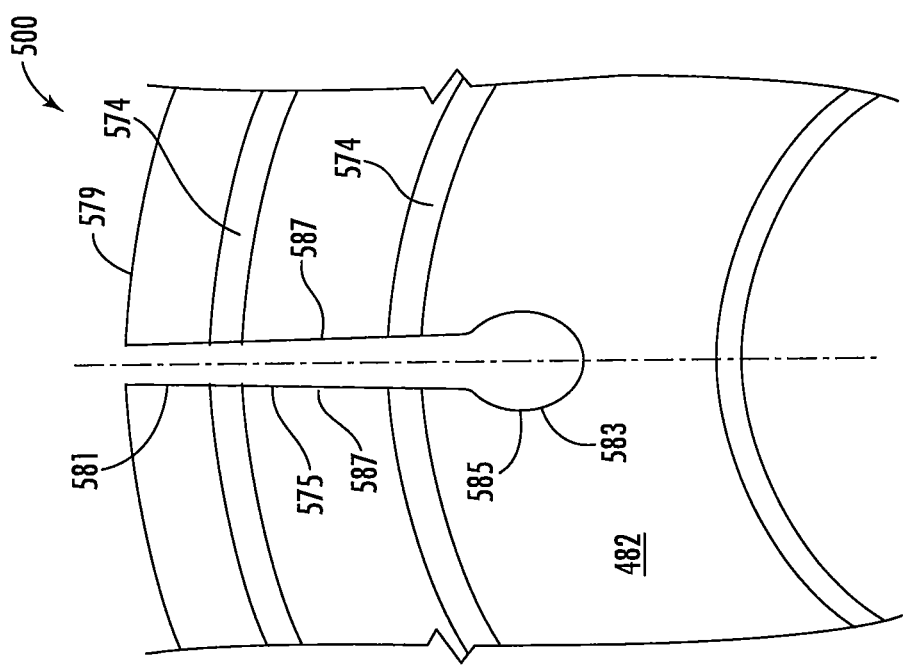

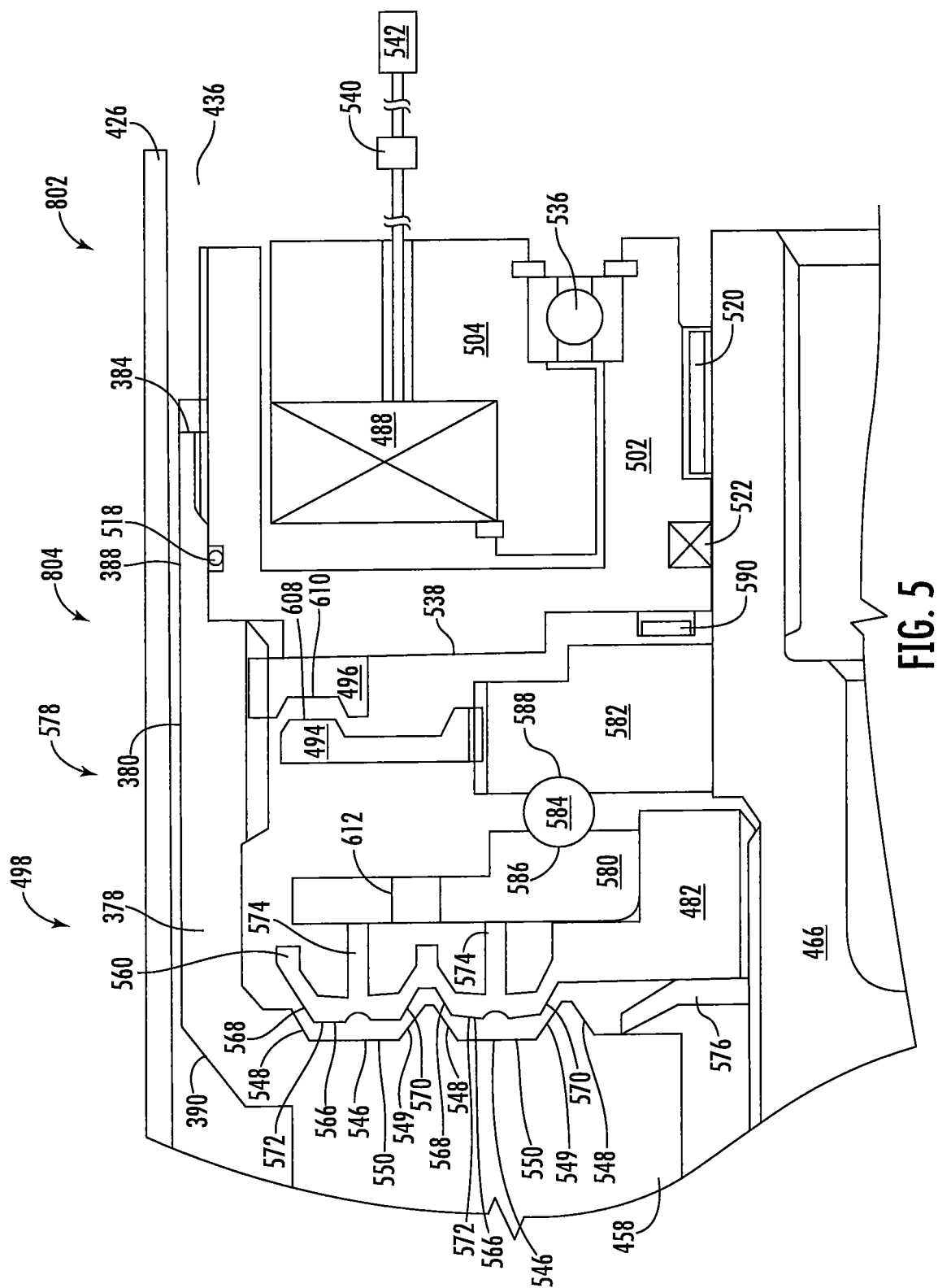

JOINT AND CLUTCH ASSEMBLY

CROSS-REFERENCE TO RELATED APPLICATIONS

The present application claims the benefit to U.S. Provisional Patent Application No. 62/770,222 filed on Nov. 21, 2018, which is incorporated herein by reference in its entirety.

FIELD OF THE DISCLOSURE

The present disclosure relates to a joint assembly and a clutch assembly for use in a motor vehicle.

BACKGROUND OF THE DISCLOSURE

Various coupling and electronic coupling assemblies are known in the art. A conventional electronic clutch assembly includes the use of a first plurality of friction plates that are slidingly engaged with a clutch drum and a second plurality of friction plates that are slidingly engaged with a clutch can. An actuator is then used to apply a force onto the first and second plurality of clutch plates allowing for a variable amount of force to be transmitted from the clutch drum to the clutch can of the electronic clutch assembly. The problem with the conventional coupling assemblies is that they are complex, large in size, heavy, require a large number of components and are expensive to manufacture.

It would be advantageous to develop a clutch assembly that is simpler, more reliable, lighter, has fewer components, is more cost efficient, is smaller in size and has improved packaging. Additionally, it would be advantageous to develop a joint assembly that is able to be integrated into a clutch assembly.

SUMMARY OF THE DISCLOSURE

A joint assembly and clutch assembly for use in a vehicle. The joint assembly includes a first joint member that is drivingly connected to a second joint member by using one or more third joint members. A first shaft is drivingly connected to the first joint member. The clutch assembly includes a first clutch member, a second clutch member, and an actuation assembly that is operably configures to selectively drive the second clutch member into engagement with the first clutch member of the clutch assembly. The actuation assembly utilizes an amount of rotational force that is transmitted from the first shaft and/or the second shaft in order to transition the second clutch member into engagement with the first clutch member. At least a portion of a second shaft is drivingly connected to the second clutch member.

According to the previous aspect of the disclosure, the joint assembly may be a constant velocity joint assembly, a CV joint assembly, a homokinetic joint assembly, a universal joint assembly, a U-joint, a Cardan joint assembly, a Spicer joint assembly or a Hooke's joint assembly.

According to any one of the previous aspects of the disclosure, the clutch assembly may be a dog clutch assembly, a wedge clutch assembly or a friction clutch assembly.

According to any one of the previous aspects of the disclosure, the first clutch member may be integrally formed as part of the second joint member of the joint assembly.

According to any one of the previous aspects of the disclosure, the clutch assembly may further include a housing having a first end portion, a second end portion, an inner surface and an outer surface defining a hollow portion therein. At least a portion of the joint assembly, the clutch assembly and/or the actuation assembly is disposed within at least a portion of the hollow portion of the housing.

According to any one of the previous aspects of the disclosure, the housing may include one or more housing grooves in the inner surface thereof in order to receive an amount of lubricating fluid therein.

According to any one of the previous aspects of the disclosure, a nut may be used in order to securedly connect at least a portion of the first clutch member to at least a portion of the second joint member.

According to any one of the previous aspects of the disclosure, the nut may have a first inner surface and a second inner surface. A nut snap-ring groove may circumferentially extend along at least a portion of the first inner surface of the nut and may be complementary to a second joint member snap-ring groove circumferentially extending along at least a portion of an outer surface of the second joint member.

According to anyone of the previous aspects of the disclosure, at least a portion of a nut snap-ring may be received and/or retained within at least a portion of the nut snap-ring groove and the second joint member snap-ring groove. A plurality of nut threads may circumferentially extend along at least a portion of the second inner surface of the nut may be complementary to and meshingly engaged with a plurality of first clutch member threads circumferentially extending along at least a portion of the outer surface of the first end portion of the first clutch member.

According to any one of the previous aspects of the disclosure, the clutch assembly may include a first sealing member having an inner portion and an outer portion. At least a portion of the outer portion of the first sealing member may be sealingly engaged with at least a portion of the inner surface of the housing and at least a portion of the inner portion of the first sealing member may be sealing engaged with at least a portion of the outer surface of the first clutch member.

According to any one of the previous aspects of the disclosure, the clutch assembly may further include a cover portion having an inner portion and an outer portion. At least a portion of the inner portion of the cover portion may be connected to at least a portion of the outer surface of the first clutch member and at least a portion of the outer portion of the cover portion may be disposed outboard from at least a portion of the outer surface of the housing.

According to any one of the previous aspects of the disclosure, further including one or more first bearing assemblies providing rotational support for at least a portion of the first clutch member.

According to any one of the previous aspects of the disclosure, the first clutch member has a wall portion. At least a portion of a first side of the wall portion of the first clutch member may provide a reaction surface for at least a portion of the second clutch member. When at least a portion of the second clutch member is engaged with at least a portion of the first side of the wall portion of the first clutch member, the clutch assembly may be in the engaged position. When the second clutch member is not engaged with the first side of the wall portion of the first clutch member, the clutch assembly may be in the disengaged position.

According to any one of the previous aspects of the disclosure, one or more receiving portions may extend inward from at least a portion of the first side of the wall portion of the first clutch member. The one or more receiving portions in the wall portion of the first clutch member may be of a size and shape to receive and/or retain at least a portion of one or more first axially extending portions extending outward from at least a portion of a first side of an increased diameter portion of the second clutch member. When at least a portion of the one or more first axially extending portions of the second clutch member are engaged with at least a portion of the one or more receiving portions of the first clutch member, the clutch assembly is in the engaged position. When the one or more first axially extending portions of the second clutch member are not engaged with the one or more receiving portions of the first clutch member, the clutch assembly is in the disengaged position.

According to any one of the previous aspects of the disclosure, the one or more receiving portions in the wall portion of the first clutch member may have one or more first sloped surfaces and/or one or more second sloped surfaces terminating in a bottom portion. The one or more first axially extending portions of the second clutch member may have one or more first sloped surfaces and/or one or more second sloped surfaces terminating in an outboard surface. At least a portion of the one or more first sloped surfaces, the one or more second sloped surfaces and/or the outboard surface of the second clutch member are selectively engagable with at least a portion of the one or more first sloped surfaces, the one or more second sloped surfaces and/or the bottom portion of the first clutch member.

According to any one of the previous aspects of the disclosure, the one or more first sloped surfaces of the one or more receiving portions in the wall portion of the first clutch member may be a mirror image of the one or more second sloped surfaces of the one or more receiving portions in the wall portion of the first clutch member. The one or more first sloped surfaces of the one or more first axially extending portions of the second clutch member are a mirror image of the one or more second sloped surfaces of the one or more first axially extending portions of the second clutch member.

According to any one of the previous aspects of the disclosure, the second clutch member may further include one or more slots extending from an outermost surface of the second clutch member toward the inner surface of the second clutch member. The one or more slots in the second clutch member allow at least a portion of the second clutch member to be elastically deformed when the clutch assembly is in the engaged position.

According to any one of the previous aspects of the disclosure, wherein at least a portion of the clutch assembly and/or the actuation assembly has one or more coatings disposed on at least a portion of the one or more components thereof.

According to any one of the previous aspects of the disclosure, the one or more coatings disposed on one or more of the components of the clutch assembly and/or the actuation assembly may be heat resistant and/or may have a high coefficient of dynamic friction.

According to any one of the previous aspects of the disclosure, further including one or more first biasing members. The one or more first biasing members may be used in order to aid in selectively transitioning the clutch assembly between an engaged position and a disengaged position by driving the second clutch member into or out of engagement with the first clutch member.

According to any one of the precious aspects of the disclosure, the clutch assembly may further include a ball and ramp assembly having a first plate, a second plate, and one or more balls interposed between the first plate and the second plate. The first plate of the ball and ramp assembly may be operably configured in order to transmit an amount of force onto the second clutch member thereby transitioning the clutch assembly from a disengaged position to an engaged position.

According to any one of the previous aspects of the disclosure, one or more second biasing members. The one or more second biasing members may be used in order to aid in selectively transitioning the clutch assembly between an engaged position and a disengaged position.

According to any one of the previous aspects of the disclosure, the actuation assembly may further include an electro-magnetic coil, a first engagement member and/or a second engagement member. At least a portion of the first engagement member may operably configured in order to rotate a second plate of a ball and ramp assembly when at least a portion of the first engagement member is engaged with at least a portion of the second engagement member of the actuation assembly. Additionally, the electro-magnetic coil may be operably configured in order to selectively engage at least a portion of the first engagement member with at least a portion of the second engagement member.

According to any one of the previous aspects of the disclosure, the first engagement member of the actuation assembly may be integrally formed as part of a plate of a ball and ramp assembly.

According to any one of the previous aspects of the disclosure, the second engagement member of the actuation assembly may be integrally formed as part of a housing of the electro-magnetic coil.

According to any one of the previous aspects of the disclosure, the actuation assembly may further include an armature. The electro-magnetic coil may be operably configured to drive the armature toward the first engagement member and selectively engage at least a portion of the first engagement member with at least a portion of the second engagement member. As a result, this may aid in transitioning the clutch assembly between a disengaged position and an engaged position.

According to any one of the previous aspects of the disclosure, the actuation assembly may further include one or more first plates, one or more second plates, and/or an armature. The one or more first plates and/or the one or more second plates may form a first clutch pack. The one or more first plates, the one or more second plates, and/or the armature may be selectively engagable with each other in order to selectively transition the clutch assembly between an engaged position and a disengaged position.

According to any one of the previous aspects of the disclosure, the clutch assembly may further include one or more first plates, one or more second plates, and/or a ball and ramp assembly. The one or more first plates and/or the one or more second plates form a second clutch pack. The second clutch pack may be interposed between the ball and ramp assembly and the second clutch member. The one or more first plates, the one or more second plates, and/or the ball and ramp assembly may be selectively engagable with each other in order to selectively transition the clutch assembly between an engaged position and a disengaged position.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 1 is a schematic top-plan view of a vehicle having one or more joint assemblies and coupling assemblies according to an embodiment of the disclosure;

FIG. 2 is a schematic top-plan view of another vehicle having one or more joint assemblies and coupling assemblies according to an embodiment of the disclosure;

FIG. 3C is a schematic top-plan view of a second clutch member of the clutch assembly according to the embodiment illustrated in FIGS. 3 and 3A of the disclosure;

FIG. 3D is a schematic top-plan view of a portion of the second clutch member of the clutch assembly according to the embodiment illustrated in FIGS. 3-3B when the second clutch member is in the disengaged position;

FIG. 3E is a cut-away schematic side-view of a portion of the second clutch member of the clutch assembly according to the embodiment illustrated in FIGS. 3-3B when the clutch assembly is in the disengaged position;

FIG. 3F is a schematic top-plan view of a portion of the second clutch member of the clutch assembly according to the embodiment illustrated in FIGS. 3-3B when the second clutch member is in the engaged position;

FIG. 3G is a cut-away schematic side-view of a portion of the second clutch member of the clutch assembly according to the embodiment illustrated in FIGS. 3-3B when the clutch assembly is in the engaged position;

FIG. 5 is a cut-away schematic side-view of a portion of the clutch assembly illustrated in FIGS. 3-4 according to another embodiment of the disclosure when the clutch assembly is in a disengaged position;

DETAILED DESCRIPTION OF THE DISCLOSURE

Figure 3:
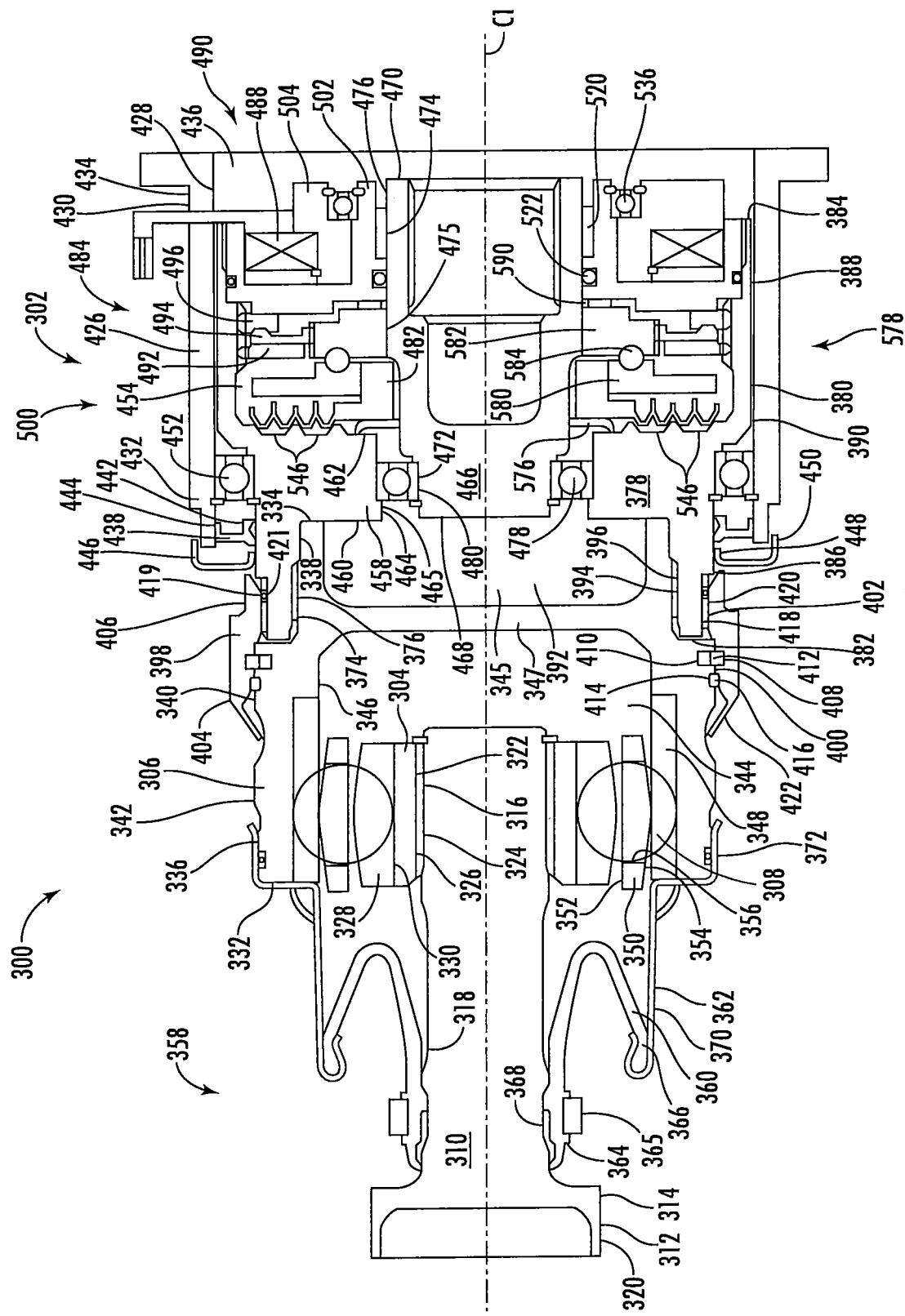
FIG. 3 is a cut-away schematic side-view of a joint assembly and clutch assembly according to an embodiment of the disclosure.

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the joint assemblies and coupling assemblies disclosed herein may be used in automotive, off-road vehicle, all-terrain vehicle, construction, structural, marine, aerospace, locomotive, military, machinery, robotic and/or consumer product applications. Additionally, as a non-limiting example, the joint assemblies and coupling assemblies disclosed herein may also be used in passenger vehicle, electric vehicle, hybrid vehicle, commercial vehicle, autonomous vehicles, semi-autonomous vehicles and/or heavy vehicle applications.

FIG. 1 is a schematic top-plan view of a vehicle 100 having one or more rotating shafts that are balanced according to an embodiment of the disclosure. The vehicle 100 has an engine 102 which is drivingly connected to a transmission 104. A transmission output shaft 106 is drivingly connected to an end of the transmission 104 opposite the engine 102. The transmission 104 is a power management system which provides controlled application of the rotational power generated by the engine by means of a gear box.

A first end portion 108 of a first propeller shaft 110 may be drivingly connected to an end of the transmission output shaft 106 opposite the transmission 104 via a first joint assembly 112. As illustrated in FIG. 1 of the disclosure and as a non-limiting example, a second end portion 114 of the first propeller shaft 110 may be drivingly connected to a second joint assembly 116.

Drivingly connected to an end of the second joint assembly 116, opposite the first propeller shaft 110, is a second propeller shaft 118. The second propeller shaft 118 drivingly connects the transmission 104 to a forward tandem axle system 120 of a tandem axle system 122 having an inter-axle differential 124. As illustrated in FIG. 1 of the disclosure and as a non-limiting example, at least a portion of a first end portion 124 of the second propeller shaft 118 may be drivingly connected to an end of the second joint assembly 116 opposite the first propeller shaft 110.

At least a portion of a second end portion 126 of the second propeller shaft 118 may be drivingly connected to an end of a third joint assembly 128. Drivingly connected to an end of the third joint assembly 128, opposite the second propeller shaft 118, is an end of a forward tandem axle system input shaft 130. An end of the forward tandem axle system input shaft 130, opposite the second propeller shaft 118, is drivingly connected to at least a portion of the inter-axle differential 124 of the forward tandem axle system 120. As a non-limiting example, the forward tandem axle system input shaft 130 may be an inter-axle differential input shaft, a coupling shaft, stub shaft or an inter-axle differential pinion shaft. The inter-axle differential 124 is a device that divides the rotational power generated by the engine 104 between the axles in a vehicle 100. The rotational power is transmitted through the forward tandem axle system 120 as described in more detail below.

As illustrated in FIG. 1 of the disclosure and as a non-limiting example, the inter-axle differential 124 is drivingly connected to a forward tandem axle differential 132 and a forward tandem axle system output shaft 134. The forward tandem axle differential 132 is a set of gears that allows the outer drive wheel(s) of a wheeled vehicle to rotate at a faster rate than the inner drive wheel(s).

The forward tandem axle system 120 further includes a first forward tandem axle half shaft 136 and a second front tandem axle half shaft 138. The first forward tandem axle half shaft 136 extends substantially perpendicular to the forward tandem axle system input shaft 130. At least a portion of a first end portion 140 of the first forward tandem axle half shaft 136 may be drivingly connected to a first forward tandem axle wheel assembly 142 and at least a portion of a second end portion 144 of the first forward tandem axle half shaft 136 may be drivingly connected to an end of the forward tandem axle differential 132. As a non-limiting example, the second end portion 144 of the first forward tandem axle half shaft 136 may be drivingly connected to a forward tandem axle differential side gear, a separate stub shaft, a separate coupling shaft, a first forward tandem axle differential output shaft and/or a shaft that is formed as part of a forward tandem axle differential side gear.

According to an embodiment of the disclosure and as a non-limiting example, at least a portion of the first end portion 140 of the first forward tandem axle half shaft 136 may be drivingly connected to at least a portion of a fourth joint assembly 145. At least a portion of an end of the fourth joint assembly 145, opposite the first forward tandem axle half shaft 136, may be drivingly connected to at least a portion of the first forward tandem axle wheel assembly 142 of the vehicle 100.

In accordance with a further embodiment of the disclosure and as a non-limiting example, at least a portion of the second end portion 144 of the first forward tandem axle half shaft 136 may be drivingly connected to at least a portion of a fifth joint assembly 147. At least a portion of an end of the fifth joint assembly 147, opposite the first forward tandem axle half shaft 136, may be drivingly connected to at least a portion of the forward tandem axle differential 132 of the vehicle 100.

Extending substantially perpendicular to the forward tandem axle input shaft 130 is the second front tandem axle half shaft 138. At least a portion of a first end portion 146 of the second forward tandem axle half shaft 138 may be drivingly connected to a second forward tandem axle wheel assembly 148. At least a portion of a second end portion 150 of the second forward tandem axle half shaft 138 may be drivingly connected to an end of the forward tandem axle differential 132 opposite the first forward tandem axle half shaft 136. As a non-limiting example, the second end portion 150 of the second forward tandem axle half shaft 138 may be drivingly connected to a forward tandem axle differential side gear, a separate stub shaft, a separate coupling shaft, a second forward tandem axle differential output shaft and/or a shaft that is formed as part of a forward tandem axle differential side gear.

According to an embodiment of the disclosure and as a non-limiting example, at least a portion of the first end portion 146 of the second forward tandem axle half shaft 138 may be drivingly connected to at least a portion of a sixth joint assembly 151. At least a portion of an end of the sixth joint assembly 151, opposite the second forward tandem axle half shaft 138, may be drivingly connected to at least a portion of the second forward tandem axle wheel assembly 148 of the vehicle 100.

In accordance with a further embodiment of the disclosure and as a non-limiting example, at least a portion of the second end portion 510 of the second forward tandem axle half shaft 138 may be drivingly connected to at least a portion of a seventh joint assembly 153. At least a portion of an end of the seventh joint assembly 153, opposite the second forward tandem axle half shaft 138, may be drivingly connected to at least a portion of an end of the forward tandem axle differential 132 opposite the first forward tandem axle half shaft 136.

One end of the forward tandem axle system output shaft 134 is drivingly connected to a side of the inter-axle differential 124 opposite the second propeller shaft 118. An end of the forward tandem axle system output shaft 134, opposite the inter-axle differential 124, may be drivingly connected to at least a portion of a first end portion 152 of a third propeller shaft 154 via an eighth joint assembly 156. At least a portion of a second end portion 158 of the third propeller shaft 154 may be drivingly connected to a fourth propeller shaft 160 via a ninth joint assembly 162.

As illustrated in FIG. 1 of the disclosure and as a non-limiting example, at least a portion of a first end portion 164 of the fourth propeller shaft 160 may be drivingly connected to an end of the ninth joint assembly 162 opposite the third propeller shaft 154. The fourth propeller shaft 160 drivingly connects the inter-axle differential 124 to a rear tandem axle system 166 having a rear tandem axle differential 168.

Additionally, as illustrated in FIG. 1 of the disclosure and as a non-limiting example, at least a portion of a second end portion 170 of the fourth propeller shaft 160 may be drivingly connected to an end of a tenth joint assembly 172. Drivingly connected to an end of the tenth joint assembly 172, opposite the fourth propeller shaft 160 is an end of a rear tandem axle system input shaft 174. As a non-limiting example, the rear tandem axle input shaft 174 may be a rear tandem axle differential input shaft, a coupling shaft, stub shaft or a rear tandem axle differential pinion shaft. Drivingly connected to an end of the rear tandem axle input shaft 174, opposite the fourth propeller shaft 160, is the rear tandem axle differential 168. The rear tandem axle differential 168 is a set of gears that allows the outer drive wheel(s) of the wheeled vehicle to rotate at a faster rate that the inner drive wheel(s). The rotational power is transmitted through the rear tandem axle system 166 as described in more detail below.

The rear tandem axle system 166 further includes a first rear tandem axle half shaft 176 and a second rear tandem axle half shaft 178. The first rear tandem axle half shaft 176 extends substantially perpendicular to the rear tandem axle system input shaft 174. At least a portion of a first end portion 180 of the first rear tandem axle half shaft 176 may be drivingly connected to a first rear tandem axle wheel assembly 182 and at least a portion of a second end portion 184 of the first rear tandem axle half shaft 176 may be drivingly connected to an end of the rear tandem axle differential 168. As a non-limiting example, the second end portion 184 of the first rear tandem axle half shaft 176 may be drivingly connected to a rear tandem axle differential side gear, a separate stub shaft, a separate coupling shaft, a first rear tandem axle differential output shaft and/or a shaft that is formed as part of a rear tandem axle differential side gear.

According to an embodiment of the disclosure and as a non-limiting example, at least a portion of the first end portion 180 of the first rear tandem axle half shaft 176 may be drivingly connected to at least a portion of an eleventh joint assembly 185. At least a portion of an end of the eleventh joint assembly 185, opposite the first rear tandem axle half shaft 176, may be drivingly connected to at least a portion of the first rear tandem axle wheel assembly 182 of the vehicle 100.

In accordance with a further embodiment of the disclosure and as a non-limiting example, at least a portion of the second end portion 184 of the first rear tandem axle half shaft 176 may be drivingly connected to at least a portion of a twelfth joint assembly 187. At least a portion of an end of the twelfth joint assembly 187, opposite the first rear tandem axle half shaft 176, may be drivingly connected to at least a portion of the rear tandem axle differential 168 of the vehicle 100.

Extending substantially perpendicular to the rear tandem axle system input shaft 174 is the second forward tandem axle half shaft 178. At least a portion of a first end portion 186 of the second rear tandem axle half shaft 178 may be drivingly connected to a second rear tandem axle wheel assembly 188. Additionally, at least a portion of a second end portion 190 of the second rear tandem axle half shaft 178 may be drivingly connected to an end of the rear tandem axle differential 168 opposite the first rear tandem axle half shaft 176. As a non-limiting example, the second end portion 190 of the second rear tandem axle half shaft 178 may be drivingly connected to a rear tandem axle differential side gear, a separate stub shaft, a separate coupling shaft, a second rear tandem axle differential output shaft and/or a shaft that is formed as part of a rear tandem axle differential side gear.

According to an embodiment of the disclosure and as a non-limiting example, at least a portion of the first end portion 186 of the second rear tandem axle half shaft 178 may be drivingly connected to at least a portion of a thirteenth joint assembly 192. At least a portion of an end of the thirteenth joint assembly 192, opposite the second rear tandem axle half shaft 178, may be drivingly connected to at least a portion of the second rear tandem axle wheel assembly 188 of the vehicle 100.

In accordance with a further embodiment of the disclosure and as a non-limiting example, at least a portion of the second end portion 190 of the second rear tandem axle half shaft 178 may be drivingly connected to at least a portion of a fourteenth joint assembly 194. At least a portion of an end of the fourteenth joint assembly 194, opposite the second rear tandem axle half shaft 178, may be drivingly connected to at least a portion of the rear tandem axle differential 168 opposite the first rear tandem axle half shaft 176.

It is within the scope of this disclosure and as a non-limiting example that the first, second, third, fourth, fifth, sixth, seventh, eighth, ninth, tenth, eleventh, twelfth, thirteenth, and/or fourteenth joint assembly 112, 116, 128, 145, 147, 151, 153, 156, 162, 172, 185, 187, 192, and/or 194 may be a homokinetic coupling assembly, a constant velocity joint assembly, a CV joint assembly, a universal joint assembly, a Cardan joint assembly, a Spicer joint assembly, a Hooke's joint assembly and/or a universal coupling assembly. Additionally, it is within the scope of this disclosure and as a non-limiting example that at least a portion of the first, second, third, fourth, fifth, sixth, seventh, eighth, ninth, tenth, eleventh, twelfth, thirteenth, and/or fourteenth joint assembly 112, 116, 128, 145, 147, 151, 153, 156, 162, 172, 185, 187, 192, and/or 194 may be connected to at least a portion of a clutch assembly (not shown) according to an embodiment of the disclosure.

FIG. 2 is a schematic top-plan view of another vehicle 200 having one or more rotating shafts that are balanced according to an embodiment of the disclosure. The vehicle 200 has an engine 202 which is drivingly connected to a transmission 204. A transmission output shaft 206 is then drivingly connected to an end of the transmission 204 opposite the engine 202. The transmission 204 is a power management system which provides controlled application of the rotational energy generated by the engine 202 by means of a gearbox.

The transmission output shaft 206 is drivingly connected to a transfer case input shaft 208 which in turn is drivingly connected to a transfer case 210. The transfer case 210 is used to transfer the rotational power from the transmission 204 to a front axle system 212 and a rear axle system 214 by utilizing a series of gears and drive shafts. The transfer case 210 further includes a first transfer case output 216 shaft and a second transfer case output shaft 218.

A first propeller shaft 220 extends from the first transfer case output shaft 216 toward the front axle system 212 of the vehicle 200. At least a portion of a first end portion 222 of the first propeller shaft 220 may be drivingly connected to an end of the first transfer case output shaft 216 opposite the transfer case 210 via a first joint assembly 224.

As illustrated in FIG. 2 of the disclosure and as a non-limiting example, at least a portion of a second end portion 226 of the first propeller shaft 220 may be drivingly connected to a second joint assembly 228. Drivingly connected to an end of the second joint assembly 228, opposite the first propeller shaft 220, is an end of a front axle system input shaft 230. As a non-limiting example, the front axle system input shaft 230 may be a front axle differential input shaft, a coupling shaft, stub shaft or a front axle differential pinion shaft. Drivingly connected to an end of the front axle system input shaft 230, opposite the first propeller shaft 220, is a front axle differential 232. The front axle differential 232 is a set of gears that allows the outer drive wheel(s) of the wheeled vehicle to rotate at a faster rate that the inner drive wheel(s). The rotational power is transmitted through the front axle system 212 as described in more detail below.

The front axle system 212 further includes a first front axle half shaft 234 and a second front axle half shaft 236. The first front axle half shaft 234 extends substantially perpendicular to the front axle system input shaft 230. At least a portion of a first end portion 238 of the first front axle half shaft 234 may be drivingly connected to a first front axle wheel assembly 240 and at least a portion of a second end portion 242 of the first front axle half shaft 234 may be drivingly connected to an end of the front axle differential 232. As a non-limiting example, the second end portion 242 of the first front axle half shaft 234 may be drivingly connected to a front axle differential side gear, a separate stub shaft, a separate coupling shaft, a first front axle differential output shaft and/or a shaft that is formed as part of a front axle differential side gear.

According to an embodiment of the disclosure and as a non-limiting example, at least a portion of the first end portion 238 of the first front axle half shaft 234 may be drivingly connected to at least a portion of a third joint assembly 239. At least a portion of an end of the third joint assembly 239, opposite the first front axle half shaft 234, may be drivingly connected to at least a portion of the first front axle wheel assembly 240 of the vehicle 200.

In accordance with a further embodiment of the disclosure and as a non-limiting example, at least a portion of the second end portion 242 of the first front axle half shaft 234 may be drivingly connected to at least a portion of a fourth joint assembly 241. At least a portion of an end of the fourth joint assembly 241, opposite the first front axle half shaft 234, may be drivingly connected to at least a portion of the front axle differential 232 of the vehicle 200.

Extending substantially perpendicular to the front axle system input shaft 230 is the second front axle half shaft 236. At least a portion of a first end portion 244 of the second front axle half shaft 236 may be drivingly connected to a second front axle wheel assembly 246. Additionally, at least a portion of a second end portion 248 of the second front axle half shaft 236 may be drivingly connected to an end of the front axle differential 232 opposite the first front axle half shaft 234. As a non-limiting example, the second end portion 248 of the second front axle half shaft 236 may be drivingly connected to a front axle differential side gear, a separate stub shaft, a separate coupling shaft, a second front axle differential output shaft and/or a shaft that is formed as part of a front axle differential side gear.

According to an embodiment of the disclosure and as a non-limiting example, at least a portion of the first end portion 244 of the second front axle half shaft 236 may be drivingly connected to at least a portion of a fifth joint assembly 245. At least a portion of an end of the fifth joint assembly 245, opposite the second front axle half shaft 236, may be drivingly connected to at least a portion of the second front axle wheel assembly 246 of the vehicle 200.

In accordance with a further embodiment of the disclosure and as a non-limiting example, at least a portion of the second end portion 248 of the second front axle half shaft 236 may be drivingly connected to at least a portion of a sixth joint assembly 249. At least a portion of an end of the sixth joint assembly 249, opposite the second front axle half shaft 236, may be drivingly connected to at least a portion of the front axle differential 232 opposite the first front axle half shaft 234.

An end of the second transfer case output shaft 218 is drivingly connected to an end of the transfer case 210 opposite the transfer case input shaft 208. As illustrated in FIG. 2 of the disclosure and as a non-limiting example, at least a portion of a first end portion 250 of a second propeller shaft 252 may be drivingly connected to an end of the second transfer case output shaft 218 opposite the transfer case 210 via a seventh joint assembly 254.

As best seen in FIG. 2 of the disclosure and as a non-limiting example, at least a portion of a second end portion 256 of the second propeller shaft 252 may be drivingly connected to an eighth joint assembly 258. Drivingly connected to an end of the eighth joint assembly 258, opposite the second propeller shaft 252, is a third propeller shaft 260. The third propeller shaft 260 drivingly connects the transfer case 210 to a rear axle differential 262 of the rear axle system 214. As illustrated in FIG. 2 of the disclosure and as a non-limiting example, at least a portion of a first end portion 264 of the third propeller shaft 260 may be drivingly connected to an end of the eighth joint assembly 258 opposite the second propeller shaft 252.

At least a portion of a second end portion 266 of the third propeller shaft 260 may be drivingly connected to an end of a ninth joint assembly 268. As a non-limiting example, the ninth joint assembly 268 may be a homokinetic coupling assembly, a constant velocity joint assembly, a CV joint assembly, a universal joint assembly, a Cardan joint assembly, a Spicer joint assembly, a Hooke's joint assembly or a universal coupling assembly.

Drivingly connected to an end of the ninth joint assembly 268, opposite the third propeller shaft 260, is an end of a rear axle system input shaft 270. An end of the rear axle system input shaft 270, opposite the third propeller shaft 260, is drivingly connected to the rear axle differential 262 of the rear axle system 214. As a non-limiting example, the rear axle system input shaft 270 may be a rear differential input shaft, a coupling shaft, stub shaft or a rear axle differential pinion shaft. The rear axle differential 262 is a set of gears that allows the outer drive wheel(s) of the wheeled vehicle to rotate at a faster rate that the inner drive wheel(s). The rotational power is transmitted through the rear axle system 214 as described in more detail below.

The rear axle system 214 further includes a first rear axle half shaft 272 and a second rear axle half shaft 274. The first rear axle half shaft 272 extends substantially perpendicular to the rear axle system input shaft 270. At least a portion of a first end portion 276 of the first rear axle half shaft 272 may be drivingly connected to a first rear axle wheel assembly 278 and at least a portion of a second end portion 280 of the first rear axle half shaft 272 may be drivingly connected to an end of the rear axle differential 262. As a non-limiting example, the second end portion 280 of the first rear axle half shaft 272 may be drivingly connected to a rear axle differential side gear, a separate stub shaft, a separate coupling shaft, a first rear axle differential output shaft and/or a shaft that is formed as part of a rear axle differential side gear.

According to an embodiment of the disclosure and as a non-limiting example, at least a portion of the first end portion 276 of the first rear axle half shaft 272 may be drivingly connected to at least a portion of a tenth joint assembly 277. At least a portion of an end of the tenth joint assembly 277, opposite the first rear axle half shaft 272, may be drivingly connected to at least a portion of the first rear axle wheel assembly 278 of the vehicle 200.

In accordance with a further embodiment of the disclosure and as a non-limiting example, at least a portion of the second end portion 280 of the first rear axle half shaft 272 may be drivingly connected to at least a portion of an eleventh joint assembly 281. At least a portion of an end of the eleventh joint assembly 281, opposite the first rear axle half shaft 272, may be drivingly connected to at least a portion of the rear axle differential 262 of the vehicle 200.

Extending substantially perpendicular to the rear axle system input shaft 270 is the second rear axle half shaft 274. At least a portion of a first end portion 282 of the second rear axle half shaft 274 may be drivingly connected to a second rear axle wheel assembly 284. Additionally, at least a portion of a second end portion 286 of the second rear axle half shaft 274 may be drivingly connected to an end of the rear axle differential 262 opposite the first rear axle half shaft 272. As a non-limiting example, the second end portion 286 of the second rear axle half shaft 274 may be drivingly connected to a rear axle differential side gear, a separate stub shaft, a separate coupling shaft, a second rear axle differential output shaft and/or a shaft that is formed as part of a rear axle differential side gear.

According to an embodiment of the disclosure and as a non-limiting example, at least a portion of the first end portion 282 of the second rear axle half shaft 274 may be drivingly connected to at least a portion of a twelfth joint assembly 288. At least a portion of an end of the twelfth joint assembly 288, opposite the second rear axle half shaft 274, may be drivingly connected to at least a portion of the second rear axle wheel assembly 284 of the vehicle 200.

In accordance with a further embodiment of the disclosure and as a non-limiting example, at least a portion of the second end portion 286 of the second rear axle half shaft 274 may be drivingly connected to at least a portion of a thirteenth joint assembly 290. At least a portion of an end of the thirteenth joint assembly 290, opposite the second rear axle half shaft 274, may be drivingly connected to at least a portion of the rear axle differential 262 opposite the first rear axle half shaft 272.

It is within the scope of this disclosure and as a non-limiting example that the first, second, third, fourth, fifth, sixth, seventh, eighth, ninth, tenth, eleventh, twelfth, and/or thirteenth joint assembly 224, 228, 239, 241, 245, 249, 254, 258, 268, 277, 281, 288, and/or 290 may be a homokinetic coupling assembly, a constant velocity joint assembly, a CV joint assembly, a universal joint assembly, a Cardan joint assembly, a Spicer joint assembly, a Hooke's joint assembly and/or a universal coupling assembly. Additionally, it is within the scope of this disclosure and as a non-limiting example that at least a portion of the first, second, third, fourth, fifth, sixth, seventh, eighth, ninth, tenth, eleventh, twelfth, and/or thirteenth joint assembly 224, 228, 239, 241, 245, 249, 254, 258, 268, 277, 281, 288, and/or 290 may be connected to at least a portion of a clutch assembly (not shown) according to an embodiment of the disclosure.

FIGS. 3-3G provide a schematic illustration of a joint assembly 300 and a clutch assembly 302 according to an embodiment of the disclosure. As illustrated in FIG. 3 of the disclosure and as a non-limiting example, the joint assembly 300 may include a first joint member 304 and a second joint member 306 that is drivingly connected to at least a portion of the first joint member 304 via one or more third joint members 308. It is within the scope of this disclosure and as a non-limiting example that the joint assembly 300 may be a constant velocity joint assembly, a CV joint assembly, a homokinetic joint assembly, a universal joint assembly, a U-joint, a Cardan joint assembly, A Spicer joint assembly or a Hooke's joint assembly.

Drivingly connected to at least a portion of the first joint member 304 is first shaft 310. As best seen in FIG. 3 of the disclosure and as a non-limiting example, the first shaft 310 may have an outer surface 312, a first end portion 314, a second end portion 316 and an intermediate portion 318 interposed between the first and second end portions 312 and 314. It is within the scope of this disclosure and as a non-limiting example that the first shaft 310 may be a stub shaft, a pinion gear shaft, a transmission output shaft, a transfer case input shaft, a first transfer case output shaft, a second transfer case output shaft, a power transfer unit input shaft, a power transfer unit output shaft, a differential input shaft, a first differential output shaft, a second differential output shaft, a front differential input shaft, a first front axle differential output shaft, a second front axle differential output shaft, a first front axle half shaft, a second front axle, half shaft, a rear differential input shaft, a first rear axle differential output shaft, a second rear axle differential output shaft, a first rear axle half shaft, a rear front axle half shaft, a forward tandem axle input shaft, an inter-axle differential input shaft, a first forward tandem axle differential output shaft, a second forward tandem axle differential output shaft, a first forward tandem axle half shaft, a second forward tandem axle half shaft, an inter-axle differential output shaft, a rear tandem axle differential input shaft, a first rear tandem axle differential output shaft, a second rear tandem axle differential output shaft, a first rear tandem axle half shaft, a second rear tandem axle half shaft, a drive shaft, a propeller shaft or a midship shaft.

Circumferentially extending from at least a portion of the outer surface 312 of the first end portion 314 of the first shaft 310 is an increased diameter portion 320. The increased diameter portion 320 of the first shaft 310 may have a size and shape needed to drivingly connect at least a portion of the first shaft 310 to at least a portion of another shaft in a driveline of the vehicle.

A plurality of first shaft splines 322 may circumferentially extend from at least a portion of the outer surface 312 of the second end portion 316 of the first shaft 310 of the joint assembly 300. The plurality of first shaft splines 322 are complementary to and meshingly engaged with a plurality of first joint member splines 324 circumferentially extending along at least a portion of an inner surface 326 of the first joint member 304. It is therefore to be understood that the plurality of first shaft splines 322 may drivingly connect at least a portion of the first shaft 310 to at least a portion of the first joint member 304 of the joint assembly 300. As a non-limiting example, the first joint member 304 may be an inner race of a constant velocity joint assembly.

In accordance with the embodiment illustrated in FIG. 3 of the disclosure and as a non-limiting example, at least a portion of the second joint member 306 may be disposed radially outboard from at least a portion of the first joint member 304 of the joint assembly 300. As best seen in FIG. 3 of the disclosure and as a non-limiting example, the second joint member 306 has a first end 332, a second end 334, a first end portion 336, a second end portion 338, an intermediate portion 340 and an outer surface 342. It is within the scope of this disclosure and as a non-limiting example that the second joint member 306 may be an outer race of a constant velocity joint assembly.

Extending inward into at least a portion of the second joint member 306, from at least a portion of the first end 332 of the second joint member 306, is a first hollow interior portion 344 having a first inner surface 346. As best seen in FIG. 3 of the disclosure and as a non-limiting example, at least a portion of the first joint member 304 may be disposed within at least a portion of the first hollow interior portion 344 of the second joint member 306.

According to the embodiment illustrated in FIG. 3 of the disclosure and as a non-limiting example, the second joint member 306 of the joint assembly 300 may further include a second hollow interior portion 345 extending inward from at least a portion of the second end 334 of the second joint member 306 and into at least a portion of the second joint member 306. The second hollow interior portion 345 of second joint member 306 may aid in reducing the overall weight of the second joint member 306. This aids in reducing the overall mass associated with the driveline of the vehicle (not shown) which aids in increasing the overall efficiency of the vehicle (not shown).

In accordance with the embodiment where the second joint member 306 has a second hollow interior portion 345 therein, the second joint member 306 may further include a wall portion 347. The wall portion 347 of the second joint member 306 may provide a barrier separating at least a portion of the first hollow interior portion 344 from at least a portion of the second hollow interior portion 345 of the second joint member 306. It is within the scope of this disclosure and as a non-limiting example that the wall portion 347 may be substantially solid or may include one or more apertures or openings (not shown) fluidly connecting the first and second hollow interior portions 344 and 345 of the second joint member 306 of the joint assembly 300.

Circumferentially extending along at least a portion of the first inner surface 346 of the second joint member 306 is a plurality of second joint member grooves 348. The plurality of second joint member grooves 348 may be complementary to one or more first joint member grooves 328 circumferentially extend along at least a portion of an outer surface 330 of the first joint member 304. Additionally, the plurality of first joint member grooves 328 and the plurality of second joint member grooves 348 may be of a size and shape to receive and/or retain at least a portion of the one or more third joint members 308 of the joint assembly 300. As a result, it is therefore to be understood that the one or more third joint members 308 aid in drivingly connecting the first joint member 304 to the second joint member 306 of the joint assembly 300.

According to the embodiment illustrated in FIG. 3 of the disclosure and as a non-limiting example, the joint assembly 300 may further include a fourth joint member 350 having an inner surface 352 and an outer surface 354. Extending from the inner surface 352 to the outer surface 354 of the fourth joint member 350 is one or more openings 356. The one or more openings 356 in the fourth joint member 350 may be of a size and shape to receive and/or retain at least a portion of one or more of the one or more third joint members 308 of the joint assembly 300. It is therefore within the scope of this disclosure and as a non-limiting example that the fourth joint member 350 may be a cage of a constant velocity joint assembly.

The joint assembly 300 may include a boot assembly 358. The boot assembly 358 may be used in order to seal the joint assembly 300 from dirt, debris and/or moisture while allowing the joint assembly 300 to articulate. As best seen in FIG. 3 of the disclosure and as a non-limiting example, the boot assembly 358 may include a flexible boot 360 and/or a boot can 362. At least a portion of a first end portion 364 of the flexible boot 360 may be connected to and sealingly engaged with at least a portion of an intermediate portion 318 of the first shaft 310. It is within the scope of this disclosure and as a non-limiting example that the first end portion 364 of the flexible boot 360 may be connected to and sealingly engaged with the first shaft 310 by using one or more boot retention members 365.

In accordance with an embodiment of the disclosure and as a non-limiting example, the flexible boot 360 may include one or more vents 368. The one or more vents 368 in the flexible boot 360 allow an amount of pressure within the joint assembly 300 to be vented to the environment once the pressure within the joint assembly 300 exceeds a predetermined amount. This aids in increasing the overall life and durability of the boot assembly 358 and the joint assembly 300.

At least a portion of a second end portion 366 of the flexible boot 360 may be connected to and sealingly engaged with at least a portion of a first end portion 370 of the boot can 362. Additionally, at least a portion of a second end portion 372 of the boot can 362 may be connected to and/or sealingly engaged with at least a portion of the outer surface 342 of the first end portion 336 of the second joint member 306 of the joint assembly 300. The boot can 362 may aid in preventing debris from contacting the flexible boot 360. This aids in increasing the overall life and durability of the joint assembly 300 and the boot assembly 358.

Drivingly connected to at least a portion of the second end portion 338 of the second joint member 306 is a first clutch member 378 of the joint assembly 300. As best seen in FIG. 3 of the disclosure and as a non-limiting example, the first clutch member 378 has an outer surface 380, a first end 382, a second end 384, a first end portion 386, a second end portion 388 and an intermediate portion 390. Extending inward from at least a portion of the first end 382 of the first clutch member 378 is a first hollow interior portion 392 having a first inner surface 394. The first hollow interior portion 392 may be of a size and shape to receive and/or retain at least a portion of the second joint member 306 of the joint assembly 300.

Circumferentially extending along at least a portion of the first inner surface 394 of the first hollow interior portion 392 of the first clutch member 378 is a first plurality of splines 396. The first plurality of splines 396 on the first inner surface 394 of the first clutch member 378 may be complementary to and meshingly engaged with at least a portion of a plurality of second joint member splines 376 circumferentially extending along at least a portion of the outer surface 342 of the second end portion 338 of the second joint member 306. As a result, it is therefore to be understood that the second joint member 306 may be drivingly connected to at least a portion of the first clutch member 378 of the clutch assembly 302.

According to an embodiment of the disclosure and as a non-limiting example, a reduced diameter portion 374 may circumferentially extend along at least a portion of the outer surface 342 of the second end portion 338 of the second joint member 306. In accordance with this embodiment of the disclosure and as a non-limiting example, the plurality of second joint member splines 376 may circumferentially extend along at least a portion of the outer surface 342 of the reduced diameter portion 374 of the second joint member 306 of the joint assembly 300.

Disposed radially outboard from at least a portion of the second joint member 306 and the first clutch member 378 is a nut 398 having a first inner surface 400, a second inner surface 402, a first end portion 404 and a second end portion 406. The nut 398 aids in axially restraining and securing at least a portion of the second joint member 306 of the joint assembly 300 to at least a portion of the first clutch member 378 of the clutch assembly 302. As best seen in FIG. 3 of the disclosure and as a non-limiting example, a nut snap-ring groove 408 may circumferentially extend along at least a portion of the first inner surface 400 of the nut 389. The nut snap-ring groove 408 in the first inner surface 400 of the nut 378 may be complementary to a second joint member snap-ring groove 410 circumferentially extending along at least a portion of the intermediate portion 340 of the second joint member 306. The nut snap-ring groove 408 and the second joint member snap-ring groove 410 may be of a size and shape to receive and/or retain at least a portion of a nut snap-ring 412 therein.

A second joint member O-ring groove 414 may circumferentially extend along at least a portion of the outer surface 342 of the intermediate portion 340 of the second joint member 306 of the joint assembly 300. The second joint member O-ring groove 414 may be of a size and shape to receive and/or retain at least a portion of a first O-ring 416 therein. When assembled, at least a portion of the first O-ring 416 may be sealingly engaged with at least a portion of the outer surface 342 of the second joint member 302 and the first inner surface 400 of the nut 398 of the joint assembly 300. This aids in preventing the migration of an amount of dirt, debris and/or moisture into the clutch assembly 302 thereby aiding in increasing the overall life and durability of the clutch assembly 302.

Circumferentially extending along at least a portion of the second inner surface 402 of the nut 398 is a plurality of nut threads 418. The plurality of nut threads 418 on the second inner surface 402 of the nut 398 may be complementary to and meshingly engaged with at least a portion of a plurality of first clutch member threads 420 circumferentially extending along at least a portion of the outer surface 380 of the first end portion 386 of the first clutch member 378. It is therefore to be understood that the meshing engagement of the plurality of nut threads 418 and the plurality of first clutch member threads 420 aid in securing and axially restraining the second joint member 306 relative to the first clutch member 378.

At least a portion of a fourth O-ring 419 may be disposed in fourth O-ring groove 421 circumferentially extending along at least a portion of the outer surface 380 of the first end portion 386 of the first clutch member 389 of the clutch assembly 302. As a result, it is to be understood that the fourth O-ring groove 421 may have a size and shape to receive and/or retain at least a portion of the fourth O-ring 419. The fourth O-ring 419 may be used in order to prevent the migration of dirt, debris and/or moisture into the threaded connection between the nut 398 and the first clutch member 378. In accordance with the embodiment illustrated in FIG. 3 of the disclosure and as a non-limiting example, at least a portion of the fourth O-ring groove 421 may be disposed in at least a portion of the first clutch member threads 420 on the first clutch member 378 or directly adjacent to at least a portion of the first clutch member threads 420 on the first clutch member 378 of the clutch assembly 302.

Extending outward from at least a portion of the first end portion 404 of the nut 389 of the joint assembly 300 is one or more axially extending portions 422. As best seen in FIG. 3 of the disclosure and as a non-limiting example, the one or more axially extending portions 422 may be plastically deformed inward into direct contact with at least a portion of the outer surface 342 of the second joint member 306 in order to ensure that the nut 398 does not become threadingly disengaged with the first clutch member 378. In accordance with an embodiment of the disclosure and as a non-limiting example, the one or more axially extending portions 422 may be plastically deformed into one or more recesses 424 circumferentially extending along at least a portion of the outer surface 342 of the intermediate portion 340 of the second joint member 306.

Disposed radially outboard form at least a portion of the first clutch member 378, the second joint member 306 and/or the nut 398 is a housing 426 having an inner surface 428, an outer surface 430, a first end portion 432 and a second end portion 434. The inner surface 428 and the outer surface 430 of the housing 426 defines a hollow portion 436 therein. As best seen in FIGS. 3-3B of the disclosure and as a non-limiting example, the hollow portion 436 of the housing 426 may have a size and shape to receive and/or retain at least a portion of the clutch assembly 302. It is within the scope of this disclosure and as a non-limiting example that the housing 1388 may form at least a portion of or may be connected to at least a portion of a front axle housing, a rear axle housing, a forward tandem axle housing, a rear tandem axle housing, a differential housing, a front differential housing, a read differential housing, a forward tandem axle differential housing, a rear tandem axle differential housing, an inter-axle differential housing, a transmission housing, a power transfer unit housing or a transfer case housing.

Interposed between at least a portion of the housing 426 and the first clutch member 378 is a first sealing member 438 having an inner portion 440 and an outer portion 444. As best seen in FIG. 3 of the disclosure and as a non-limiting example, at least a portion of the inner portion 440 of the first sealing member 438 may be sealingly engaged with at least a portion of the outer surface 380 of the intermediate portion 390 of the first clutch member 378. Additionally, as best seen in FIG. 3 of the disclosure and as a non-limiting example, at least a portion of the outer portion 444 of the first sealing member 438 may be sealingly engaged with at least a portion of the inner surface 428 of the first end portion 432 of the housing 426 of the clutch assembly 302. It is therefore to be understood that the first sealing member 438 aids in sealing the clutch assembly 302 thereby aiding into preventing the migration of dirt, debris and/or moisture into the clutch assembly 302. This aids in increasing the overall life and durability of the clutch assembly 302. As a non-limiting example, the first sealing member 438 may be a rotary seal.

The clutch assembly 302 may further include a cover portion 446 having an inner portion 448 and an outer portion 450. According to the embodiment illustrated in FIG. 3 of the disclosure and as a non-limiting example, at least a portion of the cover portion 446 may be interposed between the nut 398 and the first sealing member 438. The cover portion 446 aids in preventing dirt and/or debris from coming into direct contact with the first sealing member 438 thereby aiding in increasing the overall life and durability of the first sealing member 438. In accordance with the embodiment illustrated in FIG. 3 of the disclosure and as a non-limiting example, at least a portion of the inner portion 448 of the cover portion 446 may be integrally connected to and/or sealingly engaged with at least a portion of the outer surface 380 of the intermediate portion 390 of the first clutch member 378. Additionally, in accordance with the embodiment illustrated in FIG. 3 of the disclosure and as a non-limiting example, at least a portion of the outer portion 450 of the cover portion 446 may be disposed radially outboard from at least a portion of the outer surface 430 of the first end portion 432 of the housing 426. It is within the scope of this disclosure and as a non-limiting example that the cover portion 446 may be made of a metallic material or any other type of material having a relatively high impact strength. As a non-limiting example, the cover portion 446 may be a slinger.

One or more first bearing assemblies 452 may be interposed between the housing 426 and the first clutch member 378 of the clutch assembly 302. As best seen in FIG. 3 of the disclosure and as a non-limiting example, at least a portion of the one or more first bearing assemblies 452 may be in direct contact with at least a portion of the outer surface 380 of the first clutch member 378 and the inner surface 428 of the housing 426. It is therefore to be understood that the one or more first bearing assemblies 452 aid in providing rotational support for at least a portion of the first clutch member 378 of the clutch assembly 302. As a non-limiting example, the one or more first bearing assemblies 452 may be one or more roller bearing assemblies, one or more cylindrical roller bearing assemblies, one or more rolling element bearing assemblies, one or more needle bearing assemblies, one or more bushings or one or more ball bearing assemblies.

A second hollow interior portion 454 having a second inner surface 456 may extend inward into at least a portion of the second end 384 of the first clutch member 378.

As best seen in FIGS. 3-3B of the disclosure and as a non-limiting example, the first clutch member 378 may include a wall portion 458 having a first side 462 and/or a second side 460. The wall portion 458 may provide a separation between the first and second hollow interior portions 392 and 454 of the first clutch member 378. As a result, it is within the scope of this disclosure and as a non-limiting example that the first and/or second hollow interior portions 392 and/or 454 may terminate at the wall portion 458. In light of the foregoing, it is therefore to be understood that at least a portion of the first side 462 of the wall portion 458 may form at least a portion of the second hollow interior portion 454 of the first clutch member 378 and at least a portion of the second side 460 of the wall portion 458 may form at least a portion of the first hollow interior portion 392 of the first clutch member 378 of the clutch assembly 302. It is within the scope of this disclosure and as a non-limiting example that the wall portion 458 of the first clutch member 378 may provide structural rigidity and/or a reaction surface for the first clutch member 378 of the clutch assembly 302.

In accordance with the embodiment illustrated in FIGS. 3-3B of the disclosure and as a non-limiting example, at least a portion of a receiving portion 464 may extend inward from at least a portion of the first side 462 of the wall portion 458 and into at least a portion of the wall portion 458 of the first clutch member 378. It is within the scope of this disclosure and as a non-limiting example that the receiving portion 464 may extend either all of the way through the wall portion 458 or only part of the way through the wall portion 458 of the first clutch member 378.

Extending co-axially with at least a portion of the first clutch member 378 of the clutch assembly 302 is a second shaft 466 having a first end 468, a second end 470, a first end portion 472, a second end portion 474, an intermediate portion 475 and an outer surface 476. As best seen in FIGS. 3-3B of the disclosure and as a non-limiting example, at least a portion of the first end portion 472 of the second shaft 466 may be received within at least a portion of the receiving portion 464 of the wall portion 458 of the first clutch member 378. It is within the scope of this disclosure and as a non-limiting example, that the second shaft 466 may be a stub shaft, a pinion gear shaft, a transmission output shaft, a transfer case input shaft, a first transfer case output shaft, a second transfer case output shaft, a power transfer unit input shaft, a power transfer unit output shaft, a differential input shaft, a first differential output shaft, a second differential output shaft, a front differential input shaft, a first front axle differential output shaft, a second front axle differential output shaft, a first front axle half shaft, a second front axle half shaft, a rear differential input shaft, a first rear axle differential output shaft, a second rear axle differential output shaft, a first rear axle half shaft, a rear front axle half shaft, a forward tandem axle input shaft, an inter-axle differential input shaft, a first forward tandem axle differential output shaft, a second forward tandem axle differential output shaft, a first forward tandem axle half shaft, a second forward tandem axle half shaft, an inter-axle differential output shaft, a rear tandem axle differential input shaft, a first rear tandem axle differential output shaft, a second rear tandem axle differential output shaft, a first rear tandem axle half shaft, a second rear tandem axle half shaft, a drive shaft, a propeller shaft or a midship shaft.

Interposed between at least a portion of the first end portion 472 of the second shaft 466 and a surface 465 defining the receiving portion 464 is a second bearing assembly 478. The second bearing assembly 478 provides rotational support for at least a portion of the second shaft 466 thereby allowing the first clutch member 378 to rotate relative to the second shaft 466 when in operation. It is within the scope of this disclosure and as a non-limiting example that the second bearing assembly 478 may be a roller bearing assembly, a rolling element bearing assembly, a needle bearing assembly, a bushing or a ball bearing assembly.

According to the embodiment illustrated in FIG. 3 of the disclosure and as a non-limiting example, the second shaft 466 may include a first reduced diameter portion 480 circumferentially extending along at least a portion of the outer surface 476 of the first end portion 472 of the second shaft 466. The first reduced diameter portion 480 may be used in order to provide a journal surface for at least a portion of the second bearing assembly 478. As a result, it is therefore to be understood that at least a portion of the second bearing assembly 478 may be in direct contact with at least a portion of the first reduced diameter portion 480 of the second shaft 466.

Disposed radially outboard from at least a portion of the outer surface 476 of the intermediate portion 475 of the second shaft 466 is a second clutch member 482 and an actuation assembly 484. As best seen in FIGS. 3-3B of the disclosure and as a non-limiting example, at least a portion of the second clutch member and/or the actuation assembly 484 may be disposed within at least a portion of the second hollow interior portion 436 of the first clutch member 378 of the clutch assembly 302 and/or the hollow portion 436 of the housing 426. The actuation assembly 484 may be used in order to selectively transition the clutch assembly 302 between a disengaged position 498 illustrated in FIGS. 3A, 3D and 3E and an engaged position 500 illustrated in FIGS. 3, 3B, 3F and 3G of the disclosure. It is within the scope of this disclosure and as a non-limiting example, that the actuation assembly 484 may be an electro-magnetic assembly, a ball and ramp assembly, a pneumatic actuation assembly, a linear actuation assembly, a hydraulic actuation assembly, a gear assembly and/or an electric motor assembly.

In accordance with the embodiment illustrated in FIGS. 3-3B of the disclosure and as a non-limiting example, the actuation assembly 484 may include an electro-magnetic actuation assembly 486 having an electro-magnetic coil 488, a housing 490, an armature 492, a first engagement member 494 and/or a second engagement member 496. The electro-magnetic coil 488 may include one or more windings of a material capable of selectively creating and/or removing a magnetic field needed to selectively transition the clutch assembly 302 between the disengaged position 498 and the engaged position 500. It is within with scope of this disclosure and as a non-limiting example that the one or more coils may be one or more copper windings disposed within an overmould material (not shown) surrounding and/or encapsulating at least a portion of the one or more copper windings of the electro-magnetic coil 488.

As best seen in FIGS. 3-3B of the disclosure and as a non-limiting example, the housing 490 of the actuation assembly 484 may include a first housing portion 502 and/or a second housing portion 504. According the embodiment illustrated in FIGS. 3-3B of the disclosure and as a non-limiting example, the first portion 502 of the housing 490 of the actuation assembly 484 may have a first end 506, a second end 508, an inner surface 510 and an outer surface 512. At least a portion of the first housing portion 502 may be drivingly connected to at least a portion of the second end portion 388 of the first clutch member 378 of the clutch assembly 302. It is therefore to me understood that at least a portion of the first housing portion 502 may be integrally connected to at least a portion of the first clutch member 378 and may be able to fixed for rotation with the first clutch member 378 of the clutch assembly 302.

Circumferentially extending along at least a portion of the outer surface 512 of the first housing portion 502 is a plurality of splines 514. The plurality of splines 514 on the outer surface 510 of the first housing portion 502 may be complementary to and meshingly engaged with at least a portion of a second plurality of splines 516 circumferentially extending along at least a portion of the second end portion 388 of the second inner surface 456 of the second hollow interior portion 454 of the first clutch member 378.

At least a portion of a second O-ring 518 may be sealingly engaged with at least a portion of the outer surface 512 of the first housing portion 502 and at least a portion of the second inner surface 456 of the first clutch member 378 of the clutch assembly 302. This aids in preventing the migration of dire, debris and/or moisture into the clutch assembly 302 thereby aiding in increasing the overall life and durability of the clutch assembly 302. In accordance with the embodiment illustrated in FIGS. 3-3B of the disclosure and as a non-limiting example, the second O-ring 518 may be interposed between the first end 506 of the first housing portion 502 and the plurality of splines 514 of the first housing portion 502.

In accordance with the embodiment illustrated in FIGS. 3-3B of the disclosure and as a non-limiting example, at least a portion of the second O-ring 518 may be disposed within at least a portion of a second O-ring groove 519. The second O-ring groove 519 may circumferentially extend along at least a portion of the outer surface 512 of the first housing portion 502. The second O-ring groove 519 may be of a size and shape to receive and/or retain at least a portion of the second O-ring 518 therein.

One or more second bearing assemblies 520 may be interposed between at least a portion of the inner surface 510 of the first housing portion 502 and the outer surface 476 of the second end portion 474 of the second shaft 466. The one or more second bearing assemblies 520 allows the housing 490 to rotate relative to the second shaft 466 when in operation. It is within the scope of this disclosure and as a non-limiting example that the one or more second bearing assemblies 520 may be one or more roller bearing assemblies, one or more cylindrical roller bearing assemblies, one or more rolling element bearing assemblies, one or more needle bearing assemblies, one or more bushings or one or more ball bearing assemblies.

At least a portion of a third O-ring 522 may be sealingly engaged with at least a portion of the inner surface 510 of the first housing portion 502 and at least a portion of the outer surface 476 of the second end portion 474 of the second shaft 466. This aids in preventing the migration of dire, debris and/or moisture into the clutch assembly 302 thereby aiding in increasing the overall life and durability of the clutch assembly 302. In accordance with the embodiment illustrated in FIGS. 3-3B of the disclosure and as a non-limiting example, the third O-ring 522 may be interposed between the first end 506 of the first housing portion 502 and the one or more second bearing assemblies 520.

In accordance with the embodiment illustrated in FIGS. 3-3B of the disclosure and as a non-limiting example, at least a portion of the third O-ring 522 may be disposed within at least a portion of a third O-ring groove 524. The third O-ring groove 524 may circumferentially extend along at least a portion of the inner surface 510 of the first housing portion 502. The third O-ring groove 524 may be of a size and shape to receive and/or retain at least a portion of the third O-ring 522 therein.

Extending inward into at least a portion of the first housing portion 502 from at least a portion of the second end 508 of the first housing portion 502 is a hollow interior portion 526. As illustrated in FIGS. 3-3B of the disclosure and as a non-limiting example, at least a portion of the second housing portion 506 may be disposed within the hollow interior portion 526 of the first housing portion 502. It is therefore to be understood that the hollow interior portion 526 of the first housing portion 502 may be of a size and shape to receive and/or retain at least a portion of the second housing portion 504.

The second housing portion 504 may have an inner surface 528 and an outer surface 530. Circumferentially extending along at least a portion of the outer surface 530 of the second housing part 504 is a reduced diameter portion 532. In accordance with the embodiment illustrated in FIG. 3-3B of the disclosure and as a non-limiting example, the reduced diameter portion 532 of the second housing portion 504 may be of a size and shape to receive and/or retain at least a portion of the electro-magnetic coil 488 of the actuation assembly 484. As a result, it is therefore to be understood that the first housing portion 502 and the second housing portion 504 may surround all or part of the electro-magnetic coil 488 of the actuation assembly 484.

Interposed between the inner surface 528 of the second housing portion 504 and a surface 534 defining the hollow interior portion 526 of the first housing portion 502 is one or more third bearing assemblies 536. The one or more third bearing assemblies 536 allow the first housing portion 502 to rotate relative to the second housing portion 504 when in operation. It is within the scope of this disclosure and as a non-limiting example that the one or more third bearing assemblies 536 may be one or more roller bearing assemblies, one or more cylindrical roller bearing assemblies, one or more rolling element bearing assemblies, one or more needle bearing assemblies, one or more bushings or one or more ball bearing assemblies.

At least a portion of one or more axially extending portions 538 may extend outward from at least a portion of the first end 506 of the first housing portion 502. It is within the scope of this disclosure and as a non-limiting example that the one or more axially extending portions 538 may provide one or more reaction surfaces for at least a portion of the actuation assembly 484 of the clutch assembly 302.

The electro-magnetic coil 488 of the actuation assembly 484 may be in communication with a source of electrical power 540 and/or an electronic control unit (ECU) 542. Upon the occurrence of one or more first pre-determined operating conditions and/or instruction from the vehicle operator (not shown), the ECU 542 may instruct the source of electrical power to 540 to supply the electro-magnetic coil 488 with an amount of electrical energy needed to create a magnetic field 544. The magnetic field 544 generated by the electro-magnetic coil 488 may be of a strength needed to transition the clutch assembly 302 from the disengaged position 498 to the engaged position 500. Additionally, upon the occurrence of one or more second pre-determined operating conditions and/or second instruction from the vehicle operator (not shown), the ECU may instruct the source of electrical power 540 to stop or reduce the amount of electrical power supplied to the electro-magnetic coil 488. This reduces the overall strength of the magnetic field 544 or eliminates the magnetic field 544 generated by the electro-magnetic coil 488 thereby allowing the clutch assembly 302 to transition from the engaged position 500 to the disengaged position 498.

According to the embodiment illustrated in FIGS. 3-3B, 3E and 3G of the disclosure and as a non-limiting example, one or more receiving portions 546 may extend inward into at least a portion of the first side 462 of the wall portion 458 of the first clutch member 378 of the clutch assembly 302. The one or more receiving portions 546 in the wall portion 458 of the first clutch member 378 may be of a size and shape to receive and/or retain at least a portion of the second clutch member 482 of the clutch assembly 302. When at least a portion of the second clutch member 482 is engaged with and/or is received within at least a portion of the one or more receiving portions 546, the clutch assembly 302 may be in the engaged position 500. As a result, an amount of rotational power is able to be transmitted from the second joint member 306 of the joint assembly 300 to the second shaft 466 or from the second shaft 466 to the second joint member 306. When the second clutch member 482 is not engaged with and/or is not received within at least a portion of the one or more receiving portions 546, the clutch assembly 302 is in the disengaged position 498. As a result, an amount of rotational power is unable to be transmitted from the second joint member 306 of the joint assembly 300 to the second shaft 466 or from the second shaft 466 to the second joint member 306.

The one or more receiving portions 546 in the wall portion 458 of the first clutch member 378 may include one or more first sloped surfaces 548 and/or one or more second sloped surfaces 549 extending from a bottom portion 550 of the one or more receiving portions 546 to the first side 462 of the wall portion 458 of the first clutch member 378. The one or more first and second sloped surfaces 548 and 549 of the first clutch member 378 may provide the first clutch member 378 with one or more outwardly extending portions 551. It is within the scope of this disclosure and as a non-limiting example that the bottom portion 550, the one or more first sloped surfaces 548 and/or the one or more second sloped surfaces 549 of the one or more receiving portions 546 in the wall portion 458 of the first clutch member 378 may provide a reaction surface for at least a portion of the second clutch member 482 allowing for the selective transition of the clutch assembly 302 between the engaged position 500 and the disengaged position 498. In accordance with the embodiment illustrated in FIGS. 3-3B, 3E and 3G of the disclosure and as a non-limiting example, the one or more first sloped surfaces 548 may extend at the same angle $\theta1$ relative to a centerline C1 of the clutch assembly 302 and the one or more second sloped surfaces 549 may extend at an angle $\theta2$ relative to the centerline C1. As a non-limiting example, the one or more second sloped surfaces 549 may be a mirror image of the one or more first sloped surfaces 548 of the first clutch member 378 of the clutch assembly 302. It is within the scope of this disclosure and as a non-limiting example that the angles $\theta1$ and $\theta2$ of the one or more first and second sloped surfaces 548 and 549 may be substantially equal to each other and/or the angles $\theta1$ and $\theta2$ of the one or more first and second sloped surfaces 548 and 549 may be different from each other. As a non-limiting example, the one or more outwardly extending portions 551 and/or the one or more receiving portions 546 of the first clutch member 378 may have a substantially conical cross-sectional shape and/or a substantially frusto-conical cross-sectional shape.

Figure 3A:
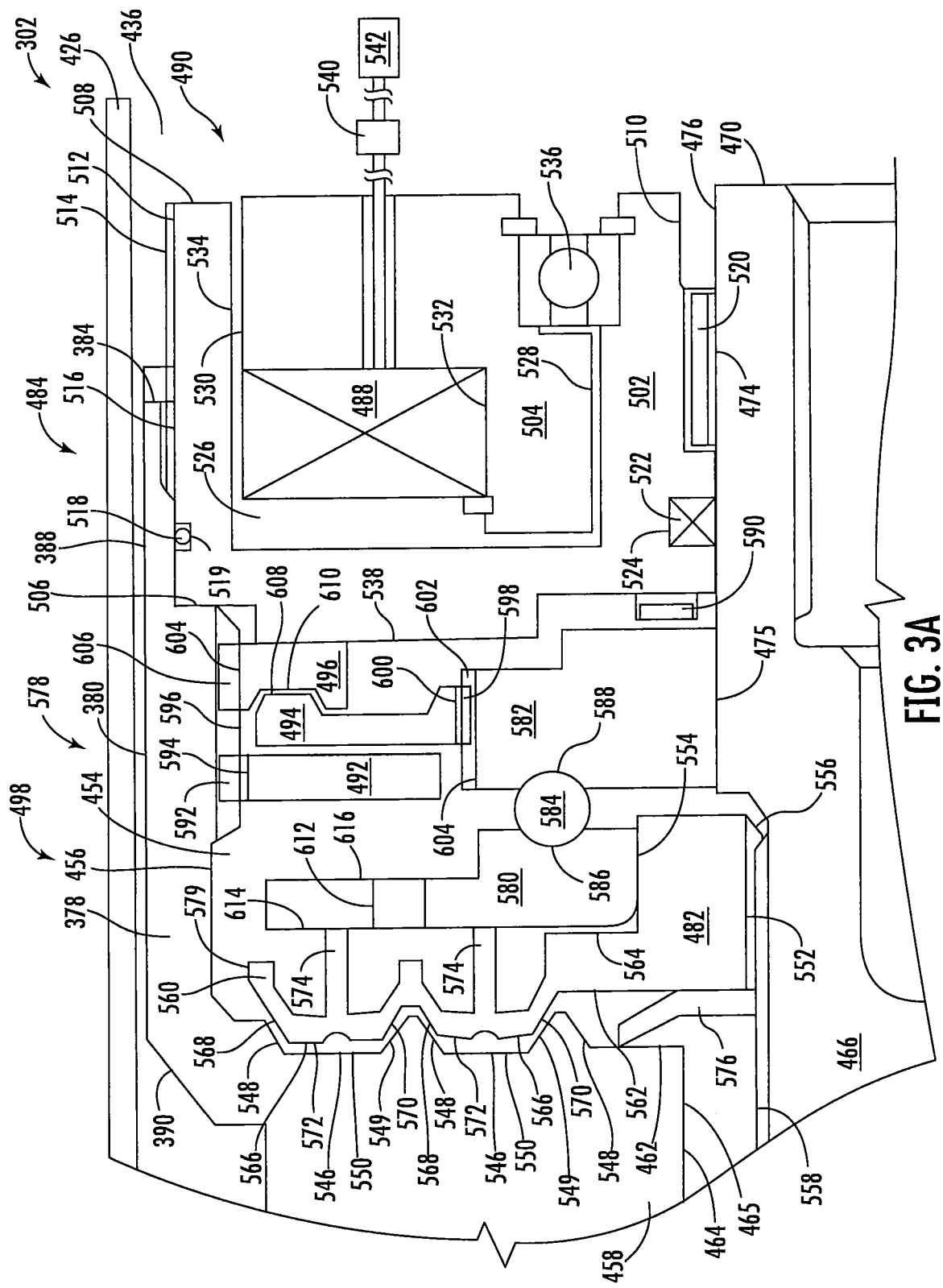
FIG. 3A is cut-away schematic side-view of a portion of the joint assembly and clutch assembly illustrated in FIG. 3 of the disclosure when clutch assembly is in a disengaged position.
Figure 3B:
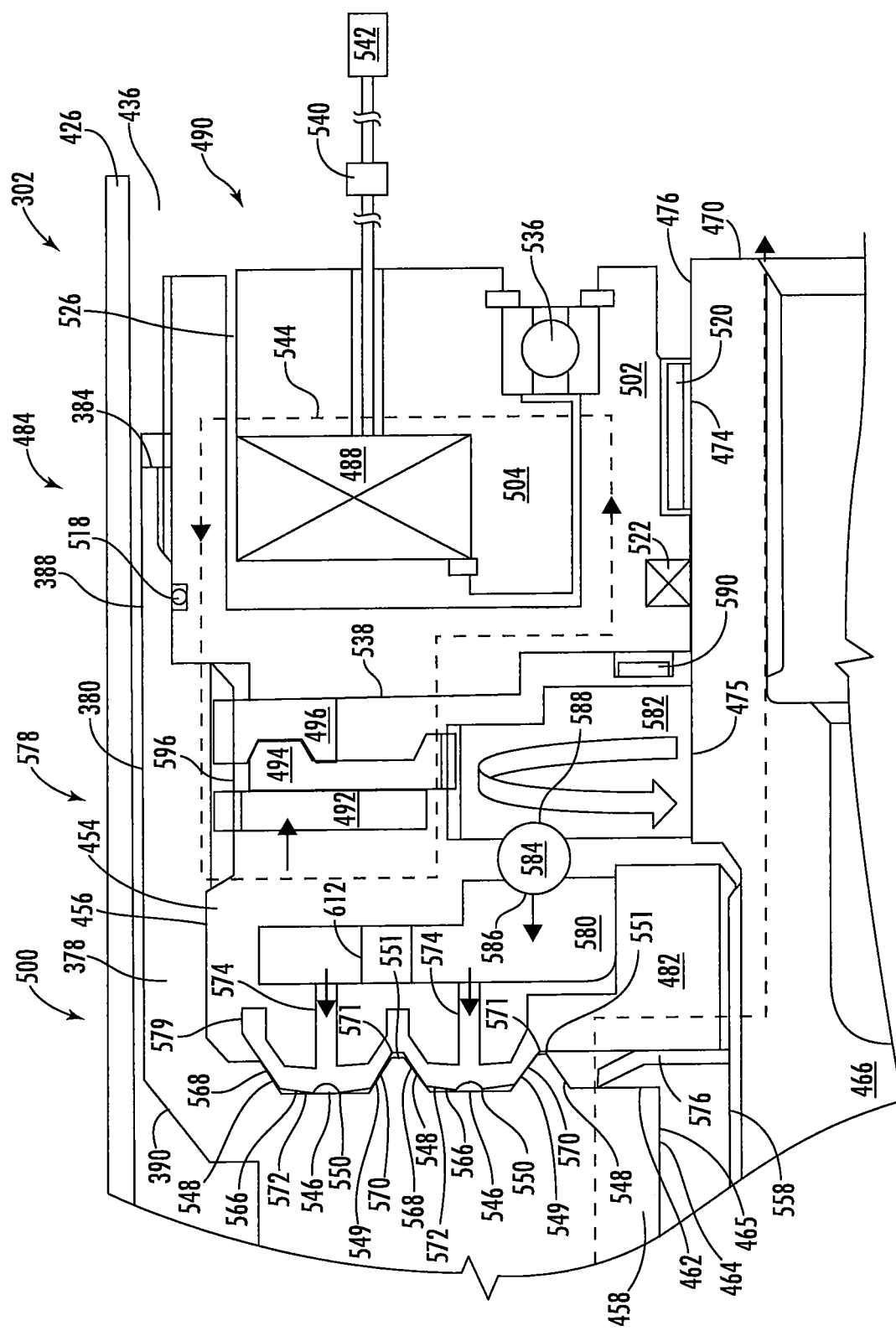
FIG. 3B is cut-away schematic side-view of a portion of the joint assembly and clutch assembly illustrated in FIGS. 3 and 3A of the disclosure when the clutch assembly is in an engaged position.

As best seen in FIG. 3A of the disclosure and as a non-limiting example, the second clutch member 482 may have an inner surface 552 and an outer surface 554. Circumferentially extending along at least a portion of the inner surface 552 of the second clutch member 482 is a plurality of splines 556. The plurality of splines 556 on the inner surface 552 of the second clutch member 482 may be complementary to and meshingly engaged with at least a portion of a plurality of second shaft splines 558 circumferentially extending along at least a portion of the intermediate portion 475 of the second shaft 466. It is therefore to be understood that at least a portion of the second clutch member 482 may be drivingly connected to at least a portion of the second shaft 466.

Circumferentially extending outward from at least a portion of the outer surface 554 of the second clutch member 482 is an increased diameter portion 560 having a first side 562 and a second side 564. Extending outward from at least a portion of the first side 562 of the increased diameter portion 560 of the second clutch member 482 is one or more first engagement portions 566. The one or more first engagement portions 566 may be of a size and shape to be received and/or retained within at least a portion of the one or more receiving portions 546 in the wall portion 458 of the first clutch member 378. When the clutch assembly 302 is in the disengaged position 498, the one or more first engagement portions 566 of the second clutch member 482 are not engaged with the one or more receiving portions 546 in the first clutch member 378. Additionally, when the clutch assembly 302 is in the engaged position 500, the one or more first engagement portions 566 of the second clutch member 482 are engaged with the one or more receiving portions 546 in the first clutch member 378.

In accordance with the embodiment illustrated in FIGS. 3-3B, 3E and 3G of the disclosure and as a non-limiting example, the one or more first engagement portions 566 of the second clutch member 482 may have one or more first sloped surfaces 568 and/or one or more second sloped surfaces 570 extending from the first side 562 to an outboard surface 572 of the one or more first engagement portions 566. The one or more first and second sloped surfaces 568 and 570 of the second clutch member 482 may be complementary to the one or more first and second sloped surfaces 548 and 549 of the first clutch member 378. It is within the scope of this disclosure and as a non-limiting example that the outboard surface 572, the one or more first sloped surfaces 568 and/or the one or more second sloped surfaces 570 of the one or more first engagement portions 566 of the second clutch member 482 may provide a reaction surface for at least a portion of the second clutch member 482 thereby allowing the clutch assembly 302 to selectively transition between the engaged 500 and the disengaged position 498. In accordance with the embodiment illustrated in FIGS. 3-3B, 3E and 3G of the disclosure and as a non-limiting example, the one or more first sloped surfaces 568 may extend at the same angle θ3 relative to the centerline C1 and the one or more second sloped surfaces 570 may extend at an angle θ4 relative to the centerline C1 of the clutch assembly 302. As a non-limiting example, the one or more second sloped surfaces 570 may be a mirror image of the one or more first sloped surfaced 568 of the second clutch member 482 of the clutch assembly 302. It is within the scope of this disclosure and as a non-limiting example that the angles θ3 and θ4 of the one or more first and second sloped surfaces 568 and 570 may be substantially equal to each other and/or the angles θ3 and θ4 of the one or more first and second sloped surfaces 568 and 570 may be different from each other.

The one or more first and second sloped surfaces 568 and 570 may provide the second clutch member 482 with one or more receiving portions 571. As best seen in FIG. 3B of the disclosure and as a non-limiting example, the one or more receiving portions 571 of the second clutch member 482 may be of a size and shape to receive and/or retain at least a portion of the one or more outwardly extending portions 551 of the first clutch member 378 therein. It is therefore within the scope of this disclosure and as a non-limiting example that the one or more receiving portions 571 and/or the one or more outwardly extending portions 551 may have a substantially conical cross-sectional shape and/or a substantially frusto-conical cross-sectional shape.

When the clutch assembly 302 is in the disengaged position 498 illustrated in FIGS. 3A and 3E and as a non-limiting example, the one or more first sloped surfaces 568, the one or more second sloped surfaces 570 and/or the outboard surface 572 of the one or more first engagement portions 566 of the second clutch member 482 are not engaged with the one or more first sloped surfaces 548, the one or more second sloped surfaces 549 and/or the bottom portion 550 of the one or more receiving portions 546 of the first clutch member 378. When the clutch assembly 302 is in the engaged position 500 illustrated in FIGS. 3, 3B, and 3G, at least a portion of the one or more first sloped surfaces 568, the one or more second sloped surfaces 570 and/or the outboard surface 572 of the one or more first engagement portions 566 of the second clutch member 482 may be engaged with at least a portion of the one or more first sloped surfaces 548, the one or more second sloped surfaces 549 and/or the bottom portion 550 of the one or more receiving portions 546 of the first clutch member 378. As a non-limiting example, the engagement between the one or more receiving portions 546 of the first clutch member 378 and the one or more first engagement portions 566 of the second clutch member 482, when in the engaged position 500, may be a locking engagement (i.e. a dog tooth like engagement) and/or a frictional engagement. It is therefore to be understood that the frictional engagement between the first and second clutch members 378 and 482 may be enough to allow substantially all or a variable amount of rotational force to be transmitted from the first clutch member 378 to the second shaft 466 or may be enough to allow substantially all or a variable amount of rotational force to be transmitted from the second shaft 466 to the first clutch member 378.

In light of the foregoing, it is within the scope of this disclosure and as a non-limiting example that the clutch assembly 302 may be a dog clutch assembly, a friction clutch assembly or a wedge clutch assembly.

One or more second engagement portions 574 may extend outward from at least a portion of the second side 564 of the increased diameter portion 560 of the second clutch member 482 of the clutch assembly 302. As illustrated in FIGS. 3A, 3B, 3E and 3G of the disclosure and as a non-limiting example, the one or more second engagement portions 574 extend away from the one or more first engagement portions 566 of the second clutch member 482 toward the actuation assembly 484 of the clutch assembly 302. The one or more second engagement portions 574 allow the actuation assembly 484 to apply an even amount of force onto the second clutch member 482 when transitioning from the disengaged position 498 to the engaged position 500.

One of more slots 575 may extend from at least a portion of an outermost surface 579 of the second clutch member 482 toward the inner surface 552 of the second clutch member 482 of the clutch assembly 302. The one or more slots 575 in the second clutch member 482 may be of a size and shape needed to allow the second clutch member to be elastically deformed when the clutch assembly 302 is in the engaged position 500. In accordance with the embodiment illustrated in FIGS. 3C, 3D and 3F and as a non-limiting example, the one or more slots 575 may have a first end portion 581 and a second end portion 583 having a substantially circular portion 585. It is within the scope of this disclosure and as a non-limiting example that at least a portion of the substantially circular portion 585 of the second clutch member 482 may be disposed inward from at least a portion of the increased diameter portion 560 of the second clutch member 482.

In accordance with an embodiment of the disclosure and as a non-limiting example, the one or more slots 575 may allow an amount of fluid (not shown) to be transmitted therethrough. It is within the scope of this disclosure and as a non-limiting example that the fluid (not shown) may be a lubrication fluid and/or any other type of fluid that is capable of reducing the overall amount of heat generated by the engagement of the first and second clutch members 378 and 482 when in the engaged position 500. Additionally, it is within the scope of this disclosure and as a non-limiting example, that the fluid (not shown) may be a lubrication fluid and/or any other type of fluid that is capable of lubricating the various components of the joint assembly 300 and/or the clutch assembly 302 when in operation. Furthermore, it is within the scope of this disclosure and as a non-limiting example that the fluid (not shown) may be a lubrication fluid and/or any other type of fluid that is capable of removing an amount of wear particles from the joint assembly 300 and/or the clutch assembly 302 when in operation. This aids in increasing the overall life and durability of the joint assembly 300 and/or the clutch assembly 302.

According to the embodiment illustrated in FIGS. 3C and 3D and as a non-limiting example, when the clutch assembly 302 is in the disengaged position 498, the walls 587 of the one or more slots 575 in the second clutch member 482 may be substantially parallel to each other. As the second clutch member 482 is transitioned from the disengaged position 498 to the engaged position 500 illustrated in FIGS. 3B, 3F and 3G, the second clutch member 482 is elastically deformed by the first clutch member 378 thereby driving the walls 587 of the one or more slots 575 toward each other. This allows for the first clutch member 378 to become frictionally engaged with the second clutch member 482 allowing for an amount of rotational power to be transmitted from the first clutch member 378 to the second shaft 466.

The clutch assembly 302 may further include one or more first biasing members 576. As best seen in FIGS. 3A and 3B of the disclosure and as a non-limiting example, at least a portion of the one or more first biasing members 576 may be interposed between at least a portion of the first clutch member 378 and the second clutch member 482 of the clutch assembly 302. The one or more first biasing members 576 may aid in selectively transitioning the clutch assembly 302 between the engaged position 500 and the disengaged position 498. When the clutch assembly 302 is in the engaged position 500, the one or more first biasing members 576 may be compressed and loaded with an amount of energy therein. When the actuation assembly 484 stops applying an amount of engagement force onto the second clutch member 482, the energy stored within the one or more first biasing members 576 may be released thereby forcing the second clutch member 482 out of engagement with the first clutch member 378 and transitioning the clutch assembly 302 into the disengaged position 498. Additionally, it is to be understood that the one or more first biasing members 576 may be used in order to aid in preventing the second clutch member 482 from inadvertently and therefore unintentionally becoming engaged with the first joint member 378. It is within the scope of this disclosure and as a non-limiting example that the one or more first biasing members 576 may be one or more springs, one or more coil springs, and/or one or more wave springs capable of transitioning the second clutch member 482 out of engagement with the first clutch member 378.

At least a portion of a ball and ramp assembly 578 may be interposed between the second clutch member 482 and the housing 490. As best seen in FIGS. 3A and 3B of the disclosure and as a non-limiting example, the ball and ramp assembly 578 may include a first plate 580, a second plate 582 and one or more balls 584 interposed between the first and second plates 580 and 582 of the ball and ramp assembly 578. The first plate 580 may have one or more first plate grooves 586 having a variable depth and the second plate 582 may have one or more second plate grooves 588 having a variable depth. The one or more first plate grooves 586 may be complementary to the one or more second plate grooves 588. At least a portion of the one or more balls 548 may be disposed within at least a portion of the one or more first and second plate grooves 586 and 588 in the first and second plates 580 and 582 of the ball and ramp assembly 578. As the first and/or second plate 580 and/or 582 rotate, the one or more balls 584 travel along the one or more first plate grooves 586 and 588 forcing the first plate 580 axially away from the second plate 582 of the ball and ramp assembly 578 and toward the second clutch member 482 of the clutch assembly 302. Once at least a portion of the first plate 580 is in direct contact with at least a portion of the one or more second engagement portions 574 of the second clutch member 482, the first plate 580 will drive the second clutch member 482 toward the first clutch member 378 thereby transitioning the clutch assembly 302 from the disengaged position 498 to the engaged position 500.

One or more fourth bearing assemblies 590 may be interposed between at least a portion of the housing 490 and the second plate 582 of the ball and ramp assembly 578. The one or more fourth bearing assemblies 590 may be one or more thrust bearing assemblies that allow the second plate 582 to rotate relative to the housing 490. It is within the scope of this disclosure and as a non-limiting example that the one or more fourth bearing assemblies 590 may be one or more roller bearing assemblies, one or more cylindrical roller bearing assemblies, one or more rolling element bearing assemblies, one or more needle bearing assemblies, one or more bushings or one or more ball bearing assemblies.

In accordance with the embodiment illustrated in FIGS. 3-3B of the disclosure and as a non-limiting example, the armature 492, the first engagement member 494 and/or the second engagement member 496 may be used in order to aid in rotating the first and/or second plate 580 and/or 582 of the ball and ramp assembly 578. As best seen in FIG. 3A of the disclosure and as a non-limiting example, the armature 492 may have a plurality of splines 592 circumferentially extending along at least a portion of an outer surface 594 of the armature 492. The plurality of splines 592 on the outer surface 594 of the armature 492 may be complementary to and meshingly engaged with at least a portion of a third plurality of splines 596 circumferentially extending along at least a portion of the second inner surface 456 of the second hollow interior portion 454 of the first clutch member 378. As a result, it is therefore to be understood that the armature 492 may be drivingly connected to at least a portion of the first clutch member 378 of the clutch assembly 300. It is within the scope of this disclosure and as a non-limiting example that the third plurality of splines 596 on the first clutch member 378 may have an innermost diameter that is less than an innermost diameter of the second plurality of splines 516 on the first clutch member 378.

At least a portion of the first engagement member 494 may be interposed between the armature 492 and the second engagement member 496 of the actuation assembly 484. The first engagement member 494 may have a size and shape needed to allow at least a portion of the first engagement member 494 to selectively engage with at least a portion of the second engagement member 496. In accordance with the embodiment illustrated in FIGS. 3-3B of the disclosure and as a non-limiting example, the first engagement member 494 may include a plurality of splines 598 circumferentially extending along at least a portion of an inner surface 600 of the first engagement member 494. The plurality of splines 598 on the inner surface 600 of the first engagement member 494 may be complementary to and meshingly engaged with at least a portion of a plurality of splines 602 circumferentially extending along at least a portion of an outer surface 604 of the second plate 582 of the ball and ramp assembly 578. It is therefore to be understood that the first engagement member 494 may be drivingly connected to at least a portion of the second plate 582 of the ball and ramp assembly 578.

Additionally, at least a portion of the second engagement member 496 may be drivingly connected to at least a portion of the first clutch member 378 of the actuation assembly 484. In accordance with the embodiment illustrated in FIGS. 3-3B of the disclosure and as a non-limiting example, at least a portion of the second engagement member 496 may be interposed between at least a portion of the first engagement member 494 and the housing 490 of the actuation assembly 484. Circumferentially extending from at least a portion of an outer surface 604 of the second engagement member 496 is a plurality of splines 606. The plurality of splines 606 of the second engagement member 496 may be complementary to and meshingly engaged with at least a portion of the third plurality of splines 596 of the first clutch member 378 of the clutch assembly 302.

According to the embodiment illustrated in FIGS. 3-3B of the disclosure and as a non-limiting example, the first engagement member 494 may include one or more first engagement portions 608 that is selectively engagable with at least a portion of one or more second engagement portions 610 of the second engagement member 496 of the actuation assembly 484. In accordance with an embodiment illustrated in FIGS. 3-3B as a non-limiting example, the one or more first engagement portions 608 of the first engagement member 494 may be an axially extending portion and the one or more second engagement portions 610 may be a receiving portion having a size and shape to receive and/or retain at least a portion of the one or more first engagement portions 608 of the first engagement member 494. When the first engagement member 494 is not engaged with the second engagement member 496, the ball and ramp assembly 578 is not being rotated and the clutch assembly 302 is in the disengaged position 498. Additionally, when the first engagement member 494 is engaged with at least a portion of the second engagement member 496, an amount of rotational power from the first clutch member 378 is transmitted from the first clutch member 378 to the second plate 582 of the ball and ramp assembly 578. This allows the ball and ramp assembly 578 to transition the clutch assembly 302 from the disengaged position 498 illustrated in FIG. 3A to the engaged position 500 illustrated in FIG. 3B.

As a non-limiting example, the engagement between the one or more first and second engagement portions 608 and 610 of the first and second engagement members 494 and 496 of the actuation assembly 484 may be a locking engagement (i.e. a dog tooth like engagement) and/or a frictional engagement. It is therefore to be understood that the frictional engagement between the one or more first and second engagement portions 608 and 610 may be enough to allow substantially all or a portion of rotational force to be transmitted from the first clutch member 378 to the second plate 582 of the ball and ramp assembly 578. As a result, it is therefore to be understood that at least a portion of the rotational force from the first clutch member 378 may be used in order to rotate the ball and ramp assembly 578 and therefore transition the clutch assembly 302 from the disengaged position 498 to the engaged position 500.

It is within the scope of this disclosure and as a non-limiting example that the armature 492, the first engagement member 494 and/or the second engagement member 496 may be made of a magnetic material that is capable of interacting with the magnetic field 544 generated by the electro-magnetic coil 488. When the ECU 542 instructs the source of electrical power 540 to provide the electro-magnetic coil 488 with the power needed to create the magnetic field 544, the magnetic field 544 may drive the armature 492 toward the electro-magnetic coil 488. As a result, the armature 492 may be used in order to drive the first engagement member 494 into engagement with the second engagement member 496 of the actuation assembly 484 and therefore transition the clutch assembly 302 from the disengaged position 498 to the engaged position 500.

In accordance with the embodiment illustrated in FIGS. 3A and 3B of the disclosure and as a non-limiting example, the second plate 580 may include one or more second plate apertures 612 extending from a first side 614 to a second side 616 of the first plate 580. The one or more second plate apertures 612 may be of a size and shape needed to allow an amount of fluid (not shown) to be transmitted therethrough. As a non-limiting example, the one or more second plate apertures 612 may be interposed between the one or more second engagement portions 574 of the second clutch member 482. It is within the scope of this disclosure and as a non-limiting example that the fluid (not shown) may be a lubrication fluid and/or any other type of fluid that is capable of reducing the overall amount of heat generated by the engagement of the first and second clutch members 378 and 482 when in the engaged position 500. Additionally, it is within the scope of this disclosure and as a non-limiting example, that the fluid (not shown) may be a lubrication fluid and/or any other type of fluid that is capable of lubricating the various components of the joint assembly 300 and/or the clutch assembly 302 when in operation. Furthermore, it is within the scope of this disclosure and as a non-limiting example that the fluid (not shown) may be a lubrication fluid and/or any other type of fluid that is capable of removing an amount of wear particles from the joint assembly 300 and/or the clutch assembly 302 when in operation. This aids in increasing the overall life and durability of the joint assembly 300 and/or the clutch assembly 302.

By providing the clutch assembly 302 with a first clutch member 378 and a second clutch member 482 as described and illustrated herein, the amount of frictional engagement between the first and second clutch members 378 and 482 is increased over conventional friction clutch assembly designs. This aids in providing a clutch assembly 302 having an increased overall functionality and reliability. Additionally, by providing the joint assembly 300 with a clutch assembly 302 as described and illustrated herein, the joint and/or clutch assemblies 300 and/or 302 are lighter, have a more compact packaging size, have fewer components, are less complex, are easier to assemble, are lighter, and are more cost efficient.

Figure 4:
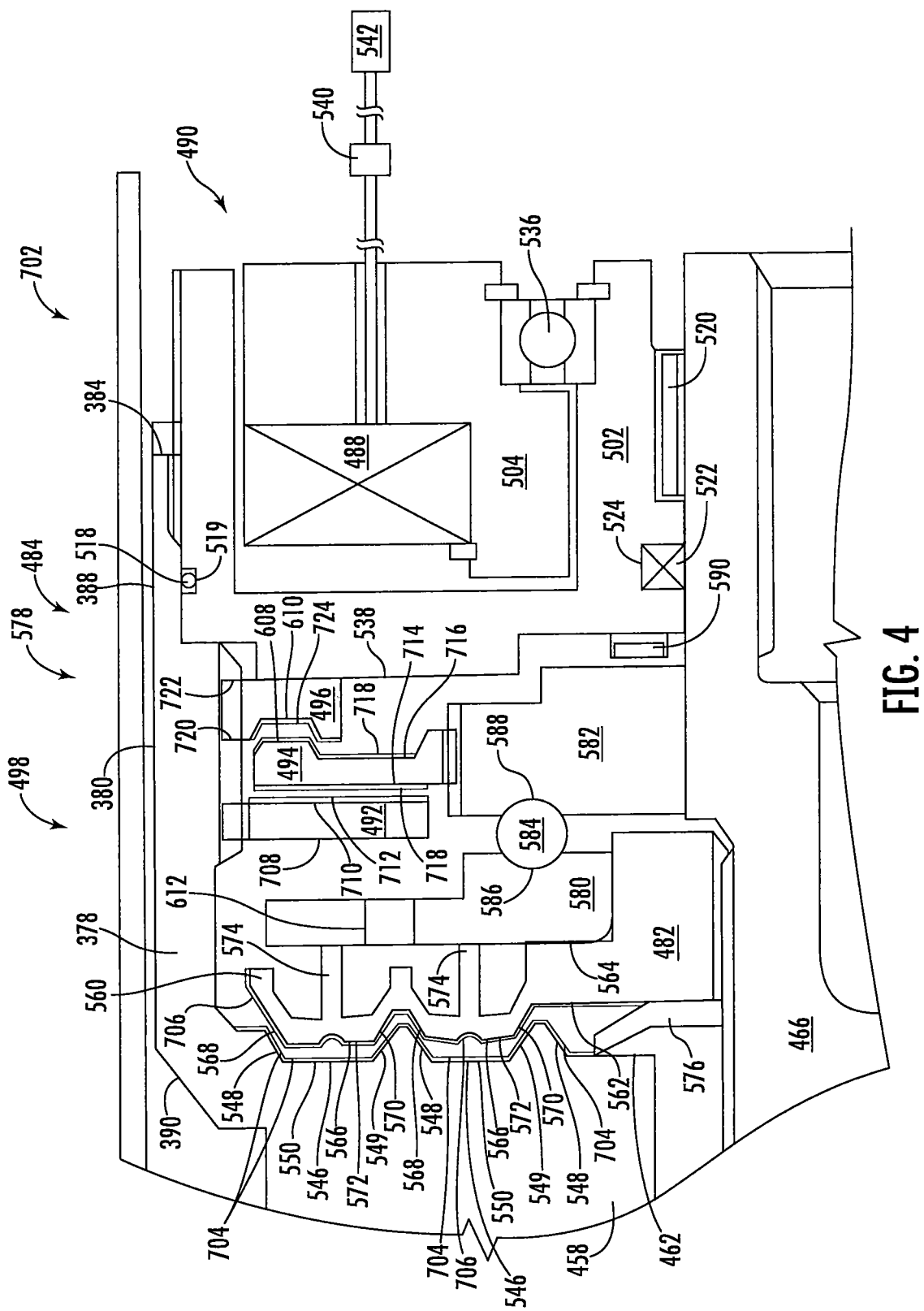
FIG. 4 is a cut-away schematic side-view of a portion of the clutch assembly illustrated in FIGS. 3-3G according to an alternative embodiment of the disclosure.

FIG. 4 is a cut-away schematic side-view of a portion of a clutch assembly 702 according to an alternative embodiment of the disclosure. The clutch assembly 702 illustrated in FIG. 4 is the same as the clutch assembly 302 illustrated in FIGS. 3-3G, except where specifically noted below. In accordance with the embodiment illustrated in FIG. 4 of the disclosure and as a non-limiting example, the first clutch member 378, the second clutch member 482, the armature 492, the first engagement member 494 and/or the second engagement member 496 may include one or more coatings thereon in order to increase the frictional engagement between the various components.

As illustrated in FIG. 4 of the disclosure and as a non-limiting example, at least a portion of the first side 462 of the wall portion 458 of the first clutch member 378 may include one or more coatings 704 thereon. The one or more coatings 704 on the first side 462 of the wall portion 458 of the first clutch member 378 may be substantially continuous or discontinuous along at least a portion of the first side 462 of the wall portion 458. Additionally, the one or more coatings 704 on the first clutch member 378 may be utilized in order to increase the overall frictional engagement between the first and second clutch members 378 and 482 of the clutch assembly 702. It is within the scope of this disclosure and as a non-limiting example that the one or more coatings 704 may be bonded directly to, adhesively attached to and/or connected to at least a portion of the first clutch member 378 of the clutch assembly 702. As a non-limiting example, the one or more coatings 704 may be made of one or more friction materials, one or more brake lining materials, a plurality of aramid fibres, a plurality of cellulose mineral fibres, a plurality of glass fibres, a plurality of copper fibres, a plurality of steel fibres, one or more carbon composite materials, one or more ceramic materials and/or any other type of material that is heat resistant and has a high coefficient of dynamic friction.

According to an embodiment of the disclosure and as a non-limiting example, the one or more coatings 704 on the first clutch member 378 may be disposed on at least a portion of the one more receiving portions 546 in the first side 462 of the wall portion 458 of the first clutch member 378. In accordance with the embodiment illustrated in FIG. 4 of the disclosure and as a non-limiting example, at least a portion of the one or more coatings 704 may be disposed on at least a portion of the bottom portion 550, the one or more first sloped surfaces 548 and/or the one or more second sloped surfaces 549 of the one or more receiving portions 546 of the first clutch member 378.

It is within the scope of this disclosure and as a non-limiting example that the one or more coatings 704 on the first clutch member 378 may include one or more apertures, one or more grooves, one or more recesses, one or more patterns and/or one or more surface features. This aids in increasing the surface area of the one or more coatings 704 and therefore aids in increasing the overall frictional engagement between the first and second clutch members 378 and 482 of the clutch assembly 702 when the clutch assembly 702 is in the engaged position 500.

In accordance with the embodiment illustrated in FIG. 4 and as a non-limiting example, at least a portion of the first side 562 of the increased diameter portion 560 of the second clutch member 482 may include one or more coatings 706 thereon. The one or more coatings 706 on the first side 562 of the increased diameter portion 560 of the second clutch member 482 may be substantially continuous or discontinuous along at least a portion of the first side 562 of the increased diameter portion 560 of the second clutch member 482. Additionally, the one or more coatings 706 on the second clutch member 482 may be utilized in order to increase the overall frictional engagement between the first and second clutch members 378 and 482 of the clutch assembly 702. It is within the scope of this disclosure and as a non-limiting example that the one or more coatings 706 may be bonded directly to, adhesively attached to and/or connected to at least a portion of the second clutch member 482 of the clutch assembly 702. As a non-limiting example, the one or more coatings 706 may be made of one or more friction materials, one or more brake lining materials, a plurality of aramid fibres, a plurality of cellulose mineral fibres, a plurality of glass fibres, a plurality of copper fibres, a plurality of steel fibres, one or more carbon composite materials, one or more ceramic materials and/or any other type of material that is heat resistant and has a high coefficient of dynamic friction.

As illustrated in FIG. 4 of the disclosure and as a non-limiting example, the one or more coatings 706 on the second clutch member 482 may be disposed on at least a portion of the one or more first engagement portions 566 in the first side 562 of the increased diameter portion 560 of the second clutch member 482. In accordance with the embodiment illustrated in FIG. 4 and as a non-limiting example, at least a portion of the one or more coatings 706 may be disposed on at least a portion of the outboard surface 572, the one or more first sloped surfaces 568 and/or the one or more second sloped surfaces 570 of the one or more first engagement portions 566 of the second clutch member 482.

It is within the scope of this disclosure and as a non-limiting example that the one or more coatings 706 on the second clutch member 482 may include one or more apertures, one or more grooves, one or more recesses, one or more patterns and/or one or more surface features. This aids in increasing the surface area of the one or more coatings 706 and therefore aids in increasing the overall frictional engagement between the first and second clutch members 378 and 482 of the clutch assembly 702 when the clutch assembly 702 is in the engaged position 500.

According to the embodiment illustrated in FIG. 4 and as a non-limiting example, the armature 492 may have a first side 708 and a second side 710. At least a portion of one or more coatings 712 may be disposed on at least a portion of the second side 710 of the armature 492 of the actuation assembly 484. The one or more coatings 712 on the second side 710 of the armature 492 may be substantially continuous or discontinuous along at least a portion of the second side 710 of the armature 492. Additionally, the one or more coatings 712 on the armature 492 may be utilized in order to increase the overall frictional engagement between the armature 492 and the first engagement member 494 of the actuation assembly 484 of the clutch assembly 702. It is within the scope of this disclosure and as a non-limiting example that the one or more coatings 712 may be bonded directly to, adhesively attached to and/or connected to at least a portion of the armature 492 of the actuation assembly 484. As a non-limiting example, the one or more coatings 712 may be made of one or more friction materials, one or more brake lining materials, a plurality of aramid fibres, a plurality of cellulose mineral fibres, a plurality of glass fibres, a plurality of copper fibres, a plurality of steel fibres, one or more carbon composite materials, one or more ceramic materials and/or any other type of material that is heat resistant and has a high coefficient of dynamic friction.

It is within the scope of this disclosure and as a non-limiting example that the one or more coatings 712 on the armature 492 of the actuation assembly 484 may include one or more apertures, one or more grooves, one or more recesses, one or more patterns and/or one or more surface features. This aids in increasing the surface area of the one or more coatings 712 and therefore aids in increasing the overall frictional engagement between the armature 492 and the first engagement member 494 when the actuation assembly 484 is in the engaged position 500.

In accordance with the embodiment illustrated in FIG. 4 and as a non-limiting example, the first engagement member 494 of the actuation assembly 484 of the clutch assembly 702 may have a first side 714 and a second side 716. At least a portion of one or more coatings 718 may be disposed on at least a portion of the first side 714, the second side 716 and/or the one or more first engagement portions 608 of the first engagement member 494 of the actuation assembly 484 of the clutch assembly 702. The one or more coatings 718 on the first engagement member 494 may be substantially continuous or discontinuous along at least a portion of the first side 714, the second side 716 and/or the one or more first engagement portions 608 of the first engagement member 494. Additionally, the one or more coatings 718 on the first engagement member 494 may be utilized in order to increase the overall frictional engagement between the armature 492, the first engagement member 494 and/or the second engagement member 496 of the actuation assembly 484. It is within the scope of this disclosure and as a non-limiting example that the one or more coatings 718 may be bonded directly to, adhesively attached to and/or connected to at least a portion of the first engagement member 494 of the actuation assembly 484. As a non-limiting example, the one or more coatings 718 may be made of one or more friction materials, one or more brake lining materials, a plurality of aramid fibres, a plurality of cellulose mineral fibres, a plurality of glass fibres, a plurality of copper fibres, a plurality of steel fibres, one or more carbon composite materials, one or more ceramic materials and/or any other type of material that is heat resistant and has a high coefficient of dynamic friction.

It is within the scope of this disclosure and as a non-limiting example that the one or more coatings 718 on the first engagement member 494 of the actuation assembly 484 may include one or more apertures, one or more grooves, one or more recesses, one or more patterns and/or one or more surface features. This aids in increasing the surface area of the one or more coatings 718 and therefore aids in increasing the overall frictional engagement between the armature 492, the first engagement member 494 and/or the second engagement member 496 when the actuation assembly 484 is in the engaged position 500.

As illustrated in FIG. 4 of the disclosure and as a non-limiting example, the second engagement member 496 may have a first side 720 and a second side 722. At least a portion of one or more coatings 724 may be disposed on at least a portion of the first side 720 and/or the one or more second engagement portions 610 of the second engagement member 496 of the actuation assembly 484. The one or more coatings 724 on the first side 720 and/or the one or more second engagement portions 610 of the second engagement member 496 may be substantially continuous or discontinuous along at least a portion of the first side 720 of the second engagement member 496. Additionally, the one or more coatings 724 on the second engagement member 496 may be utilized in order to increase the overall frictional engagement between the first and second engagement members 494 and 496 of the actuation assembly 484. It is within the scope of this disclosure and as a non-limiting example that the one or more coatings 724 may be bonded directly to, adhesively attached to and/or connected to at least a portion of the second engagement member 496 of the actuation assembly 484. As a non-limiting example, the one or more coatings 724 may be made of one or more friction materials, one or more brake lining materials, a plurality of aramid fibres, a plurality of cellulose mineral fibres, a plurality of glass fibres, a plurality of copper fibres, a plurality of steel fibres, one or more carbon composite materials, one or more ceramic materials and/or any other type of material that is heat resistant and has a high coefficient of dynamic friction.

It is within the scope of this disclosure and as a non-limiting example that the one or more coatings 724 on the second engagement member 496 of the actuation assembly 484 may include one or more apertures, one or more grooves, one or more recesses, one or more patterns and/or one or more surface features. This aids in increasing the surface area of the one or more coatings 724 and therefore aids in increasing the overall frictional engagement between the first and second engagement members 494 and 496 when the actuation assembly 484 is in the engaged position 500.

By providing the clutch assembly 702 with a first clutch member 378 and a second clutch member 482 as described and illustrated herein, the amount of frictional engagement between the first and second clutch members 378 and 482 is increased over conventional friction clutch assembly designs. This aids in providing a clutch assembly 702 having an increased overall functionality and reliability. Additionally, by providing the joint assembly 300 with a clutch assembly 702 as described and illustrated herein, the joint and/or clutch assemblies 300 and/or 702 are lighter, have a more compact packaging size, have fewer components, are less complex, are easier to assemble, are lighter, and are more cost efficient.

Figure 5A:
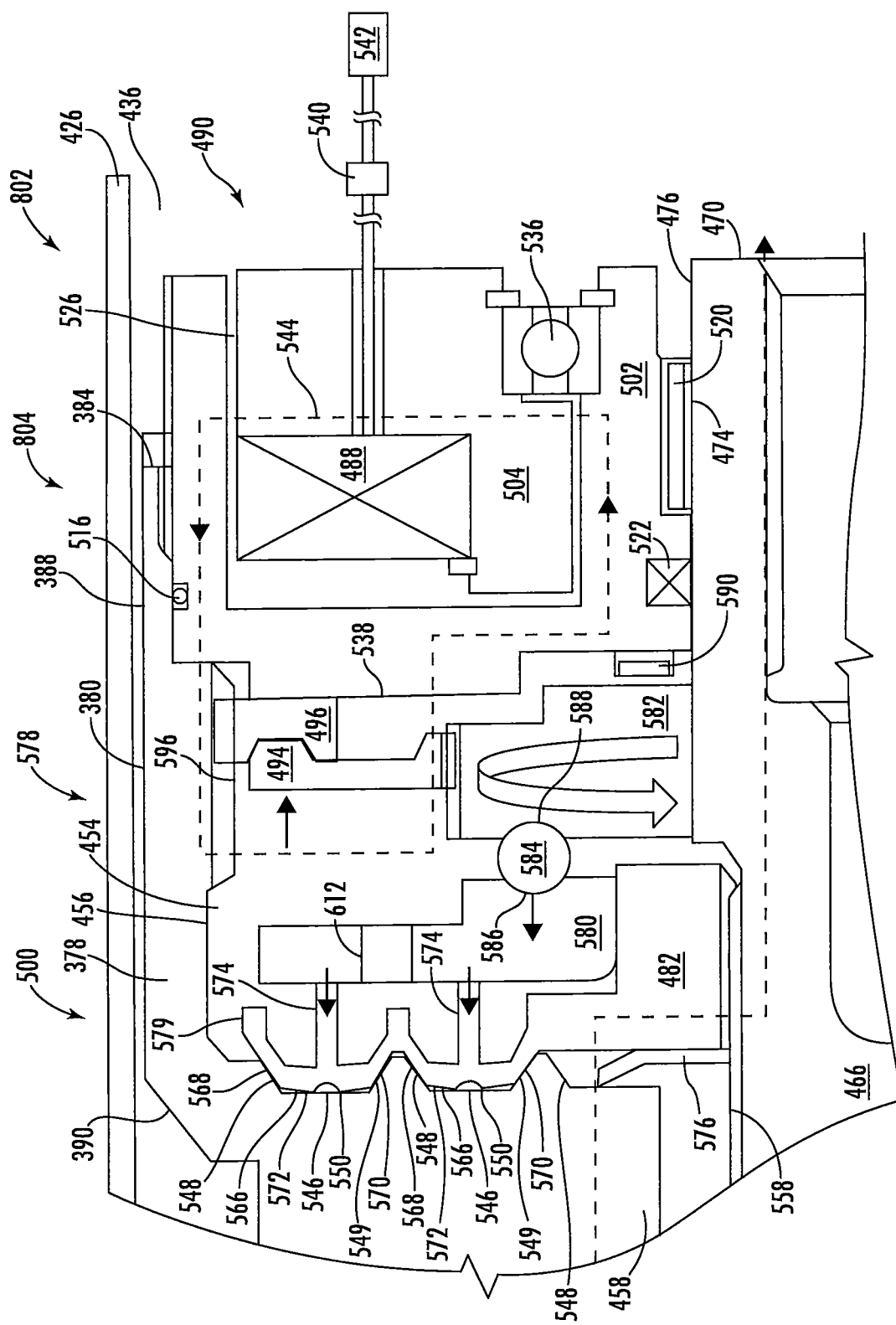
FIG. 5A is a cut-away schematic side-view of a portion of the clutch assembly illustrated in FIG. 5 of the disclosure when the clutch assembly is in an engaged position.

FIGS. 5 and 5A provide a cut-away schematic side-view of a portion of a clutch assembly 802 according to another embodiment of the disclosure. The clutch assembly 802 illustrated in FIGS. 5 and 5A is the same as the clutch assemblies 302 and 702 illustrated in FIGS. 3-4, except where specifically noted below. As illustrated in FIGS. 5 and 5A of the disclosure and as a non-limiting example the clutch assembly 802 may include an actuation assembly 804 according to an alternative embodiment of the disclosure.

According to the embodiment illustrated in FIGS. 5 and 5A and as a non-limiting example, the actuation assembly 804 does not include the use of the armature 492 described and illustrated in relation to FIGS. 3-4 of the disclosure. In accordance with the embodiment illustrated in FIGS. 5 and 5A, the first engagement member 494 may be made of magnetic material that is capable of interacting with the magnetic field 544 generated by the electro-magnetic coil 488. When the ECU 542 instructs the source of electrical power 540 to provide the electro-magnetic coil 488 with the power needed to create the magnetic field 544, the magnetic field 544 may drive the first engagement member 484 toward the electro-magnetic coil 488. It is therefore to be understood that the first engagement member 494 and the magnetic field 544 created by the electro-magnetic coil 488 alone, may be used in order drive the first engagement member 494 into engagement with the second engagement member 496 of the actuation assembly 804 thereby transitioning the clutch actuation assembly 804 and the clutch assembly 802 from the disengaged position 498 illustrated in FIG. 5 to the engaged position 500 illustrated in FIG. 5A. This aids in reducing the overall number of parts, reducing the overall packaging size, the complexity, assembly time, costs, and weight of the clutch assembly 802.

By providing the clutch assembly 802 with a first clutch member 378 and a second clutch member 482 as described and illustrated herein, the amount of frictional engagement between the first and second clutch members 378 and 482 is increased over conventional friction clutch assembly designs. This aids in providing a clutch assembly 802 having an increased overall functionality and reliability. Additionally, by providing the joint assembly 300 with a clutch assembly 802 having an actuation assembly 804 as described and illustrated herein, the joint and/or clutch assemblies 300 and/or 802 are lighter, have a more compact packaging size, have fewer components, are less complex, are easier to assemble, are lighter, and are more cost efficient.

Figure 6:
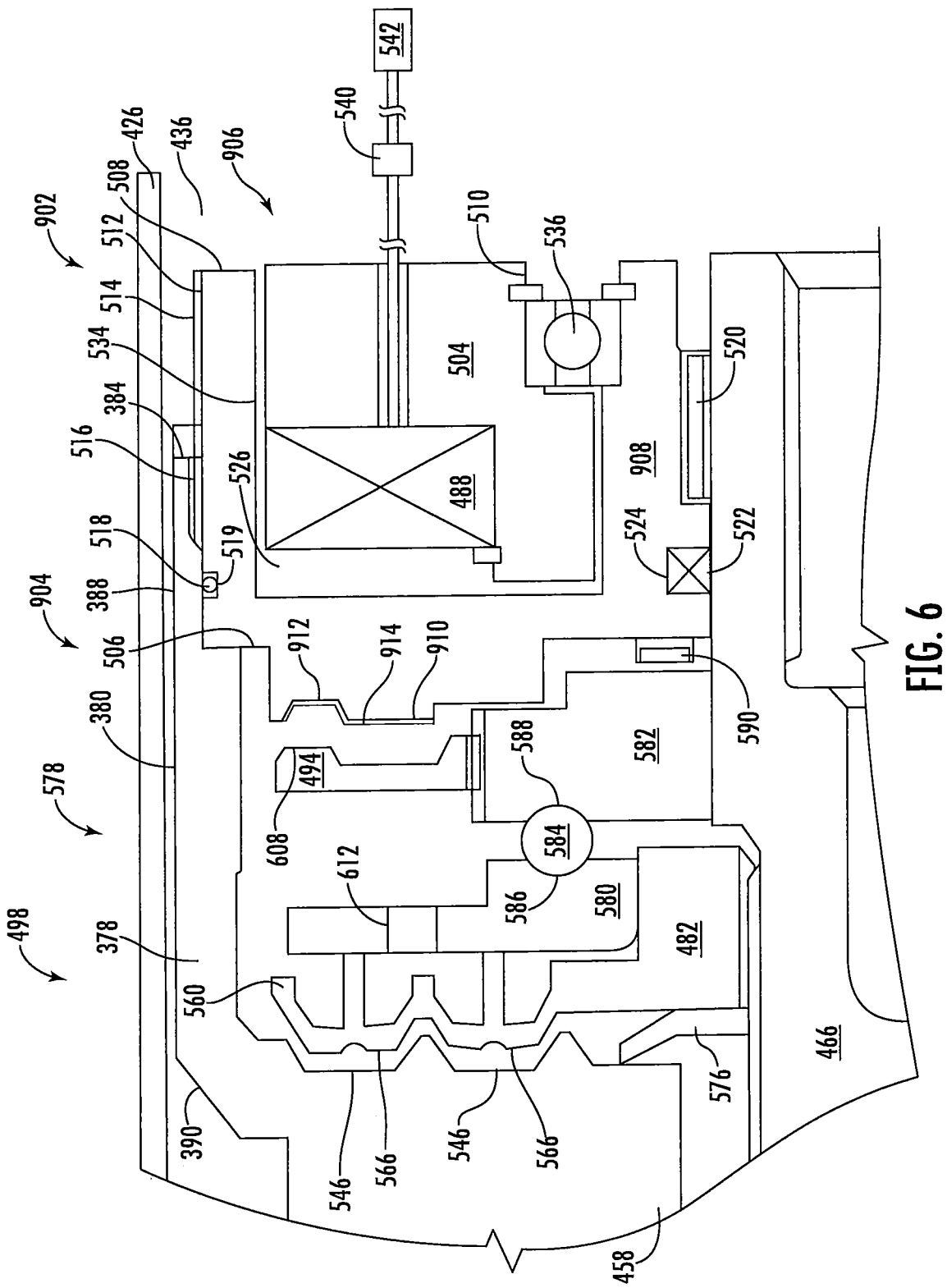
FIG. 6 is a cut-away schematic side-view of a portion of the clutch assembly illustrated in FIGS. 3-5A according to an alternative embodiment of the disclosure when the clutch assembly is in a disengaged position.
Figure 6A:
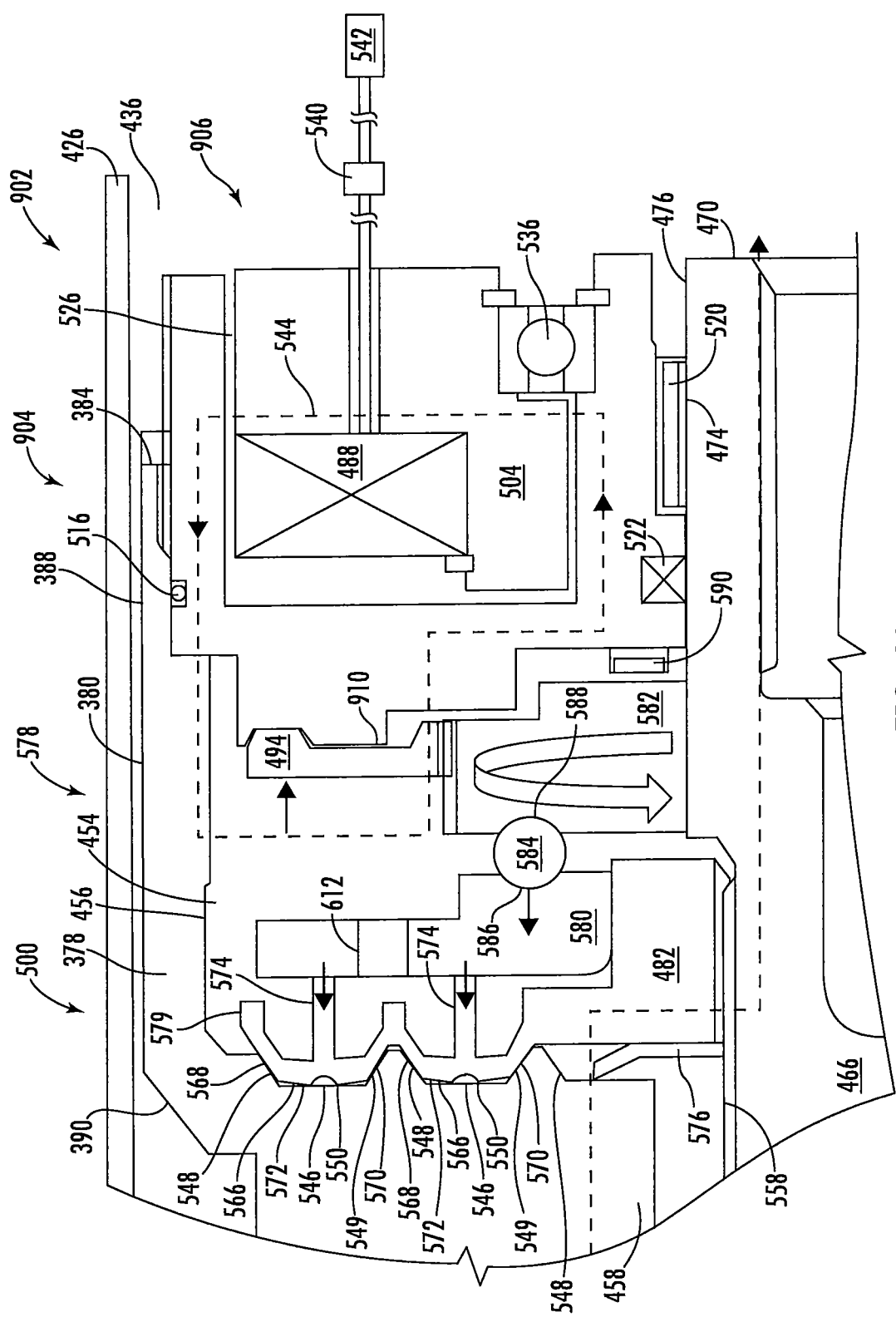
FIG. 6A is a cut-away schematic side-view of a portion of the clutch assembly illustrated in FIG. 6 of the disclosure when the clutch assembly is in an engaged position.

FIGS. 6 and 6A provide a cut-away schematic side-view of a portion of a clutch assembly 902 according to an alternative embodiment of the disclosure. The clutch assembly 902 illustrated in FIGS. 6 and 6A is the same as the clutch assemblies 302, 702 and 802 illustrated in FIGS. 3-5A, except where specifically noted below. In accordance with the embodiment illustrated in FIGS. 6 and 6A of the disclosure and as a non-limiting example, the clutch assembly 902 may include an actuation assembly 904 and a housing 906 according to an alternative embodiment of the disclosure.

As illustrated in FIGS. 6 and 6A of the disclosure and as a non-limiting example, the actuation assembly 904 does not include the second engagement member 496 described and illustrated in relation to FIGS. 3-5A and the first clutch member 378 does not include the third plurality of splines 596 described and illustrated in relation to FIGS. 3-5A of the disclosure. According to this embodiment of the disclosure, the second engagement member 496 may be integrally formed as part of a first housing part 908 of the housing 906.

The first housing portion 908 illustrated in FIGS. 6 and 6A is the same as the first housing part 502 described and illustrated in relation to FIGS. 3-5A, except where specifically noted below.

One or more axially extending portions 910 may extend outward from at least a portion of the first end 506 of the first housing portion 908 toward the first engagement member 494 of the actuation assembly 904. In accordance with the embodiment illustrated in FIGS. 6 and 6A of the disclosure and as a non-limiting example, the one or more axially extending portions 910 of the first housing portion 908 may include one or more engagement portions 912. The one or more engagement portions 912 of the first housing portion 908 may be of a size and shape to receive and/or retain at least a portion of the one or more first engagement portions 608 of the first engagement member 494 of the actuation assembly 904. When the first engagement member 494 is not engaged with the first housing portion 908, the ball and ramp assembly 578 is not being rotated and the clutch assembly 902 is in the disengaged position 498 illustrated in FIG. 6 of the disclosure. When the first engagement member 494 is engaged with at least a portion of the first housing portion 908, an amount of rotational power from the first clutch member 378 is transmitted from the first clutch member 378 to the second plate 582 of the ball and ramp assembly 578. This allows the ball and ramp assembly 578 to transition the clutch assembly 902 from the disengaged position 498 illustrated in FIG. 6 to the engaged position 500 illustrated in FIG. 6A.

As a non-limiting example, the engagement between the one or more first engagement portions 608 of the first engagement member 494 and the one or more engagement portions 912 of the first housing portion 908 may be a locking engagement (i.e. a dog tooth like engagement) and/or a frictional engagement. It is therefore to be understood that the frictional engagement between the one or more first engagement portions 608 of the first engagement member 494 and the one or more engagement portions 912 of the first housing portion 908 may be enough to allow substantially all or a portion of rotational force to be transmitted from the first clutch member 378 to the second plate 582 of the ball and ramp assembly 578. As a result, it is therefore to be understood that at least a portion of the rotational force from the first clutch member 378 may be used in order to rotate the ball and ramp assembly 578 and therefore transition the clutch assembly 902 from the disengaged position 498 illustrated in FIG. 6 to the engaged position 500 illustrated in FIG. 6A.

In accordance with the embodiment illustrated in FIGS. 6 and 6A, the first engagement member 494 may be made of magnetic material that is capable of interacting with the magnetic field 544 generated by the electro-magnetic coil 488. When the ECU 542 instructs the source of electrical power 540 to provide the electro-magnetic coil 488 with the power needed to create the magnetic field 544, the magnetic field 544 may drive the first engagement member 484 toward the electro-magnetic coil 488. It is therefore to be understood that the first engagement member 494 and the magnetic field 544 created by the electro-magnetic coil 488 alone, may be used in order drive the first engagement member 494 into engagement with the first housing portion 908 of the clutch assembly 902 thereby transitioning the clutch actuation assembly 904 and the clutch assembly 902 from the disengaged position 498 illustrated in FIG. 6 to the engaged position 500 illustrated in FIG. 6A. This aids in reducing the overall number of parts, the complexity, assembly time, costs, and weight of the clutch assembly 902.

According to the embodiment illustrated in FIG. 6 of the disclosure and as a non-limiting example, the first housing portion 908 may include one or more coatings 914 on at least a portion of the one or more axially extending portions 910 of the first housing portion 908. The one or more coatings 914 on the one or more axially extending portions 910 and/or the one or more engagement portions 912 of the first housing portion 908 may be substantially continuous or discontinuous along at least a portion of the one or more axially extending portions 910 and/or the one or more engagement portions 912 of the first housing portion 908. Additionally, the one or more coatings 914 on the first housing portion 908 may be utilized in order to increase the overall frictional engagement between the first engagement member 494 and the first housing portion 908 of the actuation assembly 484. It is within the scope of this disclosure and as a non-limiting example that the one or more coatings 914 may be bonded directly to, adhesively attached to and/or connected to at least a portion of the one or more axially extending portions 910 and/or the one or more engagement portions 912 of the housing portion 908. As a non-limiting example, the one or more coatings 914 may be made of one or more friction materials, one or more brake lining materials, a plurality of aramid fibres, a plurality of cellulose mineral fibres, a plurality of glass fibres, a plurality of copper fibres, a plurality of steel fibres, one or more carbon composite materials, one or more ceramic materials and/or any other type of material that is heat resistant and has a high coefficient of dynamic friction.

It is within the scope of this disclosure and as a non-limiting example that the one or more coatings 914 on the one or more axially extending portions 910 and/or the one or more engagement portions 912 of the first housing portion 908 may include one or more apertures, one or more grooves, one or more recesses, one or more patterns and/or one or more surface features. This aids in increasing the surface area of the one or more coatings 914 and therefore aids in increasing the overall frictional engagement between the first engagement member 494 and the first housing portion 908 when the actuation assembly 904 and the clutch assembly 902 are in the engaged position 500 illustrated in FIG. 6A of the disclosure.

In accordance with the embodiment where the first engagement member 494 of the actuation assembly 904 has one or more coatings 718 thereon, when the first engagement member 494 is in an engaged position (not shown) at least a portion of the one or more coatings 718 and/or 914 may be in direct contact with each other. This provides a driving connection between the first engagement member 494 and the one or more engagement portions 912 of the housing 908 of the actuation assembly 902. The one or more coatings 718 and/or 914 on the first engagement member 494 and the housing 902 of the actuation assembly 904 may be utilized in order to increase the overall frictional engagement between the first engagement member 494 and/or the housing 908 of the actuation assembly 484. As a result, the one or more coatings 718 and/or 914 aid in increasing the overall amount of force that may be transferred from the housing 908 to the first engagement member 494 and aids in increasing the overall reliability and functionality of the clutch assembly 902.

By providing the clutch assembly 902 with a first clutch member 378 and a second clutch member 482 as described and illustrated herein, the amount of frictional engagement between the first and second clutch members 378 and 482 is increased over conventional friction clutch assembly designs. This aids in providing a clutch assembly 902 having an increased overall functionality and reliability. Additionally, by providing the joint assembly 300 with a clutch assembly 902 having an actuation assembly 904 as described and illustrated herein, the joint and/or clutch assemblies 300 and/or 902 are lighter, have a more compact packaging size, have fewer components, are less complex, are easier to assemble, are lighter, and are more cost efficient.

Figure 7:
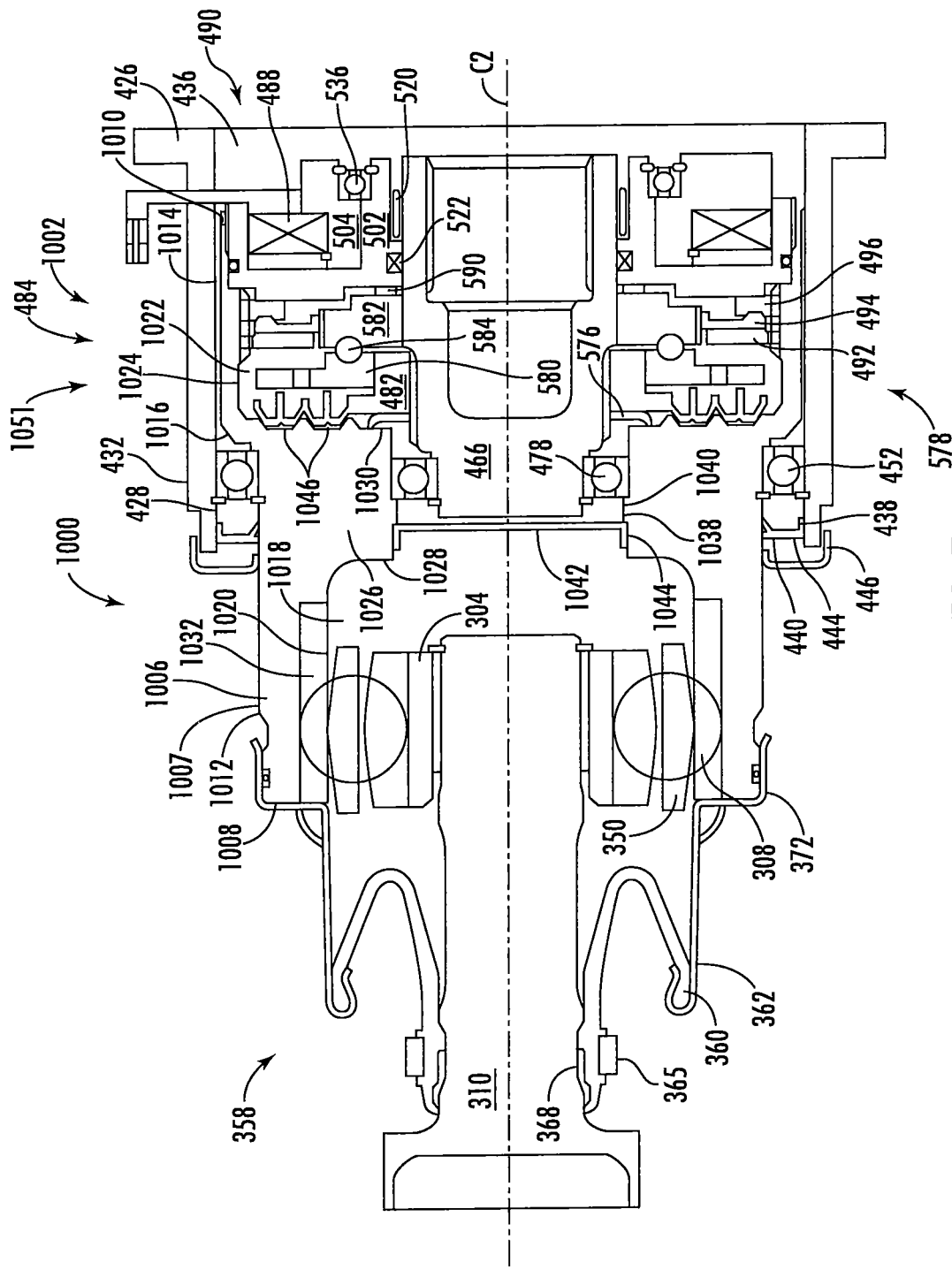
FIG. 7 is a cut-away schematic side-view of the joint assembly and clutch assembly illustrated in FIGS. 3-6A according to yet another embodiment of the disclosure when the clutch assembly is in an engaged position.
Figure 7A:
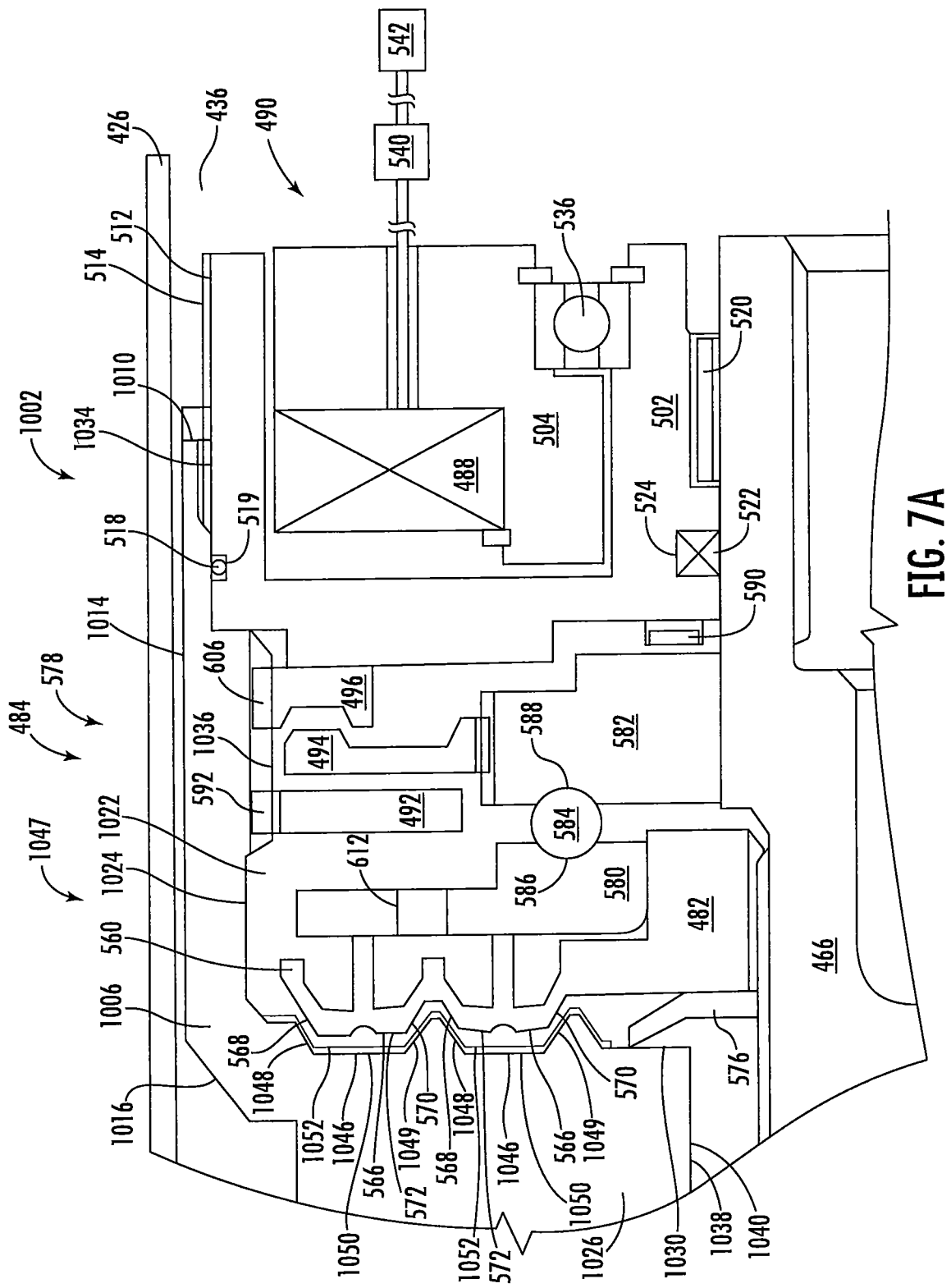
FIG. 7A is a cut-away schematic side-view of the joint assembly and the clutch assembly illustrated in FIG. 7 of the disclosure when the clutch assembly is in a disengaged position.

FIGS. 7 and 7A provide a cut-away schematic side-view of a joint assembly 1000 and a clutch assembly 1002 according to yet another embodiment of the disclosure. The joint assembly 1000 and the clutch assembly 1002 illustrated in FIG. 7 is the same as the joint assembly 300 and the clutch assemblies 302 and 702 illustrated in FIGS. 3-4, except where specifically noted below. In accordance with the embodiment illustrated in FIGS. 7 and 7A of the disclosure and as a non-limiting example, the joint assembly 1000 does not include the nut 398 and the clutch assembly 1002 does not include the first clutch member 378 described and illustrated in relation to FIGS. 3-6A of the disclosure. According to the embodiment illustrated in FIGS. 7 and 7A and as a non-limiting example, the first clutch member 378 may be integrally formed as part of a second joint member 1006 of the joint assembly 1000.

In accordance with the embodiment illustrated in FIG. 7 of the disclosure and as a non-limiting example, the first joint member 304 may be drivingly connected to at least a portion of the second joint member 1006 by the one or more third joint members 308 of the joint assembly 1000. As best seen in FIG. 7 of the disclosure and as a non-limiting example, the second joint member 1006 may have an outer surface 1007, a first end 1008, a second end 1010, a first end portion 1012, a second end portion 1014 and an intermediate portion 1016 interposed between the first and second end portions 1012 and 1012 of the second joint member 1006. It is within the scope of this disclosure and as a non-limiting example that the joint assembly 1000 may be a constant velocity joint assembly, a CV joint assembly, a homokinetic joint assembly, a universal joint assembly, a U-joint, a Cardan joint assembly, A Spicer joint assembly or a Hooke's joint assembly. Additionally, it is within the scope of this disclosure and as a non-limiting example that the second joint member 1006 may be an outer race of a constant velocity joint assembly.

Extending inward into at least a portion of the second joint member 1006, from at least a portion of the first end 1008 of the second joint member 1006, is a first hollow interior portion 1018 having a first inner surface 1020. As best seen in FIG. 7 of the disclosure and as a non-limiting example, at least a portion of the first joint member 304 may be disposed within at least a portion of the first hollow interior portion 1018 of the second joint member 1006 of the joint assembly 1000.

According to the embodiment illustrated in FIGS. 7 and 7A of the disclosure and as a non-limiting example, the second joint member 1006 may further include a second hollow interior portion 1022 having a second inner surface 1024 extending inward from at least a portion of the second end 1010 of the second joint member 1006 and into at least a portion of the second joint member 1006. The second hollow interior portion 1022 of second joint member 1006 may be of a size and shape to receive and/or retain at least a portion of the clutch assembly 1002, the ball and ramp assembly 578 and/or the actuation assembly 484.

In accordance with the embodiment illustrated in FIGS. 7 and 7A of the disclosure and as a non-limiting example, the second joint member 1006 may further include a wall portion 1026 having a first side 1030 and/or a second side 1028. The wall portion 1026 of the second joint member 1006 may provide a barrier separating at least a portion of the first hollow interior portion 1018 of the second joint member 1006 from at least a portion of the second hollow interior portion 1022 of the second joint member 1006. As a result, it is within the scope of this disclosure and as a non-limiting example that the first and/or second hollow interior portions 1018 and/or 1022 may terminate at the wall portion 1026. In light of the foregoing, it is therefore to be understood that at least a portion of the first side 1030 of the wall portion 1026 may form at least a portion of the second hollow interior portion 1022 of the second joint member 1006 and at least a portion of the second side 1028 of the wall portion 1026 may form at least a portion of the first hollow interior portion 1018 of the second joint member 1006. It is within the scope of this disclosure and as a non-limiting example that the wall portion 1026 may be substantially solid of may include one or more apertures or openings therein fluidly connecting the first and second hollow interior portions 1018 and 1022 of the second joint member 1006 of the joint assembly 1000.

Circumferentially extending along at least a portion of the first inner surface 1020 of the second joint member 1006 is a plurality of second joint member grooves 1032. The plurality of second joint member grooves 1032 may be complementary to one or more first joint member grooves 328 circumferentially extend along at least a portion of an outer surface 330 of the first joint member 304. Additionally, the plurality of first joint member grooves 1032 and the plurality of second joint member grooves 348 may be of a size and shape to receive and/or retain at least a portion of the one or more third joint members 308 of the joint assembly 300. As a result, it is therefore to be understood that the one or more third joint members 1032 aid in drivingly connecting the first joint member 304 to the second joint member 1006 of the joint assembly 1000.

As best seen in FIG. 7 of the disclosure and as a non-limiting example, at least a portion of the second end portion 372 of the boot can 362 may be connected to and/or sealingly engaged with at least a portion of the first end portion 1012 of the second joint member 1006. As a result, it is therefore to be understood that the boot assembly 358 may be used in order to seal at least a portion of the joint assembly 1000 and prevent the migration of dirt, debris and/or moisture into the joint assembly 1000. This aids in increasing the overall life and durability of the joint assembly 1000.

At least a portion of the first sealing member 438 may be interposed between at least a portion of the housing 426 and the second joint member 1006 of the joint assembly 1000. As best seen in FIG. 7 of the disclosure and as a non-limiting example, at least a portion of the inner portion 440 of the first sealing member 438 may be sealingly engaged with at least a portion of the outer surface 1007 of the intermediate portion 1016 of the second joint member 1006. Additionally, as best seen in FIG. 7 of the disclosure and as a non-limiting example, at least a portion of the outer portion 444 of the first sealing member 438 may be sealingly engaged with at least a portion of the inner surface 428 of the first end portion 432 of the housing 426 of the clutch assembly 1002. It is therefore to be understood that the first sealing member 438 aids in sealing the clutch assembly 1002 thereby aiding in preventing the migration of dirt, debris and/or moisture into the clutch assembly 1002.

The clutch assembly 1002 may further include the cover portion 446. The cover portion 446 aids in preventing dirt and/or debris from coming into direct contact with the first sealing member 438 thereby aiding in increasing the overall life and durability of the first sealing member 438. At least a portion of the inner portion 448 of the cover portion 446 may be integrally connected to and/or sealingly engaged with at least a portion of the outer surface 1007 of the intermediate portion 1016 of the of the second joint member 1006 of the joint assembly 1000. Additionally, at least a portion of the outer portion 450 of the cover portion 446 may be disposed radially outboard from at least a portion of the outer surface 430 of the first end portion 432 of the housing 426.

At least a portion of the one or more first bearing assemblies 452 may be interposed between the housing 426 and the second joint member 1006 of the joint assembly 1000. As best seen in FIG. 7 of the disclosure and as a non-limiting example, at least a portion of the one or more first bearing assemblies 452 may be in direct contact with at least a portion of the outer surface 1007 of the second joint member 1006 and the inner surface 428 of the housing 426. It is therefore to be understood that the one or more first bearing assemblies 452 aid in providing rotational support for at least a portion of the second joint member 1006 of the joint assembly 1000.

Circumferentially extending along at least a portion of the second inner surface 1024 of the second hollow interior portion 1022 of the second joint member 1006 is a first plurality of splines 1034. The first plurality of splines 1034 of the second joint member 1006 may be complementary to and meshingly engaged with the plurality of splines 514 circumferentially extending along the outer surface 512 of the first housing portion 502. As a result, it is therefore to be understood that the first housing portion 502 may be drivingly connected to at least a portion of the second joint member 1006 of the joint assembly 1000.

In accordance with the embodiment illustrated in FIGS. 7 and 7A of the disclosure and as a non-limiting example, at least a portion of the second O-ring 518 of the clutch assembly 1002 may be sealingly engaged with at least a portion of the outer surface 512 of the first housing portion 502 and the second inner surface 1024 of the second joint member 1006. As a result, the second O-ring 518 aids in preventing the migration of dirt, debris and/or moisture into the clutch assembly 1002 thereby aiding in increasing the overall life and durability of the clutch assembly 1002.

As best seen in FIG. 7A of the disclosure and as a non-limiting example, the second joint member 1006 may include a second plurality of splines 1036 circumferentially extending along at least a portion of the second inner surface 1024 of the second hollow interior portion 1022 of the second joint member 1006. The second plurality of splines 1036 of the second joint member 1006 may be complementary to and meshingly engaged with at least a portion of the plurality of splines 592 of the armature 492 and/or the plurality of splines 606 of the second engagement member 496 of the clutch assembly 1002. It is within the scope of this disclosure and as a non-limiting example that the first plurality of splines 1034 may have an innermost diameter that is greater than an innermost diameter of the second plurality of splines 1036 of the second joint member 1006.

In accordance with the embodiment illustrated in FIGS. 7 and 7A of the disclosure and as a non-limiting example, at least a portion of a receiving portion 1038 may extend inward from at least a portion of the first side 1030 of the wall portion 1026 of the second joint member 1006 and into at least a portion of the wall portion 1026. It is within the scope of this disclosure and as a non-limiting example that the receiving portion 1038 may extend either all of the way through the wall portion 1026 or only part of the way through the wall portion 1026 of the second joint member 1006.

Interposed between at least a portion of the first end portion 472 of the second shaft 466 and a surface 1040 defining the receiving portion 1038 is the second bearing assembly 478. The second bearing assembly 478 provides rotational support for at least a portion of the second shaft 466 thereby allowing the second joint member 1006 to rotate relative to the second shaft 466 when in operation.

According to the embodiment illustrated in FIG. 7 and as a non-limiting example, the joint assembly 1000 may further include a grease cap 1042. The grease cap 1042 may aid in sealing at least a portion of the joint assembly 1000 from at least a portion of the clutch assembly 1002. At least a portion of an outer surface 1044 of the grease cap 1042 may be connected to and/or sealingly engaged with at least a portion of the surface 1040 defining the receiving portion 1038 in the wall portion 1026 of the second joint member 1006 of the joint assembly 1000.

As best seen in FIG. 7A of the disclosure and as a non-limiting example, the first side 1030 of the wall portion 1026 of the second joint member 1006 may include one or more receiving portions 1046. The one or more receiving portions 1046 in the wall portion 1026 of the second joint member 1006 may be of a size and shape to receive and/or retain at least a portion of the second clutch member 482 of the clutch assembly 1002. In particular, the one or more receiving portions 1046 in the first side 1030 of the wall portion 1026 of the second joint member 1006 may be of a size and shape to receive and/or retain at least a portion of the one or more first engagement portions 566 of the increased diameter portion 560 of the second clutch member 482 of the clutch assembly 1002. When the clutch assembly 1002 is in a disengaged position 1047 illustrated in FIG. 7A of the disclosure and as a non-limiting example, the second clutch member 482 is not engaged with the one or more receiving portions 1046 in the wall portion 1026 of the second joint member 1006. As a result, a result, an amount of rotational power is unable to be transmitted from the second joint member 1006 to the second shaft 466 or from the second shaft 466 to the second joint member 1006. When the clutch assembly 1002 is in the engaged position 1051 illustrated in FIG. 7 of the disclosure and as a non-limiting example, at least a portion of the one or more receiving portions 1046 of the second joint member 1006 are engaged with at least a portion of the second joint member 482 of the clutch assembly 1002. As a result, an amount of rotational power is able to be transmitted from the second joint member 1006 to the second shaft 466 or from the second shaft 466 to the second joint member 1006 of the joint assembly 1000.

The one or more receiving portions 1046 in the wall portion 1026 of the second joint member 1006 may include one or more first sloped surfaces 1048 and/or one or more second sloped surfaces 1049 extending from a bottom portion 1050 of the one or more receiving portions 1046 to the first side 1030 of the wall portion 1026 of the second joint member 1006. The one or more first and second sloped surfaces 1048 and 1049 of the one or more receiving portions 1046 of the second joint member 1006 may be complementary to the one or more first and second sloped surfaces 568 and 570 of the one or more first engagement portions 566 of the second clutch member 482. It is within the scope of this disclosure and as a non-limiting example that the bottom portion 1050, the one or more first sloped surfaces 1048 and/or the one or more second sloped surfaces 1049 of the one or more receiving portions 1046 in the wall portion 1026 of the second joint member 1006 may provide a reaction surface for at least a portion of the second clutch member 482 allowing for the selective transition of the clutch assembly 1002 between the engaged 1051 and the disengaged position 1047. In accordance with the embodiment illustrated in FIG. 7A of the disclosure and as a non-limiting example, the one or more first sloped surfaces 1048 may extend at the same angle θ5 relative to a centerline C2 of the clutch assembly 1002 and the one or more second sloped surfaces 1049 may extend at an angle θ6 relative to the centerline C2. As a non-limiting example, the one or more second sloped surfaces 1049 may be a mirror image of the one or more first sloped surfaced 1048 of the one or more receiving portions 1046 of the second joint member 1006. It is within the scope of this disclosure and as a non-limiting example that the angles θ5 and θ6 of the one or more first and second sloped surfaces 1048 and 1049 may be substantially equal to each other and/or the angles θ5 and θ6 of the one or more first and second sloped surfaces 1048 and 1049 may be different from each other.

As best seen in FIG. 7A of the disclosure and as a non-limiting example, when the clutch assembly 1002 is in the disengaged position 1047 illustrated in FIG. 7A, the one or more first sloped surfaces 568, the one or more second sloped surfaces 570 and/or the outboard surface 572 of the one or more first engagement portions 566 of the second clutch member 482 are not engaged with the one or more first sloped surfaces 1048, the one or more second sloped surfaces 1049 and/or the bottom portion 1050 of the one or more receiving portions 1046 of the second joint member 1006. When the clutch assembly 1002 is in the engaged position 1051 illustrated in FIG. 7, at least a portion of the one or more first sloped surfaces 568, the one or more second sloped surfaces 570 and/or the outboard surface 572 of the one or more first engagement portions 566 of the second clutch member 482 may be engaged with at least a portion of the one or more first sloped surfaces 1048, the one or more second sloped surfaces 1049 and/or the bottom portion 1050 of the one or more receiving portions 1046 of the second joint member 1006. As a non-limiting example, the engagement between the one or more receiving portions 1046 of the second joint member 1006 and the one or more first engagement portions 566 of the second clutch member 482, when the clutch assembly 1002 is in the engaged position 1051, may be a locking engagement (i.e. a dog tooth like engagement) and/or a frictional engagement. It is therefore to be understood that the frictional engagement between the second joint member 1006 and the second clutch member 482 may be enough to allow substantially all or a variable amount of rotational force to be transmitted from the second joint member 1006 to the second shaft 466 or may be enough to allow substantially all or a variable amount of rotational force to be transmitted from the second shaft 466 to the second joint member 1006.

In light of the foregoing, it is within the scope of this disclosure and as a non-limiting example that the clutch assembly 1002 may be a dog clutch assembly, a friction clutch assembly or a wedge clutch assembly.

In accordance with the embodiment illustrated in FIG. 7A of the disclosure and as a non-limiting example, the second joint member 1006 may include one or more coatings 1052 on at least a portion of the first side 1030 of the wall portion 1026 of the second joint member 1006. The one or more coatings 1052 on the first side 1030 of the wall portion 1026 of the second joint member 1006 may be substantially continuous or discontinuous along at least a portion of the first side 1030 of the wall portion 1026. Additionally, the one or more coatings 1052 on the second joint member 1006 may be utilized in order to increase the overall frictional engagement between the second joint member 1006 and the second clutch member 482 of the clutch assembly 1002. It is within the scope of this disclosure and as a non-limiting example that the one or more coatings 1052 may be bonded directly to, adhesively attached to and/or connected to at least a portion of the second joint member 1006. As a non-limiting example, the one or more coatings 1052 may be made of one or more friction materials, one or more brake lining materials, a plurality of aramid fibres, a plurality of cellulose mineral fibres, a plurality of glass fibres, a plurality of copper fibres, a plurality of steel fibres, one or more carbon composite materials, one or more ceramic materials and/or any other type of material that is heat resistant and has a high coefficient of dynamic friction.

According to an embodiment of the disclosure and as a non-limiting example, the one or more coatings 1052 on the second joint member 1006 may be disposed on at least a portion of the one more receiving portions 1046 in the first side 1030 of the wall portion 1026 of the second joint member 1006. As illustrated in FIG. 7 of the disclosure and as a non-limiting example, at least a portion of the one or more coatings 1052 may be disposed on at least a portion of the bottom portion 1050, the one or more first sloped surfaces 1048 and/or the one or more second sloped surfaces 1049 of the one or more receiving portions 1046 of the second joint member 1006.

It is within the scope of this disclosure and as a non-limiting example that the one or more coatings 1052 on the second joint member 1006 may include one or more apertures, one or more grooves, one or more recesses, one or more patterns and/or one or more surface features. This aids in increasing the surface area of the one or more coatings 1052 and therefore aids in increasing the overall frictional engagement between the second joint member 1006 and the second clutch member 482 when the clutch assembly 1002 is in the engaged position 1052 illustrated in FIG. 7 of the disclosure.

By providing the clutch assembly 1002 with a second joint member 1006 with a wall portion 1026 having one or more receiving portions 1046 therein and a second clutch member 482 as described and illustrated herein, the amount of frictional engagement between the second joint member 1006 and the second clutch member 482 is increased over conventional friction clutch assembly designs. This aids in providing a clutch assembly 1002 having an increased overall functionality and reliability. Additionally, by providing the joint assembly 1000 with a clutch assembly 1002 as described and illustrated herein, the joint and/or clutch assemblies 1000 and/or 1002 are lighter, have a more compact packaging size, have fewer components, are less complex, are easier to assemble, are lighter, and are more cost efficient.

Figure 8:
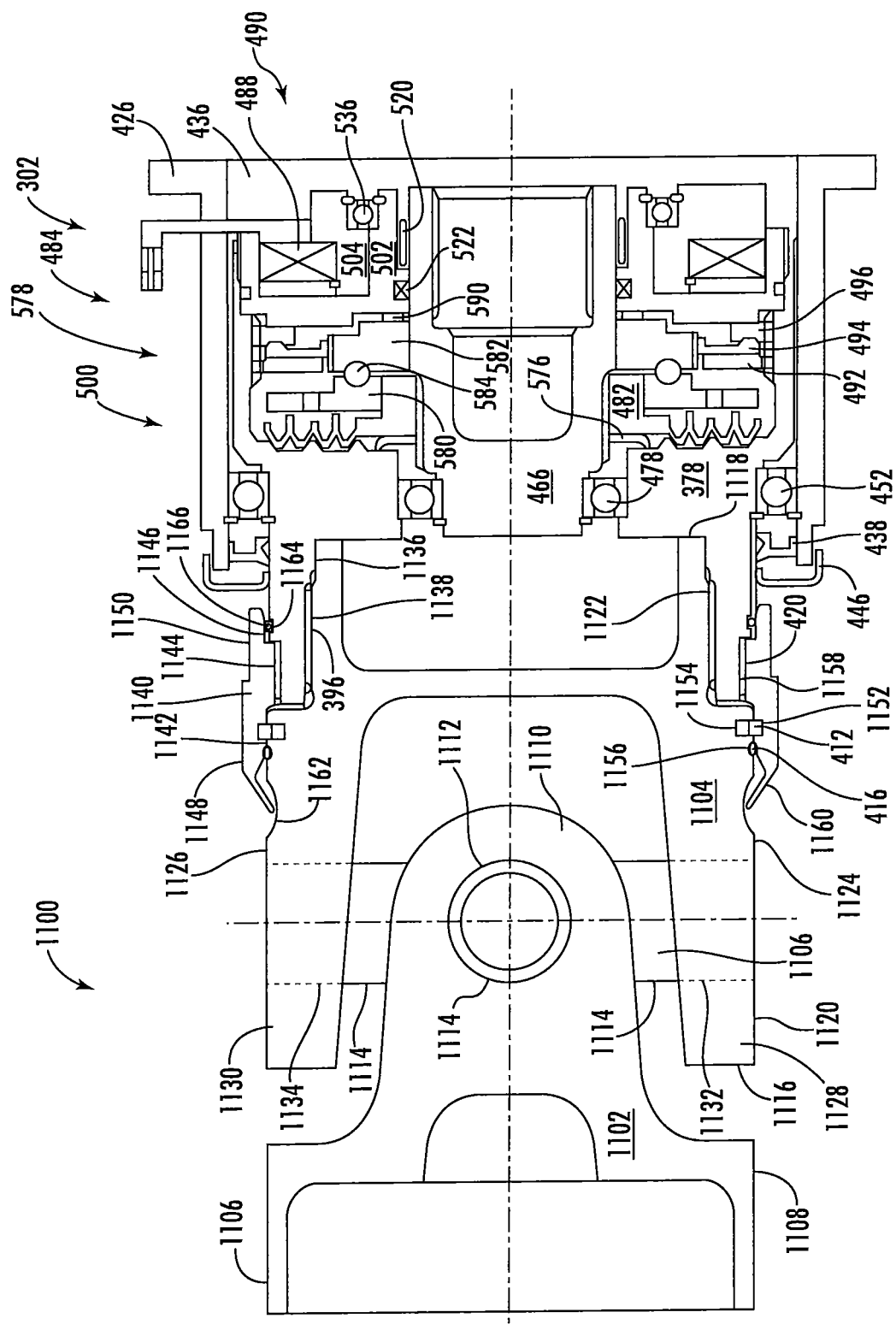
FIG. 8 is a cut-away schematic side-view of the joint assembly and clutch assembly illustrated in FIGS. 3-7A according to still yet another embodiment of the disclosure.

FIG. 8 is a cut-away schematic side-view of a joint assembly 1100 according to still yet another embodiment of the disclosure. The joint assembly 1100 illustrated in FIG. 8 is the same as the joint assemblies 300 and 1000 illustrated in FIGS. 3-7A, except where specifically noted below. In accordance with the embodiment illustrated in FIG. 8 of the disclosure and as a non-limiting example, the joint assembly 1100 may have a first joint member 1102 that is drivingly connected to a second joint member 1104 by one or more third joint members 1106. It is within the scope of this disclosure and as a non-limiting example that the joint assembly 1100 may be a universal joint assembly, a U-joint, a Cardan joint assembly, A Spicer joint assembly or a Hooke's joint assembly.

As illustrated in FIG. 8 of the disclosure and as a non-limiting example, the first joint member 1102 may have a first end portion 1106 and a second end portion 1108. At least a portion of the first end portion of the first joint member 1102 may be drivingly connected to at least a portion of a first shaft (not shown). It is within the scope of this disclosure and as a non-limiting example that the first shaft (not shown) may be a stub shaft, a pinion gear shaft, a transmission output shaft, a transfer case input shaft, a first transfer case output shaft, a second transfer case output shaft, a power transfer unit input shaft, a power transfer unit output shaft, a differential input shaft, a first differential output shaft, a second differential output shaft, a front differential input shaft, a first front axle differential output shaft, a second front axle differential output shaft, a first front axle half shaft, a second front axle half shaft, a rear differential input shaft, a first rear axle differential output shaft, a second rear axle differential output shaft, a first rear axle half shaft, a rear front axle half shaft, a forward tandem axle input shaft, an inter-axle differential input shaft, a first forward tandem axle differential output shaft, a second forward tandem axle differential output shaft, a first forward tandem axle half shaft, a second forward tandem axle half shaft, an inter-axle differential output shaft, a rear tandem axle differential input shaft, a first rear tandem axle differential output shaft, a second rear tandem axle differential output shaft, a first rear tandem axle half shaft, a second rear tandem axle half shaft, a drive shaft, a propeller shaft or a midship shaft.

Extending outward from at least a portion of the second end portion 1108 of the first joint member 1102 is a first yoke arm 1110 and a second yoke arm (not shown). The first yoke arm 1110 of the first joint member 1102 may have a first yoke arm aperture 1112 therein and the second yoke arm (not shown) of the first joint member 1102 may have a second yoke arm aperture (not shown) therein. The first yoke arm aperture 1112 in the first yoke arm 1110 of the first joint member 1102 may be aligned with the second yoke arm aperture (not shown) in the second yoke arm (not shown) of the first joint member 1102 of the joint assembly 1100. As illustrated in FIG. 8 of the disclosure and as a non-limiting example, the first yoke arm aperture 1112 and the second yoke arm aperture (not shown) may be of a size and shape to receive and/or retain at least a portion of one or more trunnions 1114 extending outward from at least a portion of the third joint member 1106.

Disposed axially outboard from at least a portion of the first joint member 1102 is the second joint member 1104 having a first end 1116, a second end 1118, a first end portion 1120, a second end portion 1122, an intermediate portion 1124 and an outer surface 1126. As illustrated in FIG. 8 of the disclosure and as a non-limiting example, the first end portion 1120 of the second joint member 1104 may include a first yoke arm 1128 and a second yoke arm 1130. The first yoke arm 1128 of the second joint member 1104 may have a first yoke arm aperture 1132 therein and the second yoke arm 1130 of the second joint member 1104 may have a second yoke arm aperture 1134 therein. The first yoke arm aperture 1132 in the first yoke arm 1128 of the second joint member 1104 may be aligned with the second yoke arm aperture 1134 in the second yoke arm 1130 of the second joint member 1104 of the joint assembly 1100. As illustrated in FIG. 8 of the disclosure and as a non-limiting example, the first yoke arm aperture 1132 and the second yoke arm aperture 1134 may be of a size and shape to receive and/or retain at least a portion of the one or more trunnions 1114 of the third joint member 1106.

In accordance with the embodiment illustrated in FIG. 8 of the disclosure and as a non-limiting example, the second joint member 1104 may have a reduced diameter portion 1136 circumferentially extending along at least a portion of the second end portion 1122 of the second joint member 1104. Circumferentially extending along at least a portion of the outer surface 1126 of the reduced diameter portion 1136 of the second joint member 1104 is a plurality of splines 1138. The plurality of splines 1138 of the second joint member 1104 are complementary to and meshingly engaged with at least a portion of the first plurality of splines 396 of the first clutch member 378 of the clutch assembly 302. As a result, it is therefore to be understood that the second joint member 1104 may be drivingly connected to at least a portion of the first clutch member 378 of the clutch assembly 302.

Disposed radially outboard from at least a portion of the second joint member 1104 and the first clutch member 378 is a nut 1140 having a first inner surface 1142, a second inner surface 1144, a third inner surface 1146, a first end portion 1148 and a second end portion 1150. As illustrated in FIG. 8 of the disclosure and as a non-limiting example, the second inner surface 1144 of the nut 1140 may be interposed between the first and third inner surfaces 1142 and 1146 of the nut 1140. Additionally, as illustrated in FIG. 8 of the disclosure and as a non-limiting example, the second inner surface 1144 may have an innermost diameter that is less than the inner most diameters of the first and third inner surfaces 1142 and 1146 of the nut 1140. The nut 1140 aids in axially restraining and securing at least a portion of the second joint member 1104 of the joint assembly 1100 to at least a portion of the first clutch member 378 of the clutch assembly 302. As best seen in FIG. 8 of the disclosure and as a non-limiting example, a nut snap-ring groove 1152 may circumferentially extend along at least a portion of the first inner surface 1142 of the nut 1140. The nut snap-ring groove 1152 in the first inner surface 1142 of the nut 1140 may be complementary to a second joint member snap-ring groove 1154 circumferentially extending along at least a portion of the intermediate portion 1124 of the second joint member 1104. The nut snap-ring groove 1152 and the second joint member snap-ring groove 1154 may be of a size and shape to receive and/or retain at least a portion of the nut snap-ring 412 therein.

A second joint member O-ring groove 1156 may circumferentially extend along at least a portion of the outer surface 1126 of the intermediate portion 1124 of the second joint member 1104 of the joint assembly 1100. The second joint member O-ring groove 1156 may be of a size and shape to receive and/or retain at least a portion of the first O-ring 416 therein. When assembled, at least a portion of the first O-ring 416 may be sealingly engaged with at least a portion of the outer surface 1126 of the second joint member 1104 and the first inner surface 1142 of the nut 1140 of the joint assembly 1100. This aids in preventing the migration of an amount of dirt, debris and/or moisture into the clutch assembly 302 thereby aiding in increasing the overall life and durability of the clutch assembly 302.

Circumferentially extending along at least a portion of the second inner surface 1144 of the nut 1140 is a plurality of nut threads 1158. The plurality of nut threads 1158 on the second inner surface 1144 of the nut 1140 may be complementary to and meshingly engaged with at least a portion of a plurality of first clutch member threads 420 circumferentially extending along at least a portion of the outer surface 380 of the first end portion 386 of the first clutch member 378. It is therefore to be understood that the meshing engagement of the plurality of nut threads 1158 and the plurality of first clutch member threads 420 aid in securing and axially restraining the second joint member 1104 relative to the first clutch member 378.

Extending outward from at least a portion of the first end portion 1148 of the nut 1140 of the joint assembly 1100 is one or more axially extending portions 1160. As best seen in FIG. 8 of the disclosure and as a non-limiting example, the one or more axially extending portions 1160 may be plastically deformed inward into direct contact with at least a portion of the outer surface 1126 of the second joint member 1104 in order to ensure that the nut 1140 does not become threadingly disengaged with the first clutch member 378. In accordance with an embodiment of the disclosure and as a non-limiting example, the one or more axially extending portions 1160 may be plastically deformed into one or more recesses 1162 circumferentially extending along at least a portion of the outer surface 1126 of the intermediate portion 1124 of the second joint member 1104.

In accordance with the embodiment illustrated in FIG. 8 of the disclosure and as a non-limiting example, the first clutch member 378 may include a first clutch member O-ring groove 1164 circumferentially extending along at least a portion of the outer surface 380 of the first end portion 386 of the first clutch member 378. The first clutch member O-ring groove 1164 may be of a size and shape to receive and/or retain at least a portion of a first clutch member O-ring 1166. When assembled, at least a portion of the first clutch member O-ring 1166 may be sealingly engaged with at least a portion of the third inner surface 1146 of the nut 1140 and the outer surface 380 of the first clutch member 378. This aids in preventing the migration of an amount of dirt, debris and/or moisture into the threads 420 and 1158 thereby aiding in increasing the overall life and durability of the clutch assembly 302.

By providing the clutch assembly 302 with a first clutch member 378 and a second clutch member 482 as described and illustrated herein, the amount of frictional engagement between the first and second clutch members 378 and 482 is increased over conventional friction clutch assembly designs. This aids in providing a clutch assembly 302 having an increased overall functionality and reliability. Additionally, by providing a joint assembly 1100 with a clutch assembly 302 having an actuation assembly 484 as described and illustrated herein, the joint and/or clutch assemblies 1100 and/or 302 are lighter, have a more compact packaging size, have fewer components, are less complex, are easier to assemble, are lighter, and are more cost efficient.

Figure 9:
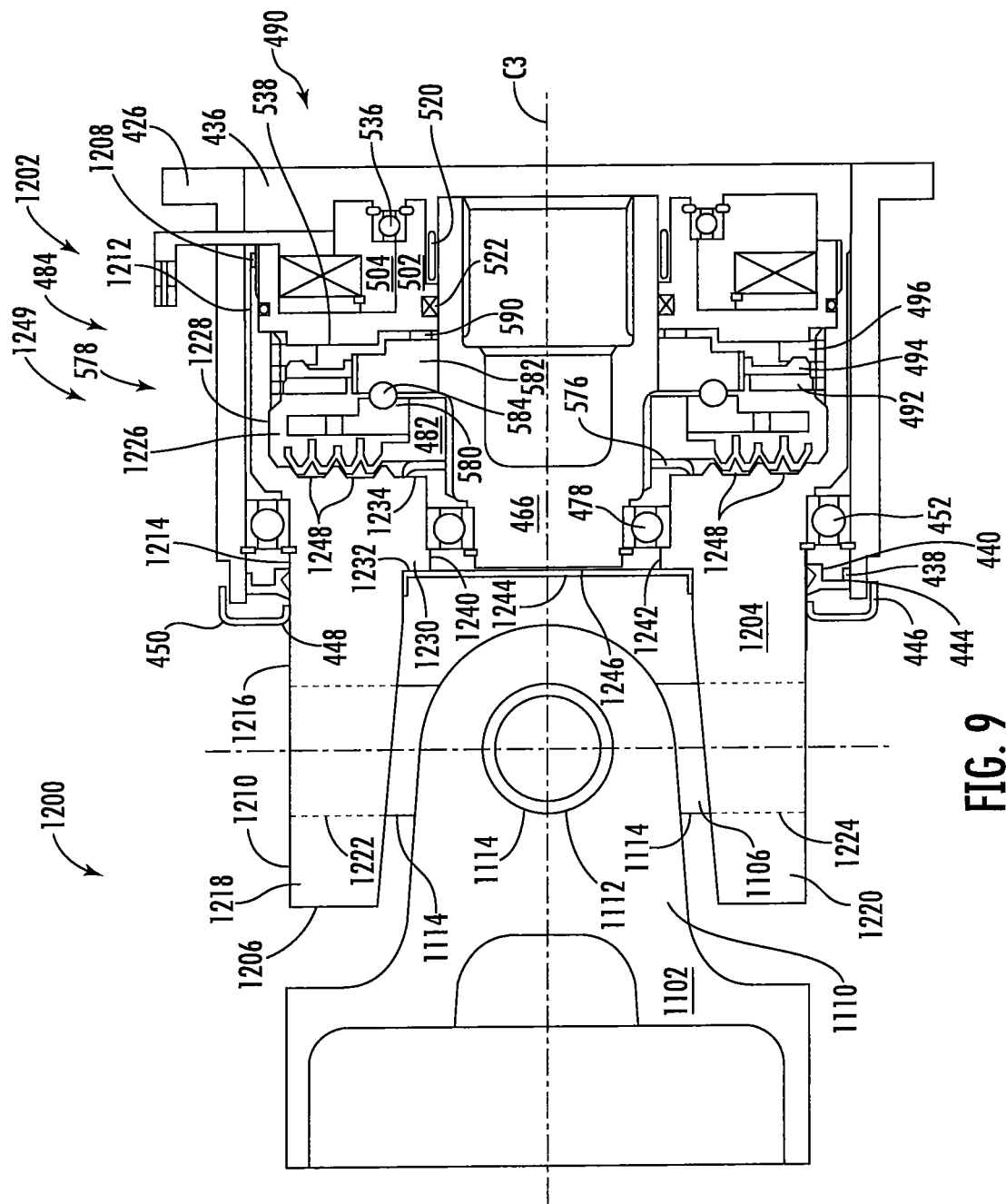
FIG. 9 is a cut-away schematic side-view of the joint assembly and the clutch assembly illustrated in FIGS. 3-8 according to still yet a further embodiment of the disclosure when the clutch assembly is in an engaged position.
Figure 9A:
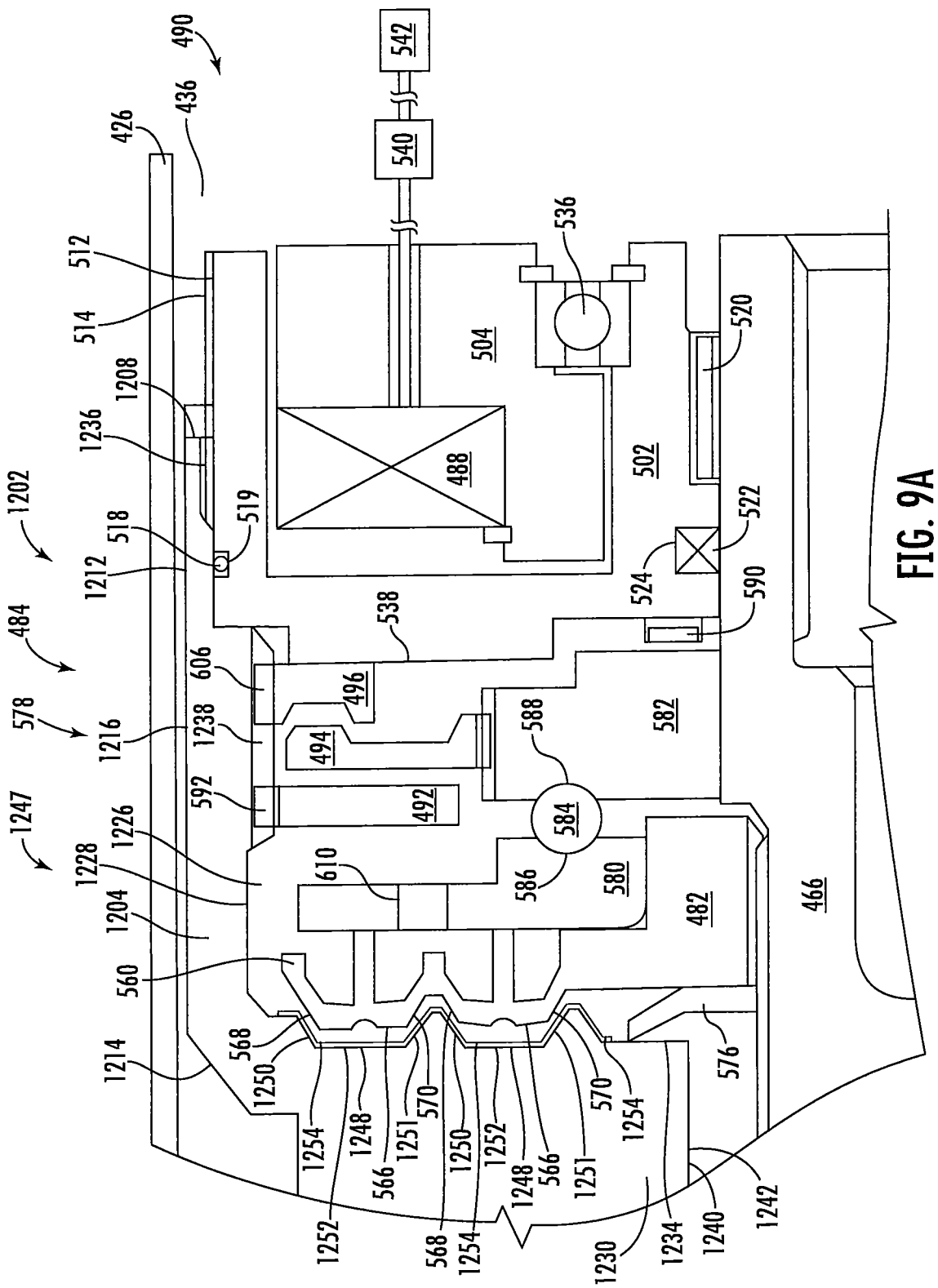
FIG. 9A is a cut-away schematic side-view of a portion of the joint assembly and clutch assembly illustrated in FIG. 9 when the clutch assembly is in a disengaged position.

FIGS. 9 and 9A provide a schematic side-view of a joint assembly 1200 and a clutch assembly 1202 according to still yet a further embodiment of the disclosure. The joint assembly 1200 and the clutch assembly 1202 illustrated in FIGS. 9 and 9A is the same as the joint assemblies 300, 1000 and 1100 and the joint assemblies 302, 702 and 1002 illustrated in FIGS. 3-8, except where specifically noted below. In accordance with the embodiment illustrated in FIGS. 9 and 9A of the disclosure and as a non-limiting example, the joint assembly 1200 does not include the nut 1140 and the clutch assembly 1202 does not include the first clutch member 378 described and illustrated in relation to FIGS. 3-8 of the disclosure. According to the embodiment illustrated in FIGS. 9 and 9A and as a non-limiting example, the first clutch member 378 may be integrally formed as part of a second joint member 1204 of the joint assembly 1200. It is within the scope of this disclosure and as a non-limiting example that the joint assembly 1200 may be a universal joint assembly, a U-joint, a Cardan joint assembly, A Spicer joint assembly or a Hooke's joint assembly.

In accordance with the embodiment illustrated in FIG. 9 of the disclosure and as a non-limiting example, the first joint member 1102 may be drivingly connected to at least a portion of the second joint member 1204 by the one or more third joint members 1106 of the joint assembly 1200. As best seen in FIG. 9 of the disclosure and as a non-limiting example, the second joint member 1204 may have a first end 1206, a second end 1208, a first end portion 1210, a second end portion 1212, an intermediate portion 1214 and an outer surface 1216. At least a portion of the first end portion 1210 of the second joint member 1204 may include a first yoke arm 1218 and a second yoke arm 1220. The first yoke arm 1218 of the second joint member 1204 may have a first yoke arm aperture 1222 therein and the second yoke arm 1220 of the second joint member 1204 may have a second yoke arm aperture 1224 therein. The first yoke arm aperture 1222 in the first yoke arm 1218 of the second joint member 1204 may be aligned with the second yoke arm aperture 1224 in the second yoke arm 1220 of the second joint member 1204 of the joint assembly 1200. As best seen in FIG. 9 of the disclosure and as a non-limiting example, the first yoke arm aperture 1222 and the second yoke arm aperture 1224 may be of a size and shape to receive and/or retain at least a portion of the one or more trunnions 1114 of the third joint member 1106.

Extending inward into at least a portion of the second joint member 1204, from at least a portion of the second end 1208 of the second joint member 1204, is a first hollow interior portion 1226 having a first inner surface 1228. As best seen in FIG. 9 of the disclosure and as a non-limiting example, at least a portion of the clutch assembly 1202, the ball and ramp assembly 578 and/or the actuation assembly 484 may be disposed within at least a portion of the first hollow interior portion 1226 of the second joint member 1204 of the joint assembly 1200.

As illustrated in FIGS. 9 and 9A of the disclosure and as a non-limiting example, the second joint member 1204 may include a wall portion 1230 having a first side 1234 and/or a second side 1232. The wall portion 1230 of the second joint member 1204 may provide a barrier separating at least a portion of the first hollow interior portion 1226 of the second joint member 1204 from the environment. As a result, it is within the scope of this disclosure and as a non-limiting example that the first hollow interior portion 1226 may terminate at the wall portion 1230. In light of the foregoing, it is therefore to be understood that at least a portion of the first side 1234 of the wall portion 1230 may form at least a portion of the first hollow interior portion 1226 of the second joint member 1204. It is within the scope of this disclosure and as a non-limiting example that the wall portion 1230 may be substantially solid of may include one or more apertures or openings therein fluidly connecting the first hollow interior portion 1230 of the second joint member 1204 to the environment.

At least a portion of the first sealing member 438 may be interposed between at least a portion of the housing 426 and the second joint member 1204 of the joint assembly 1200. As best seen in FIG. 9 of the disclosure and as a non-limiting example, at least a portion of the inner portion 440 of the first sealing member 438 may be sealingly engaged with at least a portion of the outer surface 1216 of the intermediate portion 1214 of the second joint member 1204. Additionally, as best seen in FIG. 7 of the disclosure and as a non-limiting example, at least a portion of the outer portion 444 of the first sealing member 438 may be sealingly engaged with at least a portion of the inner surface 428 of the first end portion 432 of the housing 426 of the clutch assembly 1202. It is therefore to be understood that the first sealing member 438 aids in sealing the clutch assembly 1202 thereby aiding in preventing the migration of dirt, debris and/or moisture into the clutch assembly 1202.

The clutch assembly 1202 may further include the cover portion 446. The cover portion 446 aids in preventing dirt and/or debris from coming into direct contact with the first sealing member 438 thereby aiding in increasing the overall life and durability of the first sealing member 438. At least a portion of the inner portion 448 of the cover portion 446 may be integrally connected to and/or sealingly engaged with at least a portion of the outer surface 1216 of the intermediate portion 1214 of the of the second joint member 1204 of the joint assembly 1200. Additionally, at least a portion of the outer portion 450 of the cover portion 446 may be disposed radially outboard from at least a portion of the outer surface 430 of the first end portion 432 of the housing 426.

At least a portion of the one or more first bearing assemblies 452 may be interposed between the housing 426 and the second joint member 1204 of the joint assembly 1200. As best seen in FIG. 9 of the disclosure and as a non-limiting example, at least a portion of the one or more first bearing assemblies 452 may be in direct contact with at least a portion of the outer surface 1216 of the second joint member 1204 and the inner surface 428 of the housing 426. It is therefore to be understood that the one or more first bearing assemblies 452 aid in providing rotational support for at least a portion of the second joint member 1204 of the joint assembly 1200.

Circumferentially extending along at least a portion of the first inner surface 1228 of the first hollow interior portion 1266 of the second joint member 1204 is a first plurality of splines 1236. The first plurality of splines 1236 of the second joint member 1204 may be complementary to and meshingly engaged with the plurality of splines 514 circumferentially extending along the outer surface 512 of the first housing portion 502. As a result, it is therefore to be understood that the first housing portion 502 may be drivingly connected to at least a portion of the second joint member 1204 of the joint assembly 1200.

In accordance with the embodiment illustrated in FIGS. 9 and 9A of the disclosure and as a non-limiting example, at least a portion of the second O-ring 518 of the clutch assembly 1202 may be sealingly engaged with at least a portion of the outer surface 512 of the first housing portion 502 and the first inner surface 1228 of the second joint member 1204. As a result, the second O-ring 518 aids in preventing the migration of dirt, debris and/or moisture into the clutch assembly 1202 thereby aiding in increasing the overall life and durability of the clutch assembly 1202.

As best seen in FIG. 9A of the disclosure and as a non-limiting example, the second joint member 1204 may include a second plurality of splines 1238 circumferentially extending along at least a portion of the first inner surface 1228 of the first hollow interior portion 1226 of the second joint member 1204. The second plurality of splines 1238 of the second joint member 1204 may be complementary to and meshingly engaged with at least a portion of the plurality of splines 592 of the armature 492 and/or the plurality of splines 606 of the second engagement member 496 of the clutch assembly 1202. It is within the scope of this disclosure and as a non-limiting example that the first plurality of splines 1236 may have an innermost diameter that is greater than an innermost diameter of the second plurality of splines 1238 of the second joint member 1204.

In accordance with the embodiment illustrated in FIGS. 9 and 9A of the disclosure and as a non-limiting example, at least a portion of a receiving portion 1240 may extend inward from at least a portion of the first side 1234 of the wall portion 1230 of the second joint member 1204 and into at least a portion of the wall portion 1230. It is within the scope of this disclosure and as a non-limiting example that the receiving portion 1240 may extend either all of the way through the wall portion 1230 or only part of the way through the wall portion 1230 of the second joint member 1204.

Interposed between at least a portion of the first end portion 472 of the second shaft 466 and a surface 1242 defining the receiving portion 1240 is the second bearing assembly 478. The second bearing assembly 478 provides rotational support for at least a portion of the second shaft 466 thereby allowing the second joint member 1204 to rotate relative to the second shaft 466 when in operation.

According to the embodiment illustrated in FIG. 9 and as a non-limiting example, the joint assembly 1200 may further include a grease cap 1244. The grease cap 1244 may aid in sealing at least a portion of the clutch assembly 1202 from the environment. At least a portion of an outer surface 1246 of the grease cap 1244 may be connected to and/or sealingly engaged with at least a portion of the surface 1242 defining the receiving portion 1240 in the wall portion 1230 of the second joint member 1204 and/or the second side 1232 of the wall portion 1230 of the second joint member 1204 of the joint assembly 1200.

As best seen in FIG. 9A of the disclosure and as a non-limiting example, the first side 1234 of the wall portion 1230 of the second joint member 1204 may include one or more receiving portions 1248. The one or more receiving portions 1248 in the wall portion 1230 of the second joint member 1204 may be of a size and shape to receive and/or retain at least a portion of the second clutch member 482 of the clutch assembly 1202. In particular, the one or more receiving portions 1248 in the first side 1234 of the wall portion 1230 of the second joint member 1204 may be of a size and shape to receive and/or retain at least a portion of the one or more first engagement portions 566 of the increased diameter portion 560 of the second clutch member 482 of the clutch assembly 1202. When the clutch assembly 1202 is in a disengaged position 1247 illustrated in FIG. 9A of the disclosure and as a non-limiting example, the second clutch member 482 is not engaged with the one or more receiving portions 1248 in the wall portion 1230 of the second joint member 1204. As a result, a result, an amount of rotational power is unable to be transmitted from the second joint member 1204 to the second shaft 466 or from the second shaft 466 to the second joint member 1204. When the clutch assembly 1202 is in the engaged position 1249 illustrated in FIG. 9 of the disclosure and as a non-limiting example, at least a portion of the one or more receiving portions 1248 of the second joint member 1204 are engaged with at least a portion of the second joint member 482 of the clutch assembly 1202. As a result, an amount of rotational power is able to be transmitted from the second joint member 1204 to the second shaft 466 or from the second shaft 466 to the second joint member 1202 of the joint assembly 1200.

The one or more receiving portions 1248 in the wall portion 1230 of the second joint member 1204 may include one or more first sloped surfaces 1250 and/or one or more second sloped surfaces 1251 extending from a bottom portion 1252 of the one or more receiving portions 1248 to the first side 1234 of the wall portion 1230 of the second joint member 1204. The one or more first and second sloped surfaces 1250 and 1251 of the one or more receiving portions 1248 of the second joint member 1204 may be complementary to the one or more first and second sloped surfaces 568 and 570 of the one or more first engagement portions 566 of the second clutch member 482. It is within the scope of this disclosure and as a non-limiting example that the bottom portion 1252, the one or more first sloped surfaces 1250 and/or the one or more second sloped surfaces 1251 of the one or more receiving portions 1248 in the wall portion 1230 of the second joint member 1204 may provide a reaction surface for at least a portion of the second clutch member 482 allowing for the selective transition of the clutch assembly 1202 between the engaged 1249 and the disengaged position 1247. In accordance with the embodiment illustrated in FIG. 9A of the disclosure and as a non-limiting example, the one or more first sloped surfaces 1250 may extend at the same angle θ7 relative to a centerline C3 of the clutch assembly 1202 and the one or more second sloped surfaces 1251 may extend at an angle θ8 relative to the centerline C3. As a non-limiting example, the one or more second sloped surfaces 1251 may be a mirror image of the one or more first sloped surfaced 1250 of the one or more receiving portions 1248 of the second joint member 1204. It is within the scope of this disclosure and as a non-limiting example that the angles θ7 and θ8 of the one or more first and second sloped surfaces 1250 and 1251 may be substantially equal to each other and/or the angles θ7 and θ8 of the one or more first and second sloped surfaces 1250 and 1251 may be different from each other.

As best seen in FIG. 9A of the disclosure and as a non-limiting example, when the clutch assembly 1202 is in the disengaged position 1247 illustrated in FIG. 9A, the one or more first sloped surfaces 568, the one or more second sloped surfaces 570 and/or the outboard surface 572 of the one or more first engagement portions 566 of the second clutch member 482 are not engaged with the one or more first sloped surfaces 1250, the one or more second sloped surfaces 1251 and/or the bottom portion 1252 of the one or more receiving portions 1248 of the second joint member 1204. When the clutch assembly 1202 is in the engaged position 1249 illustrated in FIG. 9, at least a portion of the one or more first sloped surfaces 568, the one or more second sloped surfaces 570 and/or the outboard surface 572 of the one or more first engagement portions 566 of the second clutch member 482 may be engaged with at least a portion of the one or more first sloped surfaces 1250, the one or more second sloped surfaces 1251 and/or the bottom portion 1252 of the one or more receiving portions 1248 of the second joint member 1204. As a non-limiting example, the engagement between the one or more receiving portions 1248 of the second joint member 1204 and the one or more first engagement portions 566 of the second clutch member 482, when the clutch assembly 1202 is in the engaged position 1249, may be a locking engagement (i.e. a dog tooth like engagement) and/or a frictional engagement. It is therefore to be understood that the frictional engagement between the second joint member 1204 and the second clutch member 482 may be enough to allow substantially all or a variable amount of rotational force to be transmitted from the second joint member 1204 to the second shaft 466 or may be enough to allow substantially all or a variable amount of rotational force to be transmitted from the second shaft 466 to the second joint member 1204.

In light of the foregoing, it is within the scope of this disclosure and as a non-limiting example that the clutch assembly 1202 may be a dog clutch assembly, a friction clutch assembly or a wedge clutch assembly.

In accordance with the embodiment illustrated in FIG. 9A of the disclosure and as a non-limiting example, the second joint member 1204 may include one or more coatings 1254 on at least a portion of the first side 1234 of the wall portion 1230 of the second joint member 1204. The one or more coatings 1254 on the first side 1234 of the wall portion 1230 of the second joint member 1204 may be substantially continuous or discontinuous along at least a portion of the first side 1234 of the wall portion 1230. Additionally, the one or more coatings 1254 on the second joint member 1204 may be utilized in order to increase the overall frictional engagement between the second joint member 1204 and the second clutch member 482 of the clutch assembly 1202. It is within the scope of this disclosure and as a non-limiting example that the one or more coatings 1254 may be bonded directly to, adhesively attached to and/or connected to at least a portion of the second joint member 1204. As a non-limiting example, the one or more coatings 1254 may be made of one or more friction materials, one or more brake lining materials, a plurality of aramid fibres, a plurality of cellulose mineral fibres, a plurality of glass fibres, a plurality of copper fibres, a plurality of steel fibres, one or more carbon composite materials, one or more ceramic materials and/or any other type of material that is heat resistant and has a high coefficient of dynamic friction.

According to an embodiment of the disclosure and as a non-limiting example, the one or more coatings 1254 on the second joint member 1204 may be disposed on at least a portion of the one more receiving portions 1248 in the first side 1234 of the wall portion 1230 of the second joint member 1204. As illustrated in FIG. 9 of the disclosure and as a non-limiting example, at least a portion of the one or more coatings 1254 may be disposed on at least a portion of the bottom portion 1252, the one or more first sloped surfaces 1250 and/or the one or more second sloped surfaces 1251 of the one or more receiving portions 1248 of the second joint member 1204.

It is within the scope of this disclosure and as a non-limiting example that the one or more coatings 1254 on the second joint member 1204 may include one or more apertures, one or more grooves, one or more recesses, one or more patterns and/or one or more surface features. This aids in increasing the surface area of the one or more coatings 1254 and therefore aids in increasing the overall frictional engagement between the second joint member 1204 and the second clutch member 482 when the clutch assembly 1202 is in the engaged position 1249 illustrated in FIG. 9 of the disclosure.

By providing the clutch assembly 1202 with a second joint member 1204 with a wall portion 1230 having one or more receiving portions 1248 therein and a second clutch member 482 as described and illustrated herein, the amount of frictional engagement between the second joint member 1204 and the second clutch member 482 is increased over conventional friction clutch assembly designs. This aids in providing a clutch assembly 1202 having an increased overall functionality and reliability. Additionally, by providing the joint assembly 1200 with a clutch assembly 1202 as described and illustrated herein, the joint and/or clutch assemblies 1200 and/or 1202 are lighter, have a more compact packaging size, have fewer components, are less complex, are easier to assemble, are lighter, and are more cost efficient.

Figure 10:
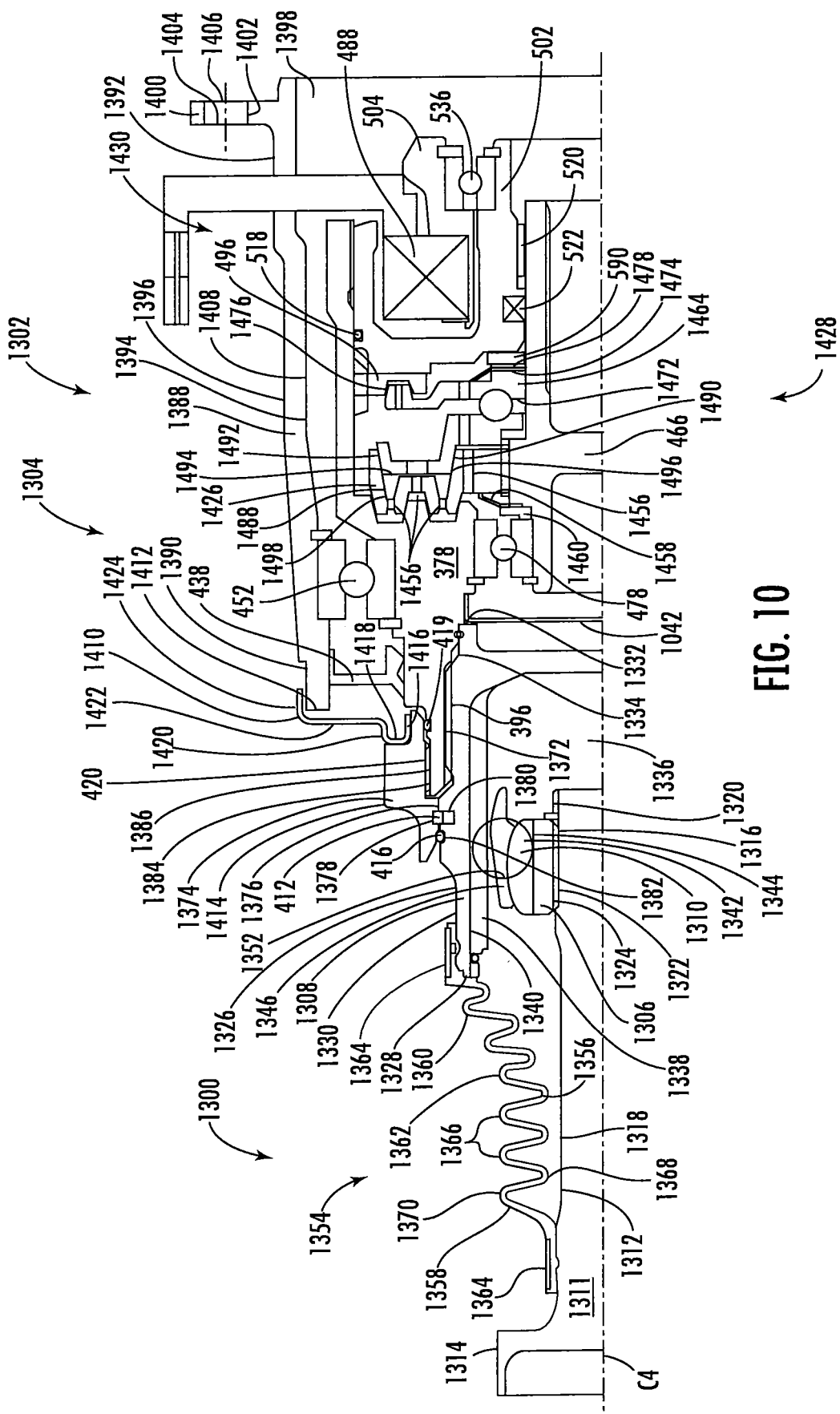
FIG. 10 is a cut-away schematic side-view of the joint assembly and the clutch assembly illustrated in FIGS. 3-9A according to still a further embodiment of the disclosure when the clutch assembly is in an engaged position.
Figure 10A:
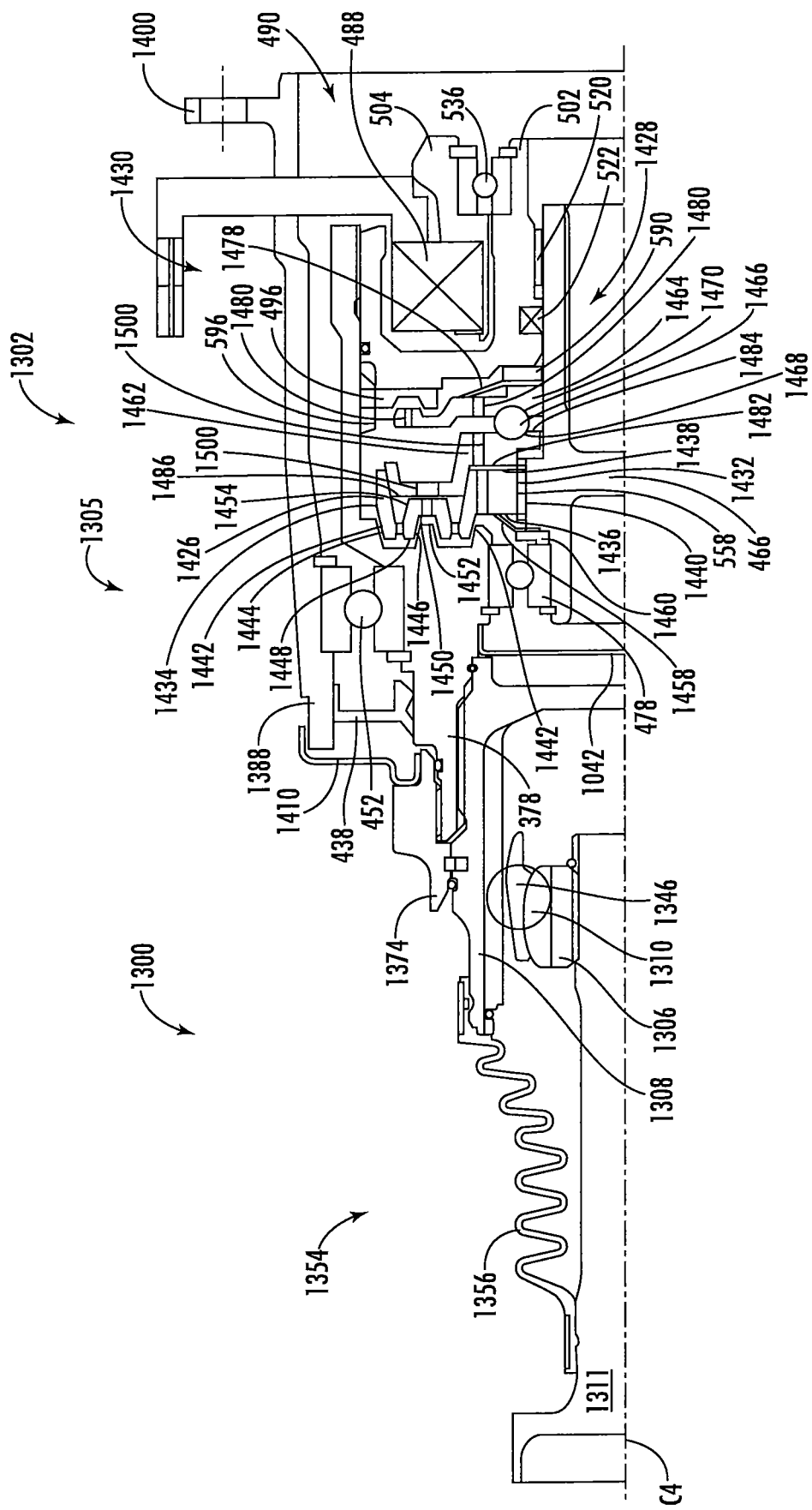
FIG. 10A is a cut-away schematic side-view of the joint assembly and the clutch assembly illustrated in FIG. 10 when the clutch assembly is in a disengaged position.

FIGS. 10 and 10A provide a cut-away schematic side-view of the joint assembly 1300 and the clutch assembly 1302 illustrated in FIGS. 3-9A according to still a further embodiment of the disclosure. The joint assembly 1300 and the clutch assembly 1302 illustrated in FIG. 10 are the same as the joint assemblies 300, 1000, 1100, and 1200 and the clutch assemblies 302, 702, 1002, and 1202 illustrated in FIGS. 3-9A of the disclosure, except where specifically noted below. In accordance with the embodiment illustrated in FIGS. 10 and 10A and as a non-limiting example, the joint assembly 1300 and the clutch assembly 1302 does not include the use of the armature 492, the second clutch member 482, the first engagement member 494, the second clutch member 482, and/or the first plate 580 described and illustrated in relation to FIGS. 3-9A of the disclosure.

As best seen in FIG. 10 of the disclosure and as a non-limiting example, the joint assembly 1300 may include a first joint member 1306 that is drivingly connected to a second joint member 1308 by one or more third joint members 1310. It is within the scope of this disclosure and as a non-limiting example, that the joint assembly 1300 may be a universal joint assembly, a U-joint, a Cardan joint assembly, A Spicer joint assembly or a Hooke's joint assembly.

At least a portion of a first shaft 1311 may be drivingly connected to at least a portion of the first joint member 1306 of the joint assembly 1300. As illustrated in FIG. 10 of the disclosure and as a non-limiting example, the first shaft 1311 may have an outer surface 1312, a first end portion 1314, a second end portion 1316, and an intermediate portion 1318 interposed between the first and second end portions 1314 and 1316. It is within the scope of this disclosure and as a non-limiting example that the first shaft 1311 may be a stub shaft, a pinion gear shaft, a transmission output shaft, a transfer case input shaft, a first transfer case output shaft, a second transfer case output shaft, a power transfer unit input shaft, a power transfer unit output shaft, a differential input shaft, a first differential output shaft, a second differential output shaft, a front differential input shaft, a first front axle differential output shaft, a second front axle differential output shaft, a first front axle half shaft, a second front axle half shaft, a rear differential input shaft, a first rear axle differential output shaft, a second rear axle differential output shaft, a first rear axle half shaft, a rear front axle half shaft, a forward tandem axle input shaft, an inter-axle differential input shaft, a first forward tandem axle differential output shaft, a second forward tandem axle differential output shaft, a first forward tandem axle half shaft, a second forward tandem axle half shaft, an inter-axle differential output shaft, a rear tandem axle differential input shaft, a first rear tandem axle differential output shaft, a second rear tandem axle differential output shaft, a first rear tandem axle half shaft, a second rear tandem axle half shaft, a drive shaft, a propeller shaft or a midship shaft.

A plurality of first shaft splines 1320 may circumferentially extend from at least a portion of the outer surface 1312 of the second end portion 1316 of the first shaft 1311 of the joint assembly 1300. The plurality of first shaft splines 1320 may be complementary to and meshingly engaged with a plurality of first joint member splines 1322 circumferentially extending along at least a portion of an inner surface 1324 of the first joint member 1306. It is therefore to be understood that the plurality of first shaft splines 1320 may drivingly connect at least a portion of the first shaft 1311 to at least a portion of the first joint member 1306 of the joint assembly 1300. As a non-limiting example, the first joint member 1306 may be an inner race of a constant velocity joint assembly.

As best seen in FIG. 10 and as a non-limiting example, the second joint member 1308 may have an outer surface 1326, a first end 1328, a first end portion 1330, a second end 1332, a second end portion 1334, and an intermediate portion 1336 interposed between the first and second end portions 1330 and 1334. Extending inward from the first end 1328 toward the second end 1332 of the second joint member 1308 is a first hollow interior portion 1336. The first hollow interior portion 1338 of the second joint member 1308 may have a size and shape to receive and/or retain at least a portion of the first joint member 1306 and/or the one or more third joint members 1308 of the joint assembly 1300. It is within the scope of this disclosure and as a non-limiting example that the second joint member 1308 may be an outer race.

One or more second joint member grooves 1338 may circumferentially extend along at least a portion of a first inner surface 1340 defining the first hollow interior portion 1336 of the joint assembly 1300. The one or more second joint member grooves 1338 in the second joint member 1308 may be complementary to one or more first joint member grooves 1342 circumferentially extending along at least a portion of an outer surface 1344 of the first joint member 1306. The one or more first joint member grooves 1342 and the one or more second joint member grooves 1338 may be of a size and shape to receive and/or retain at least a portion of the one or more third joint members 1308 therein. As a result, it is therefore to be understood that the one or more third joint members 1308 aid in drivingly connecting the first joint member 1306 to the second joint member 1308 of the joint assembly 1300.

In accordance with the embodiment illustrated in FIG. 10 and as a non-limiting example, the joint assembly 1300 may further include a fourth joint member 1346 having an inner surface 1348 and an outer surface 1350. Extending from the inner surface 1348 to the outer surface 1350 of the fourth joint member 1346 is one or more openings 1352. The one or more openings 1352 in the fourth joint member 1346 may be of a size and shape to receive and/or retain at least a portion of one or more of the one or more third joint members 1310 of the joint assembly 1300 therein. It is within the scope of this disclosure and as a non-limiting example that the fourth joint member 1346 may be a cage of a constant velocity joint assembly.

The joint assembly 1300 may include a boot assembly 1354. The boot assembly 1354 may include a flexible boot 1356 having a first end portion 1358, a second end portion 1360 and an intermediate portion 1362 interposed between the first and second end portions 1358 and 1360 of the flexible boot 1356. The flexible boot 1356 may be used in order to prevent the migration of an amount of dirt, debris, and/or moisture into the joint assembly 1300. As best seen in FIG. 10 of the disclosure and as a non-limiting example, at least a portion of the first end portion 1358 of the flexible boot 1356 may be connected to at least a portion of the outer surface 1312 of the first shaft 1311. Additionally, at least a portion of the second end portion 1360 of the flexible boot 1356 may be connected to at least a portion of the outer surface 1326 of the first end portion 1330 of the second joint member 1308 of the joint assembly 1300. It is within the scope of this disclosure and as a non-limiting example that the first end portion 1358 and the second end portion 1360 of the flexible boot 1356 may be secured to at least a portion of the first shaft 1311 and the second joint member 1308 by using one or more boot retention members 1364.

As best seen in FIG. 10 of the disclosure and as a non-limiting example, the intermediate portion 1362 of the flexible boot 1356 may include one or more convolutions 1366. The one or more convolutions 1366 of the flexible boot 1356 may be defined by one or more troughs 1368 and/or one or more crests 1370. The one or more convolutions 1366 of the flexible boot 1356 may aid in allowing the flexible boot 1356 to flex as needed while the joint assembly 1300 is in operation.

Circumferentially extending along at least a portion of the outer surface 1326 of the second joint member 1308 is a plurality of second joint member splines 1372. The plurality of second joint member splines 1372 are complementary to and meshingly engaged with the first plurality of splines 396 on the first inner surface 394 of the first clutch member 378 of the clutch assembly 1302. As a result, it is to be understood that the second joint member 1308 may be drivingly connected to at least a portion of the first clutch member 378.

At least a portion of a nut 1374 may be disposed outward from at least a portion of the second joint member 1308 and/or the first clutch member 378. The nut 1374 may be used in order to aid in axially restraining and securing at least a portion of the second joint member 1308 of the clutch assembly 1300 to at least a portion of the first clutch member 378 of the clutch assembly 1302. As best seen in FIG. 10 of the disclosure and as a non-limiting example, the nut 1374 may include a first inner surface 1376 having a nut snap-ring groove 1378 therein. The nut snap-ring groove 1378 may be complementary to a second joint member snap-ring groove 1380 circumferentially extending along at least a portion of the outer surface 1326 of the intermediate portion 1336 of the second joint member 1308. The second joint member snap-ring groove 1380 and the nut snap-ring groove 1378 may be of a size and shape to receive and/or retain at least a portion of a nut snap-ring 412 therein.

A second joint member sealing member groove 1382 may circumferentially extend along at least a portion of the outer surface 1326 of the intermediate portion 1336 of the second joint member 1308. The second joint member sealing member groove 1382 may be of a size and shape to receive and/or retain at least a portion of the first O-ring 416 therein. At least a portion of the first O-ring 416 may be in direct contact with and sealingly engaged with at least a portion of the outer surface 1326 of the second joint member 1308 and the first inner surface 1376 of the nut 1374 of the joint assembly 1300. The first O-ring 416 may be used in order to aid in increasing the overall life and durability of the connections between the second joint member 1308, the first clutch member 378, and/or the nut 1374.

According to the embodiment illustrated in FIG. 10 of the disclosure and as a non-limiting example, a plurality of nut threads 1384 may circumferentially extend along at least a portion of a second inner surface 1386 of the nut 1374. The plurality of nut threads 1386 may be complementary to and meshingly engaged with at least a portion of the plurality of first clutch member threads 420 on the outer surface 380 of the first clutch member 378. It is therefore to be understood that the meshing engagement of the plurality of nut threads 1386 and the plurality of first clutch member threads 420 aid in securing and axially restraining the second joint member 1308 relative to the first clutch member 378.

At least a portion of the fourth O-ring 419 may be in direct contact with and sealingly engaged with at least a portion of the second inner surface 1384 of the nut 1374 and the outer surface 380 of the first clutch member 378. The fourth O-ring 419 aids in preventing an amount of dirt, debris, and/or moisture from contacting the threadingly engagement between the nut 1374 and the first clutch member 378.

Disposed outboard from at least a portion of the first clutch member 378, the second joint member 1308, and/or the nut 1374 is a housing 1388 having a first end portion 1390, a second end portion 1392, an inner surface 1394, and an outer surface 1396. The inner surface 1394 and the outer surface 1396 of the housing 1388 define a hollow portion 1398 therein. The hollow portion 1398 of the housing 1388 may be of a size and shape to receive and/or retain at least a portion of the clutch assembly 1302 therein. It is within the scope of this disclosure and as a non-limiting example that the housing 1388 may form at least a portion of or may be connected to at least a portion of a front axle housing, a rear axle housing, a forward tandem axle housing, a rear tandem axle housing, a differential housing, a front differential housing, a read differential housing, a forward tandem axle differential housing, a rear tandem axle differential housing, an inter-axle differential housing, a transmission housing, a power transfer unit housing or a transfer case housing.

Extending from at least a portion of the outer surface 1396 of the second end portion 1392 of the housing 1388 is an increased diameter portion 1400. The increased diameter portion 1400 of the housing 1388 may include one or more apertures 1402 extending from a first side 1404 to a second side 1406 of the increased diameter portion 1400. The one or more apertures 1402 may be of a size and shape to receive and/or retain at least a portion of one or more mechanical fasteners (not shown). As a result, it is therefore to be understood that the increased diameter portion 1400 may provide the housing 1388 with a flange portion allowing at least a portion of the housing 1388 to be connected to at least a portion of a front axle housing, a rear axle housing, a forward tandem axle housing, a rear tandem axle housing, a differential housing, a front differential housing, a read differential housing, a forward tandem axle differential housing, a rear tandem axle differential housing, an inter-axle differential housing, a transmission housing, a power transfer unit housing or a transfer case housing of the vehicle (not shown).

The housing 1388 may include one or more housing grooves 1408 extending along at least a portion of the inner surface 1394 of the housing 1388. As illustrated in FIG. 10 and as a non-limiting example, the one or more housing grooves 1408 may extend along at least a portion of the inner surface 1394 of the housing 1388 toward the one or more first bearing assemblies 452. As previously discussed herein, the one or more first bearing assemblies 452 aid in providing rotational support between the housing 1388 and the first clutch member 378. The one or more housing grooves 1408 may be used in order to allow an amount of lubricating fluid (not shown) to reach the one or more first bearing assemblies 452. This aids in improving the overall life and durability of the one or more first bearing assemblies 452.

At least a portion of a cover portion 1410 may be used in order to seal off at least a portion of a first end 1412 of the housing 1388. The cover portion 1410 aids in preventing an amount of dirt, debris, and/or moisture from coming into direct contact with the first sealing member 438. As best seen in FIG. 10 of the disclosure and as a non-limiting example, at least a portion of the cover portion 1410 may be connected to at least a portion of an outer surface 1414 of the nut 1374. Additionally, as best seen in FIG. 10 and as a non-limiting example, at least a portion of an end of the cover portion 1410, opposite the nut 1374, may be disposed outboard from at least a portion of the first end portion 1390 of the housing 1388.

In accordance with the embodiment illustrated in FIG. 10 and as a non-limiting example, the cross-sectional profile of the cover portion 1410 may include, in order, a first substantially horizontal portion 1416, a first substantially radial portion 1418, a second substantially horizontal portion 1420, a second substantially radial portion 1422, and/or a third substantially horizontal portion 1424. At least a portion of the first substantially horizontal portion 1416 and/or the first substantially radial portion 1418 may be connected to at least a portion of the outer surface 1414 of the nut 1374 and at least a portion of the third substantially horizontal portion 1424 may be disposed outward from at least a portion of the first end portion 1390 of the housing 1388.

As best seen in FIG. 10A of the disclosure and as a non-limiting example, the clutch assembly 1302 may include the first clutch member 378, a second clutch member 1426, a ball and ramp assembly 1428, the first engagement member 494, and/or an actuation assembly 1430. According to the embodiment illustrated in FIG. 10A of the disclosure and as a non-limiting example, the second clutch member 1426 may have an inner surface 1432, an outer surface 1434, a first side 1436, and a second side 1438. Circumferentially extending along at least a portion of the inner surface 1432 of the second clutch member 1426 is a plurality of second clutch member splines 1440. The plurality of second clutch member splines 1440 may be complementary to and meshingly engaged with at least a portion of the plurality of second shaft splines 558 of the second shaft 466.

Extending outward from at least a portion of the first side 1436 of the second clutch member 1426 is one or more first engagement portions 1442. The one or more first engagement portions 1442 may be of a size and shape to be received and/or retained within at least a portion of the one or more receiving portions 546 in the wall portion 458 of the first clutch member 378. When the clutch assembly 1302 is in a disengaged position 1305 illustrated in FIG. 10A, the one or more first engagement portions 1442 of the second clutch member 1426 are not engaged with the one or more receiving portions 546 in the first clutch member 378. Additionally, when the clutch assembly 1302 is in an engaged position 1304 illustrated in FIG. 10, the one or more first engagement portions 1442 of the second clutch member 1426 are engaged with the one or more receiving portions 546 in the first clutch member 378.

According to the embodiment illustrated in FIG. 10A and as a non-limiting example, the one or more first engagement portions 1442 of the second clutch member 1426 may have one or more first sloped surfaces 1444 and/or one or more second sloped surfaces 1446 extending from the first side 1436 to an outboard surface 1448 of the one or more first engagement portions 1442. The one or more first and second sloped surfaces 1444 and 1446 of the second clutch member 1426 may be complementary to the one or more first and second sloped surfaces 548 and 549 of the first clutch member 378 of the joint assembly 1302. It is within the scope of this disclosure and as a non-limiting example that the outboard surface 1448, the one or more first sloped surfaces 1444, and/or the one or more second sloped surfaces 1446 of the one or more first engagement portions 1442 of the second clutch member 1426 may provide a reaction surface for at least a portion of the second clutch member 1426 thereby allowing the clutch assembly 1302 to selectively transition between the engaged and disengaged positions 1304 and 1305. In accordance with the embodiment illustrated in FIG. 10A and as a non-limiting example, the one or more first sloped surfaces 1444 may extend at the same angle θ9 relative to the centerline C4 and the one or more second sloped surfaces 1446 may extend at an angle θ10 relative to the centerline C4 of the clutch assembly 1302. As a non-limiting example, the one or more second sloped surfaces 1446 may be a mirror image of the one or more first sloped surfaced 1444 of the second clutch member 1426 of the clutch assembly 1302. It is within the scope of this disclosure and as a non-limiting example that the angles θ9 and θ10 of the one or more first and second sloped surfaces 1444 and 1446 may be substantially equal to each other and/or the angles θ9 and θ10 of the one or more first and second sloped surfaces 1444 and 1446 may be different from each other.

The one or more first and second sloped surfaces 1444 and 1446 may provide the second clutch member 1426 with one or more receiving portions 1450. As best seen in FIG. 10A of the disclosure and as a non-limiting example, the one or more receiving portions 1450 of the second clutch member 1426 may be of a size and shape to receive and/or retain at least a portion of the one or more outwardly extending portions 1452 of the first clutch member 378 therein. It is therefore within the scope of this disclosure and as a non-limiting example that the one or more receiving portions 1450 and/or the one or more outwardly extending portions 1452 may have a substantially conical cross-sectional shape and/or a substantially frusto-conical cross-sectional shape.

When the clutch assembly 1302 is in the disengaged position 1305 illustrated in FIG. 10A and as a non-limiting example, the one or more first sloped surfaces 1444, the one or more second sloped surfaces 1446 and/or the outboard surface 1448 of the one or more first engagement portions 1442 of the second clutch member 1426 are not engaged with the one or more first sloped surfaces 548, the one or more second sloped surfaces 549 and/or the bottom portion 550 of the one or more receiving portions 546 of the first clutch member 378. When the clutch assembly 1302 is in the engaged position 1304 illustrated in FIG. 10 and as a non-limiting example, at least a portion of the one or more first sloped surfaces 1444, the one or more second sloped surfaces 1446 and/or the outboard surface 1448 of the one or more first engagement portions 1442 of the second clutch member 1426 may be engaged with at least a portion of the one or more first sloped surfaces 548, the one or more second sloped surfaces 549 and/or the bottom portion 550 of the one or more receiving portions 546 of the first clutch member 378. As a non-limiting example, the engagement between the one or more receiving portions 546 of the first clutch member 378 and the one or more first engagement portions 1442 of the second clutch member 1426, when in the engaged position 1304, may be a locking engagement (i.e. a dog tooth like engagement) and/or a frictional engagement. It is therefore to be understood that the frictional engagement between the first and second clutch members 378 and 1426 may be enough to allow substantially all or a variable amount of rotational force to be transmitted between the first clutch member 1308, and the second shaft 466 or may be enough to allow substantially all or a variable amount of rotational force to be transmitted between the second shaft 466 and the second joint member 1308.

In light of the foregoing, it is within the scope of this disclosure and as a non-limiting example that the clutch assembly 1302 may be a dog clutch assembly, a friction clutch assembly or a wedge clutch assembly.

One or more second engagement portions 1454 may extend outward from at least a portion of the second side 1438 of the second clutch member 1426 of the clutch assembly 1302. As illustrated in FIG. 10A of the disclosure and as a non-limiting example, the one or more second engagement portions 1454 extend away from the second side 1438 and/or the one or more first engagement portions 1442 of the second clutch member 1426 toward the actuation assembly 484 of the clutch assembly 1302. The one or more second engagement portions 1454 allow the actuation assembly 1430 to apply an even amount of force onto the second clutch member 1426 when transitioning from the disengaged position 1305 to the engaged position 1304.

It is within the scope of this disclosure and as a non-limiting example that the second clutch member 1426 may include the one or more slots 575 described and illustrated herein.

As best seen in FIG. 10 of the disclosure and as a non-limiting example, the second clutch member 1426 may include one or more second clutch member apertures 1456. The one or more second clutch member apertures 1456 may extend from a first side 1436 to a second side 1438 of the second clutch member 1426. In accordance with the embodiment illustrated in FIG. 10 and as a non-limiting example, the one or more second clutch member apertures 1456 may be disposed in the body portion, the one or more first engagement portions 1442, the one or more receiving portions 1450, and/or the one or more second engagement portions 1454 of the second clutch member 1426. The one or more apertures 1456 may be of a size and shape needed to allow an amount of fluid (not shown) to be transmitted therethrough. It is within the scope of this disclosure and as a non-limiting example that the fluid (not shown) may be a lubrication fluid and/or any other type of fluid that is capable of reducing the overall amount of heat generated by the engagement of the first and second clutch members 378 and 1426 when in the engaged position 1304. Additionally, it is within the scope of this disclosure and as a non-limiting example, that the fluid (not shown) may be a lubrication fluid and/or any other type of fluid that is capable of lubricating the various components of the joint assembly 1300 and/or the clutch assembly 1302 when in operation. Furthermore, it is within the scope of this disclosure and as a non-limiting example that the fluid (not shown) may be a lubrication fluid and/or any other type of fluid that is capable of removing an amount of wear particles from the joint assembly 1300 and/or the clutch assembly 1302 when in operation. This aids in increasing the overall life and durability of the joint assembly 1300 and/or the clutch assembly 1302.

The clutch assembly 1302 may further include one or more first biasing members 1458 and/or one or more retention members 1460. As best seen in FIG. 10 and as a non-limiting example, at least a portion of the one or more first biasing members 1458 and/or the one or more retention members 1460 may be interposed between at least a portion of the second bearing assembly 478 and the second clutch member 1426. The one or more first biasing members 1458 may aid in transitioning the clutch assembly 1302 from the engaged position 1304 to the disengaged position 1305 illustrated in FIGS. 10 and 10A of the disclosure. When the clutch assembly 1302 is in the engaged position 1304, the one or more first biasing members 1458 may be compressed and loaded with an amount of energy therein. When the actuation assembly 1430 stops applying an amount of engagement force onto the second clutch member 1426, the energy stored within the one or more first biasing members 1458 may be released thereby forcing the second clutch member 1426 out of engagement with the first clutch member 378 and transitioning the clutch assembly 1302 into the disengaged position 1305. Additionally, it is to be understood that the one or more first biasing members 1458 may be used in order to aid in preventing the second clutch member 1426 from inadvertently and therefore unintentionally becoming engaged with the first joint member 378. It is within the scope of this disclosure and as a non-limiting example that the one or more first biasing members 1458 may be one or more springs, one or more coil springs, and/or one or more wave springs capable of transitioning the second clutch member 1426 out of engagement with the first clutch member 378.

In accordance with the embodiment illustrated in FIGS. 10 and 10A and as a non-limiting example, at least a portion of the ball and ramp assembly 1428 may be interposed between the second clutch member 1426 and the housing 490 of the actuation assembly 1430. As best seen in FIG. 10A of the disclosure and as a non-limiting example, the ball and ramp assembly 1428 may include a first plate 1462, a second member 1464, and/or one or more balls 1466 interposed between the first and second plates 1462 and 1464. The first plate 1462 may have one or more first plate grooves 1468 having a variable depth and the second plate 1464 may have one or more second plate grooves 1470 having a variable depth. The one or more first plate grooves 1468 may be complementary to the one or more second plate grooves 1470. At least a portion of the one or more balls 1466 may be disposed within at least a portion of the one or more first and second plate grooves 1468 and 1470 in the first and second plates 1462 and 1646 of the ball and ramp assembly 1428. As the first and/or second plate 1462 and/or 1464 rotate, the one or more balls 1466 travel along the one or more first plate grooves 1468 and 1470 forcing the first plate 1462 axially away from the second plate 1464 of the ball and ramp assembly 1428 and toward the second clutch member 1426 of the clutch assembly 1302. Once at least a portion of the first plate 1462 is in direct contact with at least a portion of the second clutch member 1426, the first plate 1462 may drive the second clutch member 1426 toward the first clutch member 378 thereby transitioning the clutch assembly 1302 from the disengaged position 1305 to the engaged position 1304.

According to an embodiment of the disclosure and as a non-limiting example, the first engagement member 494 of the actuation assembly 484 previously described and illustrated herein, may be integrally formed as part of the second plate 1462 of the ball and ramp assembly 1428.

In accordance with the embodiment where the second clutch member 1426 has one or more second engagement portions 1454, the one or more second engagement portions 1454 may be used in order to aid in transitioning the second clutch member 1426 from the disengaged position 1305 to the engaged position 1304 illustrated in FIGS. 10 and 10A. Once at least a portion of the first plate 1462 is in direct contact with at least a portion of the one or more second engagement portions 1454 of the second clutch member 1426, the first plate 1462 may drive the second clutch member 1426 toward the first clutch member 378 thereby transitioning the clutch assembly 1302 from the disengaged position 1305 to the engaged position 1304.

As best seen in FIG. 10 of the disclosure and as a non-limiting example, the second plate 1464 may have a first side 1472 and a second side 1474. At least a portion of one or more second plate engagement portions 1476 may circumferentially extend outward from at least a portion of the second side 1474 of the second plate 1464. The one or more second plate engagement portions 1476 of the second plate 1464 may be selectively engagable with at least a portion of the one or more second engagement portions 610 of the second engagement member 496 of the actuation assembly 1430. In accordance with an embodiment illustrated in FIG. 10 as a non-limiting example, the one or more second plate engagement portions 1476 of the second plate 1464 may be an axially extending portion and the one or more second engagement portions 610 may be a receiving portion having a size and shape to receive and/or retain at least a portion of the one or more second plate engagement portions 1476 of the second plate 1464. When the second plate 1464 is not engaged with the second engagement member 496, the ball and ramp assembly 1428 is not being rotated and the clutch assembly 1302 is in the disengaged position 1305. Additionally, when the second plate 1464 is engaged with at least a portion of the second engagement member 496, an amount of rotational power from the first clutch member 378 is transmitted from the first clutch member 378 to the second plate 1464 of the ball and ramp assembly 1428. This allows the ball and ramp assembly 1428 to transition the clutch assembly 1302 from the disengaged position 1305 illustrated in FIG. 10A to the engaged position 1304 illustrated in FIG. 10.

According to the embodiment illustrated in FIGS. 10 and 10A and as a non-limiting example, the second plate 1464 of the ball and ramp assembly 1428 may be made of magnetic material that is capable of interacting with the magnetic field 544 generated by the electro-magnetic coil 488 of the actuation assembly 1430. When the ECU 542 instructs the source of electrical power 540 to provide the electro-magnetic coil 488 with the power needed to create the magnetic field 544, the magnetic field 544 may drive the first engagement member 484 toward the electro-magnetic coil 488. It is therefore to be understood that the second plate 1464 and the magnetic field 544 created by the electro-magnetic coil 488 alone, may be used in order drive the second plate 1464 into engagement with the second engagement member 496 of the actuation assembly 1430 thereby transitioning the clutch actuation assembly 1430 and the clutch assembly 1302 from the disengaged position 1305 illustrated in FIG. 10 to the engaged position 1304 illustrated in FIG. 10A. This aids in reducing the overall number of parts, reducing the overall packaging size, the complexity, assembly time, costs, and weight of the clutch assembly 1302.

As best seen in FIG. 10 of the disclosure and as a non-limiting example, one or more second biasing members 1478. At least a portion of the one or more second biasing members 1478 may be interposed between at least a portion of the second plate 1464 and the housing 490 of the actuation assembly 1430. In particular, at least a portion of the one or more second biasing members 1478 may be interposed between at least a portion of the second plate 1464 and the one or more fourth bearing assemblies 590. The one or more second biasing members 1478 may aid in selectively transitioning the clutch assembly 1302 between the engaged position 1304 and the disengaged position 1305 illustrated in FIGS. 10 and 10A. When the clutch assembly 1302 is in the engaged position 1304, the one or more second biasing members 1478 may be compressed and loaded with an amount of energy therein. When the actuation assembly 1430 stops applying an amount of engagement force onto the second clutch member 1426, the energy stored within the one or more second biasing members 1478 may be released thereby forcing the second plate 1464 out of engagement with the second engagement member 496 and transitioning the clutch assembly 1302 into the disengaged position 1305. Additionally, it is to be understood that the one or more second biasing members 1478 may be used in order to aid in preventing the second plate 1464 from inadvertently and therefore unintentionally becoming engaged with the second engagement member 496. It is within the scope of this disclosure and as a non-limiting example that the one or more second biasing members 1478 may be one or more springs, one or more coil springs, and/or one or more wave springs capable of transitioning the second plate 1464 out of engagement with the second engagement member 496.

One or more second plate apertures 1480 may extend from the first side 1472 to the second side 1474 of the second plate 1464. In accordance with the embodiment illustrated in FIG. 10A and as a non-limiting example, the one or more second plate apertures 1480 may be disposed in the body portion and/or the one or more second plate engagement portions 1476 of the second plate 1464. The one or more second plate apertures 1480 may be of a size and shape needed to allow an amount of fluid (not shown) to be transmitted therethrough. It is within the scope of this disclosure and as a non-limiting example that the fluid (not shown) may be a lubrication fluid and/or any other type of fluid that is capable of reducing the overall amount of heat generated by the engagement of the second plate 1464 and the second engagement member 496 when in the engaged position 1304. Additionally, it is within the scope of this disclosure and as a non-limiting example, that the fluid (not shown) may be a lubrication fluid and/or any other type of fluid that is capable of lubricating the various components of the joint assembly 1300 and/or the clutch assembly 1302 when in operation. Furthermore, it is within the scope of this disclosure and as a non-limiting example that the fluid (not shown) may be a lubrication fluid and/or any other type of fluid that is capable of removing an amount of wear particles from the joint assembly 1300, the clutch assembly 1302, and/or the actuation assembly 1430 when in operation. This aids in increasing the overall life and durability of the joint assembly 1300, the clutch assembly 1302, and/or the actuation assembly 1430.

In accordance with the embodiment illustrated in FIG. 10A and as a non-limiting example, the first plate 1462 of the ball and ramp assembly 1428 may have a first side 1482 and a second side 1484. According to the embodiment illustrated in FIG. 10A and as a non-limiting example, the one or more first plate grooves 1468 may be disposed in at least a portion of the second side 1484 of the first plate 1462 of the ball and ramp assembly 1428. When the clutch assembly 1302 is in the engaged position 1304 illustrated in FIG. 10, at least a portion of the first plate 1462 of the ball and ramp assembly 1428 may be in direct contact with at least a portion of the second clutch member 1426 and selectively may apply a pre-determined amount of force thereon.

According to the embodiment illustrated in FIG. 10A and as a non-limiting example, the first plate 1462 of the ball and ramp assembly 1428 may include one or more first plate engagement portions 1486. The one or more first plate engagement portions 1486 may extend outward from at least a portion of the first side 1482 of the first plate 1462 toward the second clutch member 1426 of the clutch assembly 1302. When the clutch assembly 1302 is in the engaged position 1304, at least a portion of the one or more first plate engagement portions 1486 may be in direct contact with and may apply an amount of force onto at least a portion of the one or more second engagement portions 1454 of the second clutch member 1426. Once the second plate 1462 is in contact with the second clutch member 1426, the second plate 1462 of the ball and ramp assembly 1428 may drive the second clutch member 1426 into engagement with the first clutch member 378 transitioning the clutch assembly 1302 from the disengaged position 1305 to the engaged position 1304.

As best seen in FIG. 10 and as a non-limiting example, the one or more first plate engagement portions 1486 of the first plate 1462 may be of a size and shape to be received and/or retained within at least a portion of one or more second receiving portions 1488 in the second side 1438 of the second clutch member 1426. In accordance with this embodiment and as a non-limiting example, the one or more first plate engagement portions 1486 may have one or more first sloped surfaces 1490 and/or one or more second sloped surfaces 1492 extending from the first side 1482 to an outboard surface 1494. The one or more first and second sloped surfaces 1490 and 1492 of the first plate 1462 may be complementary to one or more first sloped surfaces 1496 and one or more second sloped surfaces 1498 one or more second receiving portions 1488 of the second clutch member 1426. It is within the scope of this disclosure and as a non-limiting example that the outboard surface 1494, the one or more first sloped surfaces 1490, and/or the one or more second sloped surfaces 1492 of the one or more first plate engagement portions 1486 of the second plate 1462 may provide a reaction surface for at least a portion of the first plate 1462 thereby allowing the clutch assembly 1302 to selectively transition between the engaged and disengaged positions 1304 and 1305. In accordance with the embodiment illustrated in FIG. 10 and as a non-limiting example, the one or more first sloped surfaces 1490 may extend at the same angle θ11 relative to the centerline C4 and the one or more second sloped surfaces 1492 may extend at an angle θ12 relative to the centerline C4 of the clutch assembly 1302. As a non-limiting example, the one or more second sloped surfaces 1492 may be a mirror image of the one or more first sloped surfaced 1490 of the first plate 1426 of the clutch assembly 1302. It is within the scope of this disclosure and as a non-limiting example that the angles θ11 and θ12 of the one or more first and second sloped surfaces 1490 and 1492 may be substantially equal to each other and/or the angles θ11 and θ12 of the one or more first and second sloped surfaces 1490 and 1492 may be different from each other.

When the clutch assembly 1302 is in the disengaged position 1305 and as a non-limiting example, the one or more first sloped surfaces 1490, the one or more second sloped surfaces 1492 and/or the outboard surface 1490 of the one or more first plate engagement portions 1486 of the first plate 1462 are not engaged with the one or more first sloped surfaces 1496, the one or more second sloped surfaces 1498 and/or the one or more second engagement portions 1454 of the one or more second receiving portions 1488 of the second clutch member 1426. When the clutch assembly 1302 is in the engaged position 1304 and as a non-limiting example, at least a portion of the one or more first sloped surfaces 1490, the one or more second sloped surfaces 1492 and/or the outboard surface 1490 of the one or more first plate engagement portions 1486 of the first plate 1462 are engaged with the one or more first sloped surfaces 1496, the one or more second sloped surfaces 1498 and/or the one or more second engagement portions 1454 of the one or more second receiving portions 1488 of the second clutch member 1426. As a non-limiting example, the engagement between the one or more second receiving portions 1488 of the second clutch member 1426 and the one or more first plate engagement portions 1486 of the first plate 1462, when in the engaged position 1304, may be a locking engagement (i.e. a dog tooth like engagement) and/or a frictional engagement. It is therefore to be understood that the frictional engagement between the first plate 1462 and second clutch member 1426 may be enough to allow substantially all or a variable amount of rotational force to be transmitted from the first clutch member 1308 to the second shaft 466 or may be enough to allow substantially all or a variable amount of rotational force to be transmitted from the second shaft 466 to the second joint member 1308.

In light of the foregoing, it is within the scope of this disclosure and as a non-limiting example that the engagement between the second clutch member 1426 and the first plate 1462 may be a dog clutch engagement, a friction clutch engagement or a wedge clutch engagement.

One or more first plate apertures 1500 may extend from the first side 1482 to the second side 1484 of the first plate 1462. As illustrated in FIG. 10A and as a non-limiting example, the one or more first plate apertures 1500 may be disposed in the body portion and/or the one or more first plate engagement portions 1486 of the first plate 1462 of the ball and ramp assembly 1428. The one or more first plate apertures 1500 may be of a size and shape needed to allow an amount of fluid (not shown) to be transmitted therethrough. It is within the scope of this disclosure and as a non-limiting example that the fluid (not shown) may be a lubrication fluid and/or any other type of fluid that is capable of reducing the overall amount of heat generated by the engagement of the first plate 1462 and the second clutch member 1426 when in the engaged position 1304. Additionally, it is within the scope of this disclosure and as a non-limiting example, that the fluid (not shown) may be a lubrication fluid and/or any other type of fluid that is capable of lubricating the various components of the joint assembly 1300, the ball and ramp assembly 1428, and/or the clutch assembly 1302 when in operation. Furthermore, it is within the scope of this disclosure and as a non-limiting example that the fluid (not shown) may be a lubrication fluid and/or any other type of fluid that is capable of removing an amount of wear particles from the joint assembly 1300, the clutch assembly 1302, the ball and ramp assembly 1428, and/or the actuation assembly 1430 when in operation. This aids in increasing the overall life and durability of the joint assembly 1300, the clutch assembly 1302, the ball and ramp assembly 1428, and/or the actuation assembly 1430.

As best seen in FIG. 10A and as a non-limiting example, one or more of the one or more second clutch member apertures 1456 in the second clutch member 1426 may be aligned with one or more of the one or more first plate apertures 1500 in the first plate 1462. By providing the one or more second clutch member apertures 1456 and the one or more first plate apertures 1500 arranged in this manner, it allows the fluid (not shown) to be efficiently transferred within the clutch assembly 1302, the ball and ramp assembly 1428, and/or the actuation assembly 1430.

According to an embodiment of the disclosure and as a non-limiting example, the second clutch member 1426 and/or the first plate 1462 may include one or more coatings (not shown). The one or more coatings (not shown) may be disposed on at least a portion of the first side 1436, the second side 1438, the one or more first engagement portions 1442, the one or more second engagement portions 1454, the one or more receiving portions 1450 and/or the one or more second receiving portions 1488 of the second clutch member 1426. Additionally, the one or more coatings (not shown) may be disposed on at least a portion of the first side 1482, the second side 1484, and/or the one or more first plate engagement portions 1486 of the first plate 1462 of the clutch assembly 1302. It is within the scope of the disclosure and as a non-limiting example that the one or more coatings (not shown) on the second clutch member 1426 and/or the first plate 1462 may be substantially continuous or discontinuous. The one or more coatings (not shown) on the second clutch member 1426 and/or the first plate 1462 may be utilized in order to increase the overall frictional engagement between the second clutch member 1426 and the first plate 1462 of the clutch assembly 1302. As a non-limiting example, the one or more coatings (not shown) may be bonded directly to, adhesively attached to, and/or connected to at least a portion of the second clutch member 1426 and/or the first plate 1462 of the clutch assembly 1302. Additionally, as a non-limiting example, the one or more coatings (not shown) may be made of one or more friction materials, one or more brake lining materials, a plurality of aramid fibres, a plurality of cellulose mineral fibres, a plurality of glass fibres, a plurality of copper fibres, a plurality of steel fibres, one or more carbon composite materials, one or more ceramic materials and/or any other type of material that is heat resistant and has a high coefficient of dynamic friction.

It is within the scope of this disclosure and as a non-limiting example that the one or more coatings (not shown) on the second clutch member 1426 and/or the first plate 1462 may include one or more apertures, one or more grooves, one or more recesses, one or more patterns and/or one or more surface features. This aids in increasing the surface area of the one or more coatings (not shown) and therefore aids in increasing the overall frictional engagement between the second clutch member 1426 and the first plate 1462 when the clutch assembly 1302 is in the engaged position 1304 illustrated in FIG. 10.

By providing the clutch assembly 1302 with a second clutch member 1426 and a ball and ramp assembly 1428 having a first plate 1462 and a second plate 1464 as described and illustrated herein, the amount of frictional engagement between the first clutch member 378 and the second clutch member 1426 is increased over conventional friction clutch assembly designs. Additionally, by providing the clutch assembly 1302 with one or more first and/or second biasing members 1458 and/or 1478 it aids in providing a clutch assembly 1302 where the second clutch member 1426 does not unintentionally engage the first clutch member 378. This aids in providing a clutch assembly 1302 having an increased overall functionality and reliability. Additionally, by providing the joint assembly 1300 with a clutch assembly 1302 as described and illustrated herein, the joint and/or clutch assemblies 1300 and/or 1302 are lighter, have a more compact packaging size, have fewer components, are less complex, are easier to assemble, are lighter, and are more cost efficient.

Figure 11:
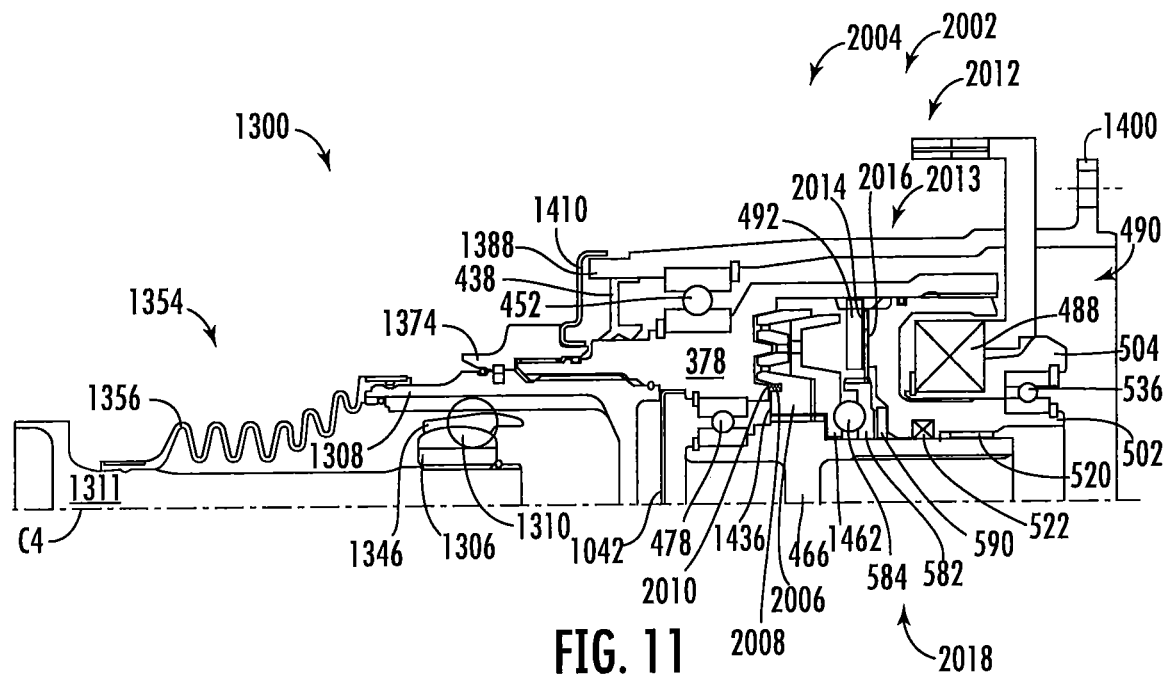
FIG. 11 is a cut-away schematic side-view of the joint assembly and the clutch assembly illustrated in FIGS. 3-10A according to still a further embodiment of the disclosure when the clutch assembly is in an engaged position.
Figure 11A:
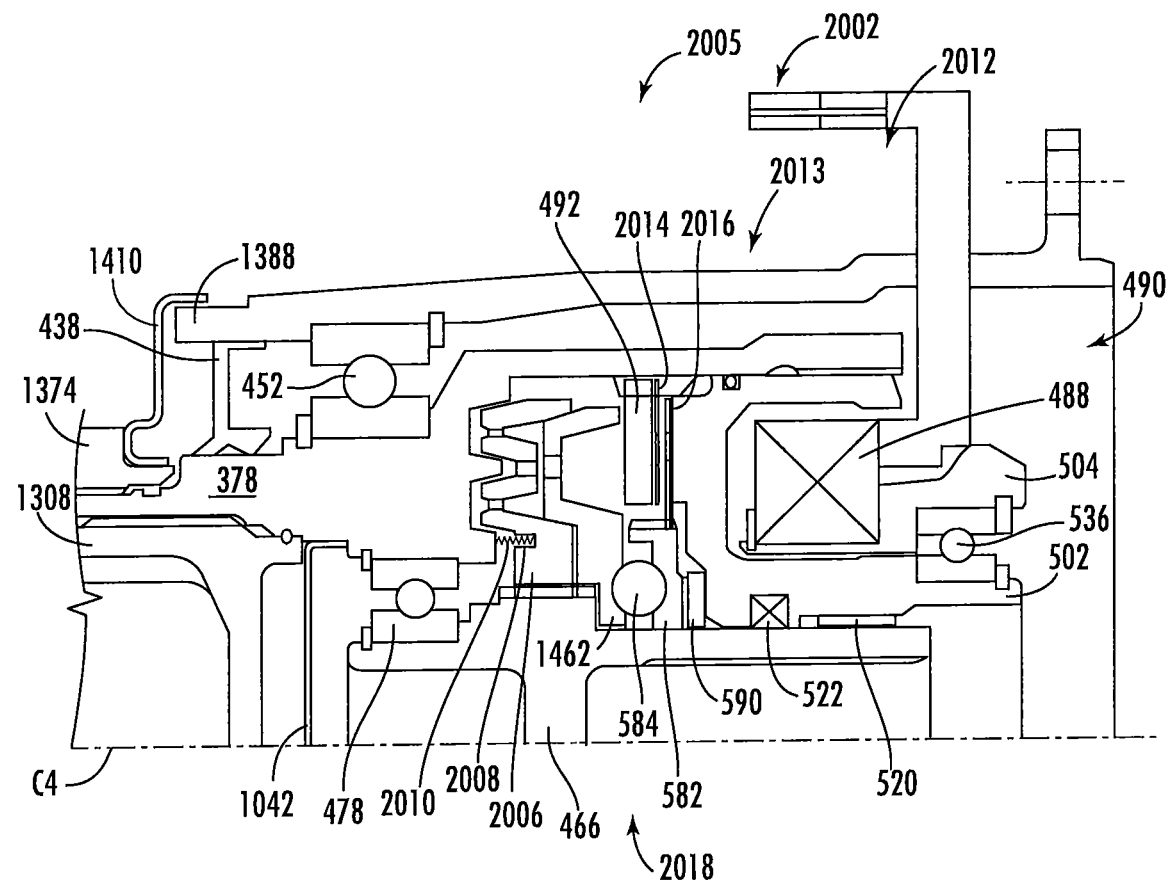
FIG. 11A is a cut-away schematic side-view of the joint assembly and the clutch assembly illustrated in FIG. 11 when the clutch assembly is in a disengaged position.

FIGS. 11 and 11A provide a cut-away schematic side-view of the joint assembly 1300 and a clutch assembly 2002 according to still a further embodiment of the disclosure when the clutch assembly 2002 is in an engaged position 2004 illustrated in FIG. 11 and a disengaged position 2005 illustrated in FIG. 11A. The joint assembly 1300 and the clutch assembly 2002 illustrated in FIGS. 11 and 11A are the same as the joint assemblies 300, 1000, 1100, and 1200 and the clutch assemblies 302, 702, 1002, 1202, and 1302 illustrated in FIGS. 3-10A, except where specifically noted below. As illustrated in FIGS. 11 and 11A of the disclosure and as a non-limiting example, the clutch assembly 2002 does not include the use of the second clutch member 1426, the second plate 1464, second engagement member 496, the one or more first biasing members 1458, and/or the one or more retention members 1460.

In accordance with the embodiment illustrated in FIGS. 11 and 11A and as a non-limiting example, the clutch assembly 2002 may include a second clutch member 2006. The second clutch member 2006 illustrated in FIGS. 11 and 11A is the same as the second clutch member 1426 described and illustrated in relation to FIGS. 10 and 10A, except where specifically noted below. The second clutch member 2006 may include one or more biasing member retention portions 2008 extending inward into the second clutch member 2006 from a first side 1436 of the second clutch member 2006. The one or more biasing member retention portions 2008 in the second clutch member 2006 may be of a size and shape to receive and/or retain at least a portion of one or more first biasing members 2010 therein. The one or more first biasing members 2010 may aid in transitioning the clutch assembly 2002 from the engaged position 2004 to the disengaged position 2005 illustrated in FIGS. 11 and 11A of the disclosure. When the clutch assembly 2002 is in the engaged position 2004, the one or more first biasing members 2010 may be compressed and loaded with an amount of energy therein. When an actuation assembly 2012 of the clutch assembly 2002 stops applying an amount of engagement force onto the second clutch member 2006, the energy stored within the one or more first biasing members 2010 may be released thereby forcing the second clutch member 2006 out of engagement with the first clutch member 378 and transitioning the clutch assembly 2002 into the disengaged position 2005. Additionally, it is to be understood that the one or more first biasing members 2010 may be used in order to aid in preventing the second clutch member 2006 from inadvertently and therefore unintentionally becoming engaged with the first joint member 378. It is within the scope of this disclosure and as a non-limiting example that the one or more first biasing members 2010 may be one or more springs, one or more coil springs, and/or one or more wave springs capable of transitioning the second clutch member 2006 out of engagement with the first clutch member 378.

As illustrated in FIGS. 11 and 11A of the disclosure and as a non-limiting example, the clutch assembly 2002 may include a ball and ramp assembly 2018. It is within the scope of this disclosure and as a non-limiting example that the ball and ramp assembly 2012 may include the first plate 1462, the second plate 582, and/or the one or more balls 584 interposed between the first and second plate 1462 and 582.

As best seen in FIG. 11 and as a non-limiting example, the actuation assembly 2012 may include a first clutch pack 2013 having one or more first friction plates 2014 and/or one or more second friction plates 2016. The one or more first and/or second friction plates 2014 and/or 2016 of the first clutch pack 2013 may be selectively engagable with each other, the armature 492, and/or the first portion 502 of the housing 490 allowing an amount of rotational power to be transferred between the second joint member 1308 and the second shaft 466. The one or more first friction plates 2014 may be spliningly engaged with at least a portion of the third plurality of splines 596 of the first clutch member 378. Additionally, the one or more second friction plates 2016 may be spliningly engaged with at least a portion of the plurality of splines 602 of the second plate 582 of the ball and ramp assembly 2018. When the clutch assembly 2002 is in the engaged position 2004, the one or more first friction plates 2014 may be frictionally engaged with the one or more second friction plates 2016 thereby allowing an amount of rotational power to be transferred through the ball and ramp assembly 2018 in order to drive the second clutch member 2006 into engagement with the first clutch member 378. When the clutch assembly 2002 is in the disengaged position 2005, the one or more first friction plates 2014 are not frictionally engaged with the one or more second friction plates 2016 thereby preventing an amount of rotational power to be transferred between the second joint member 1308 and the second shaft 466.

According to the embodiment illustrated in FIG. 11A and as a non-limiting example, when an amount of electrical power is provided to the electro-magnetic coil 488, a magnetic field is created drawing the armature 492 toward the one or more first friction plates 2014, the one or more second friction plates 2016, and/or the housing 490. As a result, the armature 492 aids in driving the one or more first friction plates 2014 into engagement with the one or more second friction plates 2016 thereby selectively transitioning the clutch assembly 2002 from the disengaged position 2005 to the engaged position 2004. This allows an amount of rotational power to be transmitted between the second clutch member 1308 and the second shaft 466. Once the amount of electrical power has been removed from the electro-magnetic coil 488, the armature 492 may be allowed to move away from the housing 490 thereby allowing the one or more first friction plates 2014 to become disengaged from the one or more second friction plates 2016. As a result, an amount of rotational power is unable to be transmitted between the second joint member 1308 and the second shaft 466 and the clutch assembly 2002 is allowed to selectively transition from the engaged position 2004 to the disengaged position 2005.

In accordance with an alternative embodiment of the disclosure (not shown) and as a non-limiting example, the actuation assembly 2012 may not include the use of the armature 492. According to this embodiment of the disclosure and as a non-limiting example, at least a portion of the one or more first friction plates 2014 and/or at least a portion of the one or more second friction plates 2016 may include or may be made of a magnetic material. As a result, when an amount of electrical power is provided to the electro-magnetic coil 488, the one or more first friction plates 2014 and the one or more second friction plates 2016 may be driven toward the housing 490 until the one or more first and second friction plates 2014 and 2016 become engaged with each other. It is therefore to be understood that the one or more first and/or second friction plates 2014 and/or 2016 may aid in allowing the clutch assembly 2002 to selectively transition from the disengaged position 2005 illustrated in FIG. 11A to the engaged position 2004 illustrated in FIG. 11. Once the one or more first and second friction plates 2014 and 2016 have become engaged with each other, an amount of rotational power may be transmitted between the second clutch member 1308 and the second shaft 466. Once the amount of electrical power has been removed from the electro-magnetic coil 488, one or more first and/or second friction plates 2014 and/or 2016 may be allowed to move away from the housing 490 thereby allowing the one or more first friction plates 2014 to become disengaged from the one or more second friction plates 2016. As a result, an amount of rotational power is unable to be transmitted between the second joint member 1308 and the second shaft 466 and the clutch assembly 2002 is allowed to selectively transition from the engaged position 2004 to the disengaged position 2005.

It is within the scope of this disclosure and as a non-limiting example that the amount of power transmitted to the electro-magnetic coil 488 may be varied in order to vary the amount of frictional engagement between the one or more first and second friction plates 2014 and 2016 thereby allowing a variable amount of rotational power to be transmitted between the second joint member 1308 and the second shaft 466. Additionally, it is within the scope of this disclosure and as a non-limiting example that the amount of power transmitted to the electro-magnetic coil 488 may be varied in order to vary the amount of frictional engagement between the first and second clutch members 378 and 1462 thereby allowing a variable amount of rotational power to be transmitted between the second joint member 1308 and the second shaft 466.

By providing the clutch assembly 2002 with an actuation assembly 2012 having one or more first and/or second friction plates 2014 and/or 2016 and a ball and ramp assembly 2018 having a first plate 1462 and a second plate 582 as described and illustrated herein, the amount of frictional engagement between the first clutch member 378 and the second clutch member 1426 is increased over conventional friction clutch assembly designs. Additionally, by providing the clutch assembly 2002 with one or more first biasing members 2010 it aids in providing a clutch assembly 2002 where the second clutch member 2006 does not unintentionally engage the first clutch member 378. This aids in providing a clutch assembly 2002 having an increased overall functionality and reliability. Additionally, by providing the joint assembly 1300 with a clutch assembly 2002 having an actuation assembly 2012 as described and illustrated herein, the joint and/or clutch assemblies 1300 and/or 2002 are lighter, have a more compact packaging size, have fewer components, are less complex, are easier to assemble, are lighter, and are more cost efficient.

Figure 12:
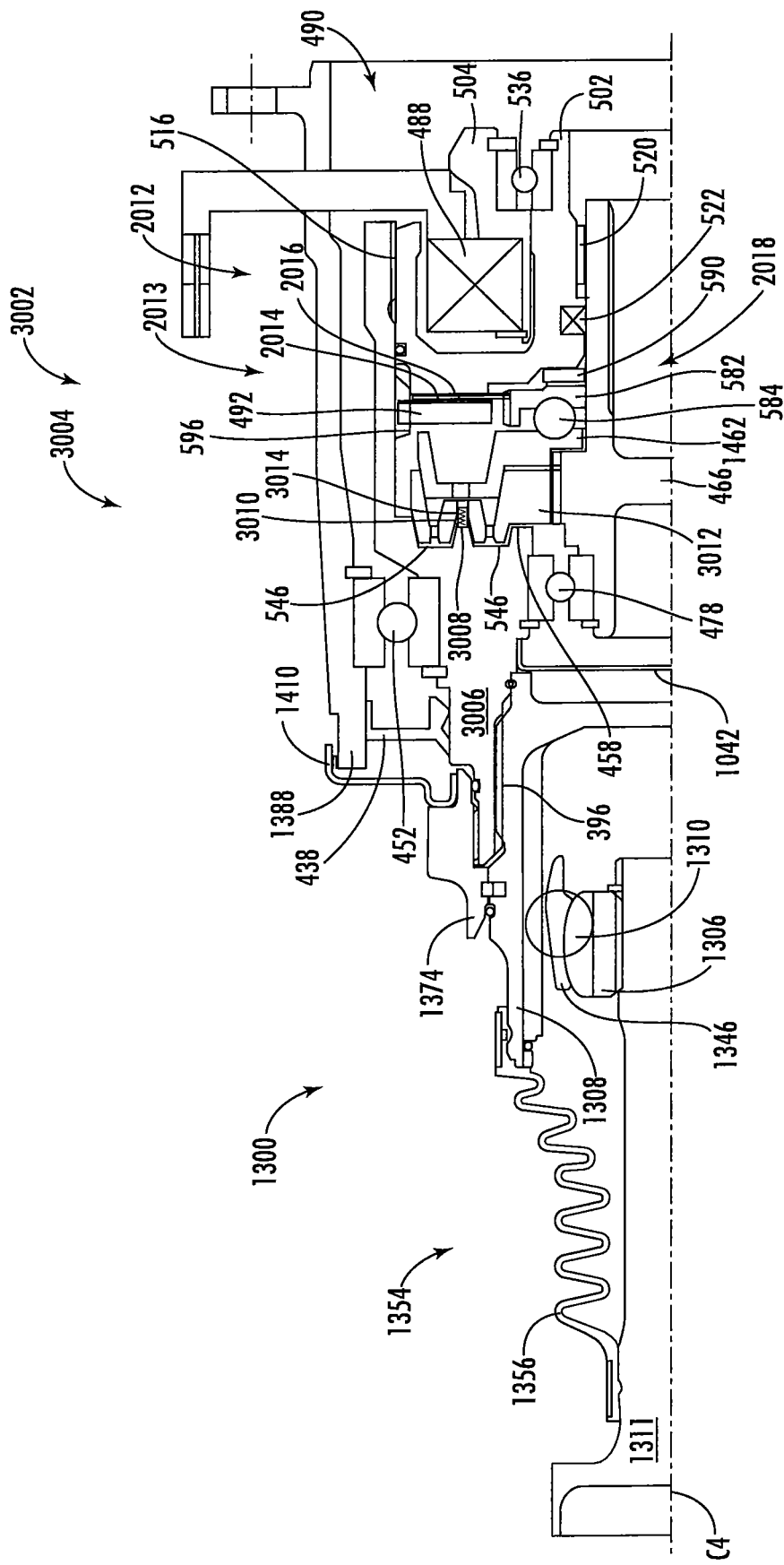
FIG. 12 is a cut-away schematic side-view of the joint assembly and the clutch assembly illustrated in FIGS. 3-11A according to still a further embodiment of the disclosure when the clutch assembly is in an engaged position.
Figure 12A:
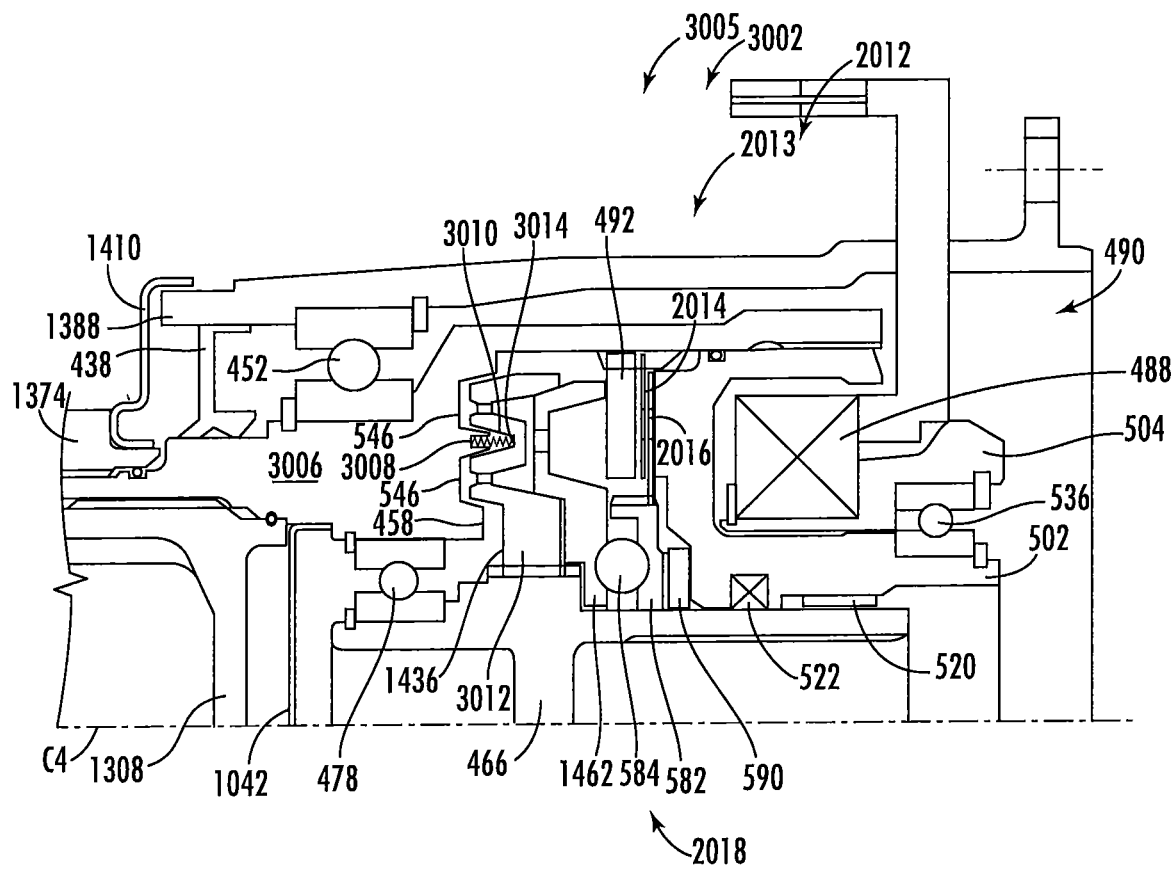
FIG. 12A is a cut-away schematic side-view of the joint assembly and the clutch assembly illustrated in FIG. 12 when the clutch assembly is in a disengaged position.

FIGS. 12 and 12A provide a cut-away schematic side-view of the joint assembly 1300 and a clutch assembly 3002 according to still a further embodiment of the disclosure when the clutch assembly 3002 is in an engaged position 3004 illustrated in FIG. 12 and a disengaged position 3005 illustrated in FIG. 12A. The joint assembly 1300 and the clutch assembly 3002 illustrated in FIGS. 12 and 12A are the same as the joint assemblies 300, 1000, 1100, and 1200 and the clutch assemblies 302, 702, 1002, 1202, 1302, and 2002 illustrated in FIGS. 3-11A, except where specifically noted below. As illustrated in FIGS. 12 and 12A of the disclosure and as a non-limiting example, the clutch assembly 3002 does not include the use of the first clutch member 378 and/or the second clutch member 2006 described and illustrated herein.

In accordance with the embodiment illustrated in FIGS. 12 and 12A and as a non-limiting example, the clutch assembly 3002 may include the use of a first clutch member 3006. The first clutch member 3006 illustrated in FIGS. 12 and 12A is the same as the first clutch member 378 described and illustrated herein, except the first clutch member 3006 may include one or more first clutch member biasing member retention portions 3008. As illustrated in FIGS. 12 and 12A and as a non-limiting example, the one or more first clutch member biasing member retention portions 3008 may extend inward into the first clutch member 3006 from the wall portion 458. The one or more first clutch member biasing member retention portions 3008 in the first clutch member 3006 may be of a size and shape to receive and/or retain at least a portion of an end of one or more first biasing members 3010 therein. It is within the scope of this disclosure and as a non-limiting example that the one or more first biasing members 3010 may be one or more springs, one or more coil springs, and/or one or more wave springs capable of transitioning the second clutch member 3012 out of engagement with the first clutch member 3006.

According to the embodiment illustrated in FIGS. 12 and 12A of the disclosure and as a non-limiting example, the clutch assembly 3002 may include a second clutch member 3012. The second clutch member 3012 illustrated in FIGS. 12 and 12A is the same as the second clutch member 1426 described and illustrated herein, except the second clutch member 3012 may include one or more second clutch member biasing member retention portions 3014. As illustrated in FIGS. 12 and 12A and as a non-limiting example, the one or more second clutch member biasing member retention portions 3014 may extend inward into the second clutch member 3012 from the first side 1436 of the second clutch member 3012. The one or more second clutch member biasing member retention portions 3014 in the second clutch member 3012 may be of a size and shape to receive and/or retain at least a portion of an end of one or more first biasing members 3010 opposite the first clutch member 3006 therein. The one or more first biasing members 3010 may aid in transitioning the clutch assembly 3002 from the engaged position 3004 to the disengaged position 3005 illustrated in FIGS. 11 and 11A of the disclosure. When the clutch assembly 3002 is in the engaged position 3004, the one or more first biasing members 3010 may be compressed and loaded with an amount of energy therein. When an actuation assembly 2012 of the clutch assembly 3002 stops applying an amount of engagement force onto the second clutch member 3012, the energy stored within the one or more first biasing members 3010 may be released thereby forcing the second clutch member 3012 out of engagement with the first clutch member 3006 and transitioning the clutch assembly 3002 into the disengaged position 3005. Additionally, it is to be understood that the one or more first biasing members 3010 may be used in order to aid in preventing the second clutch member 3012 from inadvertently and therefore unintentionally becoming engaged with the first joint member 3006.

By providing the clutch assembly 3002 with an actuation assembly 2012 having one or more first and/or second friction plates 2014 and/or 2016 and a ball and ramp assembly 2018 having a first plate 1462 and a second plate 582 as described and illustrated herein, the amount of frictional engagement between the first clutch member 3006 and the second clutch member 3012 is increased over conventional friction clutch assembly designs. Additionally, by providing the clutch assembly 3002 with one or more first biasing members 3010 it aids in providing a clutch assembly 3002 where the second clutch member 3012 does not unintentionally engage the first clutch member 3006. This aids in providing a clutch assembly 3002 having an increased overall functionality and reliability. Additionally, by providing the joint assembly 1300 with a clutch assembly 3002 having an actuation assembly 2012 as described and illustrated herein, the joint and/or clutch assemblies 1300 and/or 3002 are lighter, have a more compact packaging size, have fewer components, are less complex, are easier to assemble, are lighter, and are more cost efficient.

Figure 13:
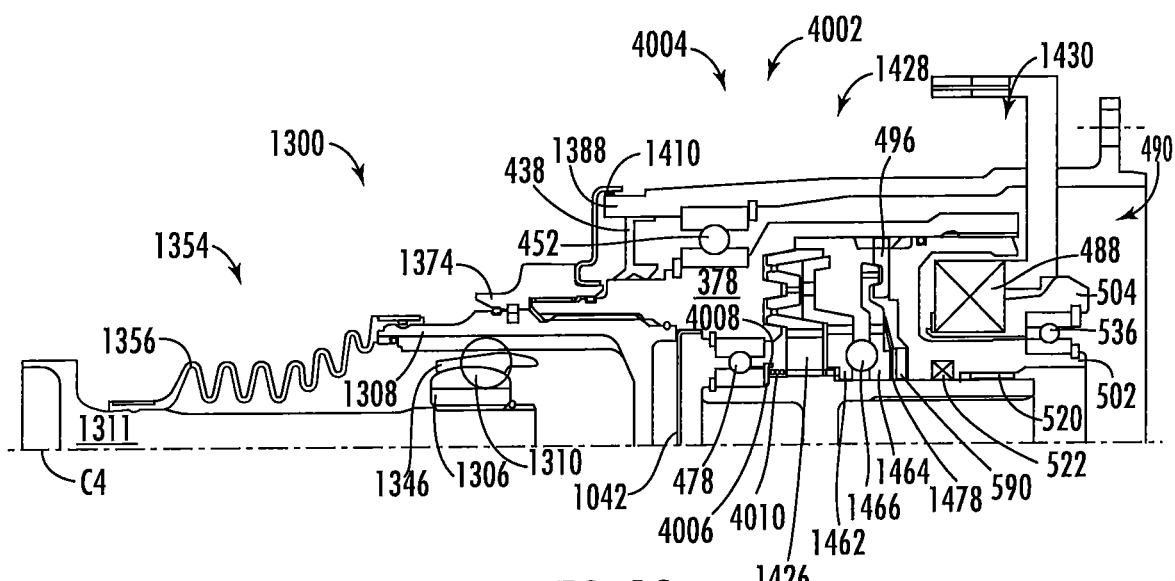
FIG. 13 is a cut-away schematic side-view of the joint assembly and the clutch assembly illustrated in FIGS. 3-12A according to still a further embodiment of the disclosure when the clutch assembly is in an engaged position.

FIG. 13 is a cut-away schematic side-view of the joint assembly 1300 and a clutch assembly 4002 according to still a further embodiment of the disclosure when the clutch assembly 4002 is in an engaged position 4004 illustrated in FIG. 12 and a disengaged position (not shown). The joint assembly 1300 and the clutch assembly 4002 illustrated in FIG. 12 are the same as the joint assemblies 300, 1000, 1100, and 1200 and the clutch assemblies 302, 702, 1002, 1202, 1302, 2002, and 302 illustrated in FIGS. 3-12A, except where specifically noted below. As illustrated in FIG. 13 of the disclosure and as a non-limiting example, the clutch assembly 4002 may include one or more retention members 4006 and/or one or more first biasing members 4010.

The one or more retention member 4006 illustrated in FIG. 13 may be the same as the retention member illustrated in FIGS. 10 and 10A of the disclosure, except where specifically noted below. In accordance with the embodiment illustrated in FIG. 13 and as a non-limiting example, the one or more retention members 4006 may include one or more retention member biasing member receiving portions 4008 therein. The one or more retention member biasing member receiving portions 4008 may be of a size and shape to receive and/or retain at least a portion of an end of the one or more first biasing members 4010 therein. This aids in ensuring that the one or more first biasing members 4010 do not come into contact with and interfere with the second bearing assembly 478 thereby improving the overall life, durability, and operability of the second bearing assembly 478 when in operation.

At least a portion of an end of the one or more first biasing members 1426, opposite the one or more retention members 4006, is in direct contact with at least a portion of the second clutch member 1426 of the clutch assembly 4002. The one or more first biasing members 4010 may aid in transitioning the clutch assembly 4002 from the engaged position 4004 illustrated in FIG. 13 to the disengaged position (not shown). When the clutch assembly 4002 is in the engaged position 4004, the one or more first biasing members 4010 may be compressed and loaded with an amount of energy therein. When an actuation assembly 1430 of the clutch assembly 4002 stops applying an amount of engagement force onto the second clutch member 1426, the energy stored within the one or more first biasing members 4010 may be released thereby forcing the second clutch member 1426 out of engagement with the first clutch member 378 and transitioning the clutch assembly 4002 into the disengaged position (not shown). Additionally, it is to be understood that the one or more first biasing members 4010 may be used in order to aid in preventing the second clutch member 1426 from inadvertently and therefore unintentionally becoming engaged with the first joint member 378. It is within the scope of this disclosure and as a non-limiting example that the one or more first biasing members 4010 may be one or more springs, one or more coil springs, and/or one or more wave springs capable of transitioning the second clutch member 1426 out of engagement with the first clutch member 378.

By providing the clutch assembly 4002 with an actuation assembly 1430 and a ball and ramp assembly 1428 having a first plate 1462 and a second plate 1464 as described and illustrated herein, the amount of frictional engagement between the first clutch member 378 and the second clutch member 1426 is increased over conventional friction clutch assembly designs. Additionally, by providing the clutch assembly 4002 with one or more first biasing members 4010 it aids in providing a clutch assembly 4002 where the second clutch member 1426 does not unintentionally engage the first clutch member 378. This aids in providing a clutch assembly 4002 having an increased overall functionality and reliability. Additionally, by providing the joint assembly 1300 with a clutch assembly 4002 having an actuation assembly 1430 as described and illustrated herein, the joint and/or clutch assemblies 1300 and/or 4002 are lighter, have a more compact packaging size, have fewer components, are less complex, are easier to assemble, are lighter, and are more cost efficient.

Figure 14:
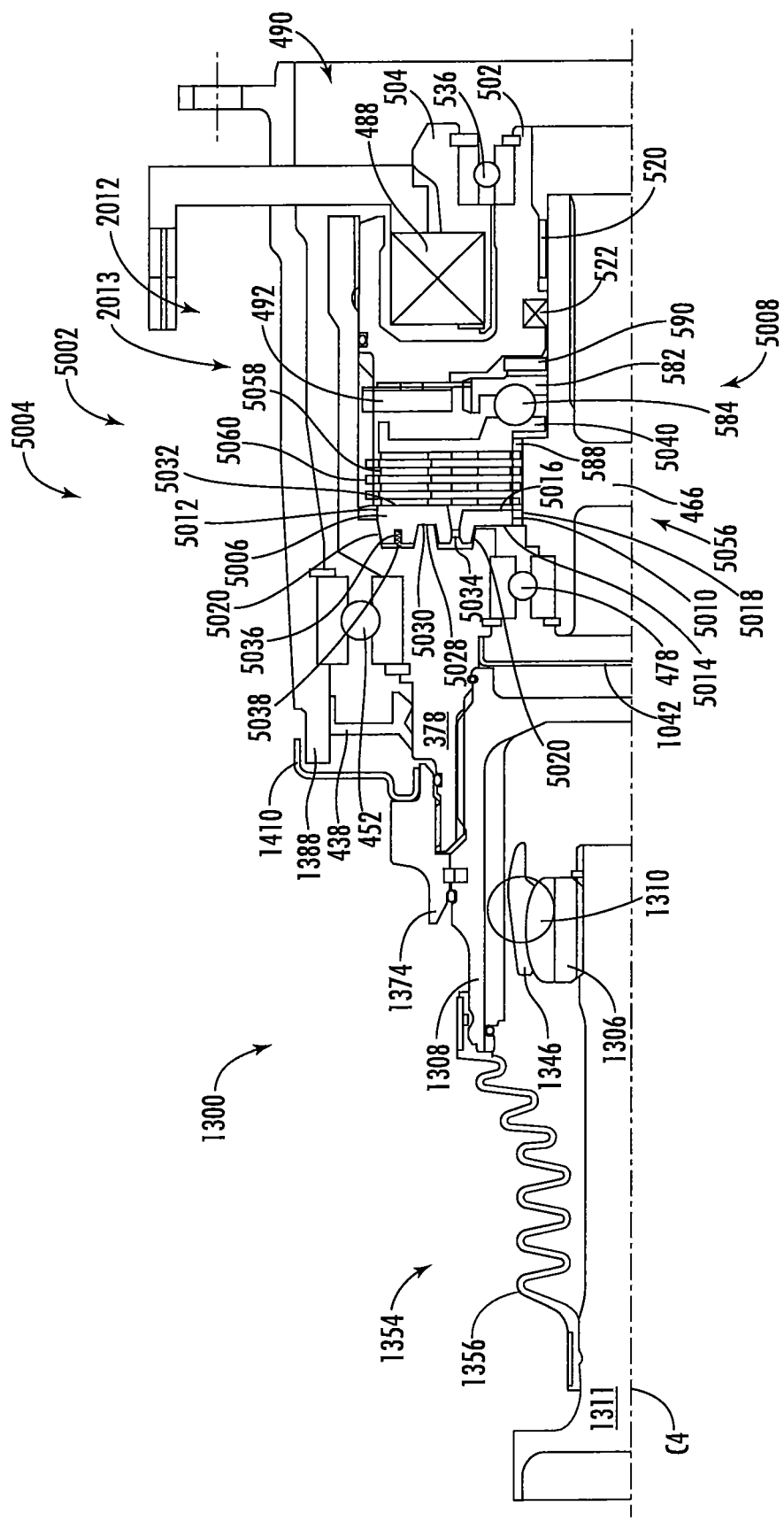
FIG. 14 is a cut-away schematic side-view of the joint assembly and the clutch assembly illustrated in FIGS. 3-13 according to still a further embodiment of the disclosure when the clutch assembly is in an engaged position.
Figure 14A:
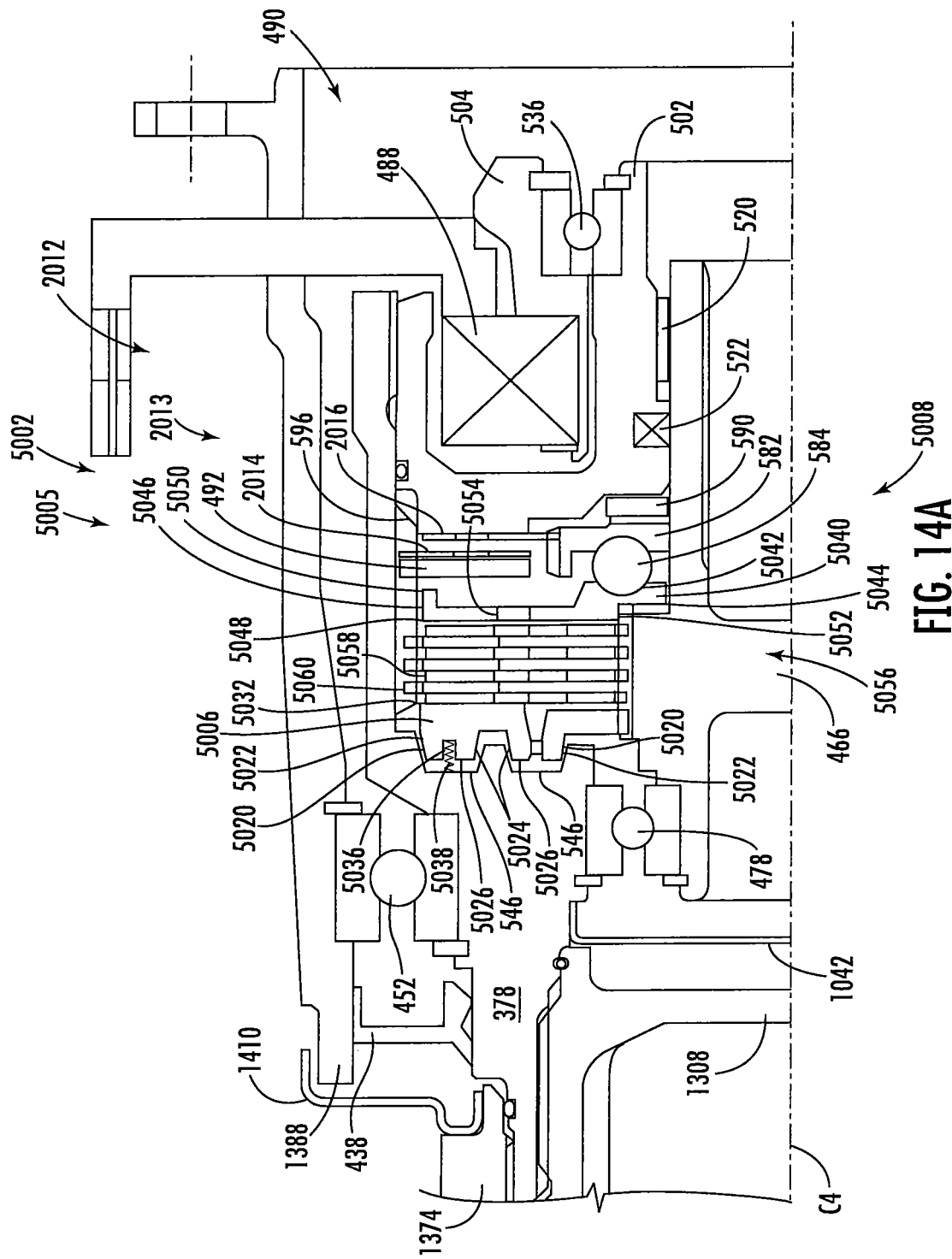
FIG. 14A is a cut-away schematic side-view of the joint assembly and the clutch assembly illustrated in FIG. 14 when the clutch assembly is in a disengaged position.

FIGS. 14 and 14A provide a cut-away schematic side-view of the joint assembly 1300 and a clutch assembly 5002 according to still a further embodiment of the disclosure when the clutch assembly 5002 is in an engaged position 5004 illustrated in FIG. 14 and a disengaged position 5005 illustrated in FIG. 14A. The joint assembly 1300 and the clutch assembly 3002 illustrated in FIGS. 12 and 12A are the same as the joint assemblies 300, 1000, 1100, and 1200 and the clutch assemblies 302, 702, 1002, 1202, 1302, and 202 illustrated in FIGS. 3-11A, except where specifically noted below. As illustrated in FIGS. 12 and 12A of the disclosure and as a non-limiting example, the clutch assembly 3002 does not include the use of the first clutch member 378 and/or the second clutch member 2006 described and illustrated herein.

In accordance with the embodiment illustrated in FIGS. 14 and 14A of the disclosure and as a non-limiting example, the clutch assembly 2012 may include the first clutch member 376, a second clutch member 5006, a ball and ramp assembly 5008, and the actuation assembly 2012. As best seen in FIG. 14 and as a non-limiting example, the second clutch member 5006 may have an inner surface 5010, an outer surface 5012, a first side 5014, and a second side 5016. Circumferentially extending along at least a portion of the inner surface 5010 of the second clutch member 5006 is a plurality of second clutch member splines 5018. The plurality of second clutch member splines 5018 may be complementary to and meshingly engaged with at least a portion of the plurality of second shaft splines 558 of the second shaft 466.

Extending outward from at least a portion of the first side 5014 of the second clutch member 5006 is 5036 5020. The one or more first engagement portions 5020 may be of a size and shape to be received and/or retained within at least a portion of the one or more receiving portions 546 in the wall portion 458 of the first clutch member 378. When the clutch assembly 5002 is in a disengaged position 5005 illustrated in FIG. 14A, the one or more first engagement portions 5020 of the second clutch member 5006 are not engaged with the one or more receiving portions 546 in the first clutch member 378. Additionally, when the clutch assembly 5002 is in an engaged position 5004 illustrated in FIG. 14, the one or more first engagement portions 5020 of the second clutch member 5006 are engaged with the one or more receiving portions 546 in the first clutch member 378.

According to the embodiment illustrated in FIG. 14A and as a non-limiting example, the one or more first engagement portions 5020 of the second clutch member 5006 may have one or more first sloped surfaces 5022 and/or one or more second sloped surfaces 5024 extending from the first side 5014 to an outboard surface 5026 of the one or more first engagement portions 5020. The one or more first and second sloped surfaces 5022 and 5024 of the second clutch member 5006 may be complementary to the one or more first and second sloped surfaces 548 and 549 of the first clutch member 378 of the joint assembly 5002. It is within the scope of this disclosure and as a non-limiting example that the outboard surface 5026, the one or more first sloped surfaces 5022, and/or the one or more second sloped surfaces 5024 of the one or more first engagement portions 5020 of the second clutch member 5006 may provide a reaction surface for at least a portion of the second clutch member 5006 thereby allowing the clutch assembly 5002 to selectively transition between the engaged and disengaged positions 5004 and 5005. In accordance with the embodiment illustrated in FIG. 14A and as a non-limiting example, the one or more first sloped surfaces 5022 may extend at the same angle θ13 relative to the centerline C4 and the one or more second sloped surfaces 5024 may extend at an angle θ14 relative to the centerline C4 of the clutch assembly 5002. As a non-limiting example, the one or more second sloped surfaces 5024 may be a mirror image of the one or more first sloped surfaced 5022 of the second clutch member 5006 of the clutch assembly 5002. It is within the scope of this disclosure and as a non-limiting example that the angles θ13 and θ14 of the one or more first and second sloped surfaces 5022 and 5024 may be substantially equal to each other and/or the angles θ13 and θ14 of the one or more first and second sloped surfaces 5022 and 5024 may be different from each other.

The one or more first and second sloped surfaces 5022 and 5024 may provide the second clutch member 5006 with one or more receiving portions 5028. As best seen in FIG. 14 of the disclosure and as a non-limiting example, the one or more receiving portions 5028 of the second clutch member 5006 may be of a size and shape to receive and/or retain at least a portion of the one or more outwardly extending portions 5030 of the first clutch member 378 therein. It is therefore within the scope of this disclosure and as a non-limiting example that the one or more receiving portions 5028 and/or the one or more outwardly extending portions 5030 may have a substantially conical cross-sectional shape and/or a substantially frusto-conical cross-sectional shape.

When the clutch assembly 5002 is in the disengaged position 5005 illustrated in FIG. 14A and as a non-limiting example, the one or more first sloped surfaces 5022, the one or more second sloped surfaces 5024 and/or the outboard surface 5026 of the one or more first engagement portions 5020 of the second clutch member 5006 are not engaged with the one or more first sloped surfaces 548, the one or more second sloped surfaces 549 and/or the bottom portion 550 of the one or more receiving portions 546 of the first clutch member 378. When the clutch assembly 5002 is in the engaged position 5004 illustrated in FIG. 14 and as a non-limiting example, at least a portion of the one or more first sloped surfaces 5022, the one or more second sloped surfaces 5024 and/or the outboard surface 5026 of the one or more first engagement portions 5020 of the second clutch member 5006 may be engaged with at least a portion of the one or more first sloped surfaces 548, the one or more second sloped surfaces 549 and/or the bottom portion 550 of the one or more receiving portions 546 of the first clutch member 378. As a non-limiting example, the engagement between the one or more receiving portions 546 of the first clutch member 378 and the one or more first engagement portions 5020 of the second clutch member 5006, when in the engaged position 5004, may be a locking engagement (i.e. a dog tooth like engagement) and/or a frictional engagement. It is therefore to be understood that the frictional engagement between the first and second clutch members 378 and 5006 may be enough to allow substantially all or a variable amount of rotational force to be transmitted between the first clutch member 1308 and the second shaft 466 or may be enough to allow substantially all or a variable amount of rotational force to be transmitted between the second shaft 466 and the second joint member 1308.

In light of the foregoing, it is within the scope of this disclosure and as a non-limiting example that the clutch assembly 5002 may be a dog clutch assembly, a friction clutch assembly or a wedge clutch assembly.

One or more second engagement portions 5032 may extend outward from at least a portion of the second side 5016 of the second clutch member 5006 of the clutch assembly 5002. As illustrated in FIGS. 14 and 14A and as a non-limiting example, the one or more second engagement portions 5032 extend away from the second side 5016 and/or the one or more first engagement portions 5020 of the second clutch member 5006 toward the actuation assembly 2012 of the clutch assembly 5002. The one or more second engagement portions 5032 allow the actuation assembly 2012 to apply an even amount of force onto the second clutch member 5006 when transitioning from the disengaged position 5005 to the engaged position 5004.

In accordance with the embodiment illustrated in FIGS. 14 and 14A of the disclosure and as a non-limiting example, at least a portion of the one or more second engagement portions 5032 of the second clutch member 5006 may include a substantially flat surface. This provides the second clutch member 5006 with a reaction surface allowing an amount of force to be transferred thereto in order to drive the second clutch member 5006 into engagement with the first clutch member 378.

It is within the scope of this disclosure and as a non-limiting example that the second clutch member 5006 may include the one or more slots 575 described and illustrated herein.

As best seen in FIG. 14 and as a non-limiting example, the second clutch member 5006 may include one or more second clutch member apertures 5034. The one or more second clutch member apertures 5034 may extend from a first side 5014 to a second side 5016 of the second clutch member 5006. In accordance with the embodiment illustrated in FIG. 14 and as a non-limiting example, the one or more second clutch member apertures 5034 may be disposed in the body portion, the one or more first engagement portions 5020, the one or more receiving portions 5028, and/or the one or more second engagement portions 5032 of the second clutch member 5006. The one or more apertures 5034 may be of a size and shape needed to allow an amount of fluid (not shown) to be transmitted therethrough. It is within the scope of this disclosure and as a non-limiting example that the fluid (not shown) may be a lubrication fluid and/or any other type of fluid that is capable of reducing the overall amount of heat generated by the engagement of the first and second clutch members 378 and 5006 when in the engaged position 5004. Additionally, it is within the scope of this disclosure and as a non-limiting example, that the fluid (not shown) may be a lubrication fluid and/or any other type of fluid that is capable of lubricating the various components of the joint assembly 1300 and/or the clutch assembly 5002 when in operation. Furthermore, it is within the scope of this disclosure and as a non-limiting example that the fluid (not shown) may be a lubrication fluid and/or any other type of fluid that is capable of removing an amount of wear particles from the joint assembly 1300 and/or the clutch assembly 5002 when in operation. This aids in increasing the overall life and durability of the joint assembly 1300 and/or the clutch assembly 5002.

According to the embodiment illustrated in FIGS. 14 and 14A of the disclosure and as a non-limiting example, the second clutch member 5006 may include one or more second clutch member biasing member retention portions 5036. The one or more second clutch member biasing member retention portions 5036 may extend inward into the second clutch member 5006 from the first side 5014 of the second clutch member 5006. The one or more second clutch member biasing member retention portions 5036 in the second clutch member 5006 may be of a size and shape to receive and/or retain at least a portion of an end of one or more first biasing members 5038 opposite the first clutch member 378 therein. As a result, the one or more first biasing members 5038 may aid in transitioning the clutch assembly 5002 from the engaged position 5004 to the disengaged position 5005 illustrated in FIGS. 14 and 14A of the disclosure. It is within the scope of this disclosure and as a non-limiting example that the one or more second clutch member biasing member retention portions 5036 may be disposed in the first side 5014, the one or more first engagement portions 5020, and/or the one or more receiving portions 5028 of the second clutch member 5006. Additionally, it is within the scope of this disclosure and as a non-limiting example that the one or more biasing members 5038 may be one or more springs, one or more coil springs, and/or one or more wave springs capable of transitioning the second clutch member 5006 out of engagement with the first clutch member 378.

When the clutch assembly 5002 is in the engaged position 5004, the one or more first biasing members 5038 may be compressed and loaded with an amount of energy therein. When an actuation assembly 2012 of the clutch assembly 5002 stops applying an amount of engagement force onto the second clutch member 5006, the energy stored within the one or more first biasing members 5038 may be released thereby forcing the second clutch member 5006 out of engagement with the first clutch member 378 and transitioning the clutch assembly 5002 into the disengaged position 5005. Additionally, it is to be understood that the one or more first biasing members 5038 may be used in order to aid in preventing the second clutch member 5006 from inadvertently and therefore unintentionally becoming engaged with the first joint member 378.

In accordance with the embodiment illustrated in FIG. 14A and as a non-limiting example, at least a portion of the ball and ramp assembly 5008 may be interposed between the second clutch member 5006 and the housing 490 of the actuation assembly 2012. As best seen in FIG. 14A of the disclosure and as a non-limiting example, the ball and ramp assembly 5008 may include a first plate 5040, a second member 582, and/or one or more balls 584 interposed between the first and second plates 5040 and 582. The first plate 5040 may have an inner surface 5044, an outer surface 5046, a first side 5048, and a second side 5050. Extending outward from at least a portion of the first side 5044 of the first plate 5040, toward the second clutch member 5006, is one or more first plate engagement portions 5052. The one or more first plate engagement portions 5052 provide the first plate 5044 with a reaction surface and/or an engagement surface that aids in transitioning the clutch assembly 5002 from the disengaged position 5005 to the engaged position 5004.

The first plate 5040 may have one or more first plate grooves 5042 having a variable depth. The one or more first plate grooves 5042 may be complementary to the one or more second plate grooves 588 in the second plate 584 of the ball and ramp assembly 5008. At least a portion of the one or more balls 584 may be disposed within at least a portion of the one or more first and second plate grooves 5042 and 588 in the first and second plates 5040 and 582 of the ball and ramp assembly 5008. As the first and/or second plate 5040 and/or 582 rotate, the one or more balls 584 travel along the one or more first plate grooves 5042 and 588 forcing the first plate 5040 axially away from the second plate 584 of the ball and ramp assembly 5008 and toward the second clutch member 5006 of the clutch assembly 5002.

One or more first plate apertures 5054 may extend from the first side 5048 to the second side 5050 of the first plate 5040. As illustrated in FIG. 14A and as a non-limiting example, the one or more first plate apertures 5054 may be disposed in the body portion and/or the one or more first plate engagement portions 5052 of the first plate 5040 of the ball and ramp assembly 5008. The one or more first plate apertures 5054 may be of a size and shape needed to allow an amount of fluid (not shown) to be transmitted therethrough. It is within the scope of this disclosure and as a non-limiting example that the fluid (not shown) may be a lubrication fluid and/or any other type of fluid that is capable of reducing the overall amount of heat generated by the engagement of the first plate 5040 when in the engaged position 5004. Additionally, it is within the scope of this disclosure and as a non-limiting example, that the fluid (not shown) may be a lubrication fluid and/or any other type of fluid that is capable of lubricating the various components of the joint assembly 1300, the ball and ramp assembly 5008, and/or the clutch assembly 5002 when in operation. Furthermore, it is within the scope of this disclosure and as a non-limiting example that the fluid (not shown) may be a lubrication fluid and/or any other type of fluid that is capable of removing an amount of wear particles from the joint assembly 1300, the clutch assembly 5002, the ball and ramp assembly 5008, and/or the actuation assembly 2012 when in operation. This aids in increasing the overall life and durability of the joint assembly 1300, the clutch assembly 5002, the ball and ramp assembly 5008, and/or the actuation assembly 2012.

As best seen in FIG. 14A of the disclosure and as a non-limiting example, the actuation assembly 2012 of the clutch assembly 5002 may include a second clutch pack 5056 having one or more first friction plates 5058 and/or one or more second friction plates 5060. The one or more first and/or second friction plates 5058 and/or 5060 of the second clutch pack 5056 may be selectively engagable with each other, the second clutch member 5006, and/or the first plate 5040 allowing an amount of rotational power to be transferred between the second joint member 1308 and the second shaft 466. The one or more second friction plates 5060 may be spliningly engaged with at least a portion of the third plurality of splines 596 of the first clutch member 378. Additionally, the one or more first friction plates 5058 may be spliningly engaged with at least a portion of the plurality of second shaft splines 558 of the second shaft 466.

When the clutch assembly 5002 is in the engaged position 5004, the first plate 5040 of the ball and ramp assembly 5008 may be driven toward the one or more first and/or second friction plates 5058 and/or 5060 until at least a portion of the first plate 5040 is in direct contact with at least a portion of the one or more first and/or second friction plates 5058 and/or 5060 of the second clutch pack 5056. Once the one or more first and/or second friction plates 5058 and/or 5060 are frictionally engaged with at least a portion of the first plate 5040 of the ball and ramp assembly 5008 and/or the second clutch member 5002 of the clutch assembly 5002, an amount of rotational power may be transferred between the second joint member 1308 and the second shaft 466. It is within the scope of this disclosure and as a non-limiting example that an amount of force from the ball and ramp assembly 5008 may be transmitted from the through the second clutch pack 5056 in order to drive the second clutch member 5006 into engagement with the first clutch member 378 of the clutch assembly 5002. As a result, it is therefore to be understood that the second clutch pack 5056 may be used in order to aid in transitioning the clutch assembly 5002 from the disengaged position 5005 illustrated in FIG. 14A to the engaged position 5004 illustrated in FIG. 14.

When the clutch assembly 5002 is in the disengaged position 5005, the actuation assembly 2012 stops applying an amount of force onto the second clutch pack 5056 and/or the second clutch member 5006 thereby allowing the clutch assembly 5002 to transition from the engaged position 5004 to the disengaged position 5005. As a result, when in the disengaged position 505, the one or more first friction plates 5058 are not frictionally engaged with the one or more second friction plates 5060 preventing an amount of rotational power from being transferred between the second joint member 1308 and the second shaft 466.

It is within the scope of this disclosure and as a non-limiting example that the amount of force transmitted from the actuation assembly 2012 to the second clutch pack 5056 may be varied in order to vary the amount of frictional engagement between the one or more first and/or second friction plates 5058 and/or 5060 of the second clutch pack 5056. As a result, it is therefore within the scope of this disclosure and as a non-limiting example that the varied amount of force transmitted from the actuation assembly 2012 to the second clutch pack 5056 may allow all or a variable amount of rotational power to be transmitted between the second joint member 1308 and the second shaft 466.

By providing the clutch assembly 5002 with an actuation assembly 2012, a ball and ramp assembly 5008, a first clutch pack 2013, a second clutch pack 5056, and/or one or more first biasing members 5033, the amount of frictional engagement between the first clutch member 378 and the second clutch member 5006 is increased over conventional friction clutch assembly designs. Additionally, by providing the clutch assembly 5002 with an actuation assembly 2012, a ball and ramp assembly 5008, a first clutch pack 2013, a second clutch pack 5056, and/or one or more first biasing members 5033 it aids in providing a clutch assembly 5002 where the second clutch member 5006 does not unintentionally engage the first clutch member 378 when in operation thereby providing a clutch assembly 5002 with an increased overall functionality and reliability. Furthermore, by providing the joint assembly 1300 with a clutch assembly 5002 as described and illustrated herein, the joint and/or clutch assemblies 1300 and/or 5002 are lighter, have a more compact packaging size, have fewer components, are less complex, are easier to assemble, are lighter, and are more cost efficient.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:
1. A clutch assembly, comprising:
a joint assembly comprising a first joint member drivingly connected to a second joint member by one or more third joint members;
a first shaft drivingly connected to said first joint member;

a first clutch member, wherein said first clutch member is integrally formed as part of said second joint member of said joint assembly;

a second clutch member that is selectively engagable with said first clutch member;

a second shaft drivingly connected to said second clutch member;

an actuation assembly operably configured to selectively transition said clutch assembly between a disengaged position and an engaged position;

a ball and ramp assembly having a first plate, a second plate, and one or more balls interposed between said first plate and said second plate;

wherein said first plate of said ball and ramp assembly is operably configured in order to transmit an amount of force onto said second clutch member thereby transitioning said clutch assembly from a disengaged position to an engaged position; and wherein said actuation assembly utilizes an amount of rotational force transmitted from said first shaft or said second shaft in order to transition said second clutch member into engagement with said first clutch member.

2. The clutch assembly of claim 1, wherein said joint assembly is a constant velocity joint assembly, a CV joint assembly, a homokinetic joint assembly, a universal joint assembly, a U-joint, a Cardan joint assembly, a Spicer joint assembly or a Hooke's joint assembly.

3. The clutch assembly of claim 1, further comprising a housing having a first end portion, a second end portion, an inner surface and an outer surface defining a hollow portion therein;

wherein at least a portion of said joint assembly, said clutch assembly and/or said actuation assembly is disposed within at least a portion of said hollow portion of said housing.

4. The clutch assembly of claim 3, wherein said inner surface of said housing has one or more housing grooves therein to receive an amount of lubricating fluid therein.

5. The clutch assembly of claim 1, wherein said first clutch member has a wall portion;

wherein at least a portion of a first side of said wall portion of said first clutch member provides a reaction surface for at least a portion of said second clutch member;

wherein with said at least a portion of said second clutch member is engaged with at least a portion of said first side of said wall portion of said first clutch member said clutch assembly is in said engaged position; and wherein when said at least a portion of said second clutch member is not engaged with said at least a portion of said first side of said wall portion of said first clutch member said clutch assembly is in said disengaged position.

6. The clutch assembly of claim 1, wherein one or more receiving portions extend inward into said first clutch member from at least a portion of a first side of a wall portion of said first clutch member;

wherein said one or more receiving portions in said wall portion of said first clutch member are of a size and shape to receive and/or retain at least a portion of one or more first engagement portions extending outward from at least a portion of a first side of an increased diameter portion of said second clutch member;

wherein when said at least a portion of said one or more first engagement portions of said second clutch member are engaged with at least a portion of said one or more receiving portions of said first clutch member said clutch assembly is in said engaged position; and wherein when said one or more first engagement portions of said second clutch member are not engaged with said one or more receiving portions of said first clutch member, said clutch assembly is in said disengaged position.

7. The clutch assembly of claim 6, wherein said one or more receiving portions in said wall portion of said first clutch member have one or more first sloped surfaces and/or one or more second sloped surfaces terminating in a bottom portion;

wherein said one or more first engagement portions of said second clutch member have one or more first sloped surfaces and/or one or more second sloped surfaces terminating in an outboard surface; and wherein at least a portion of said one or more first sloped surfaces, said one or more second sloped surfaces and/or said outboard surface of said second clutch member are selectively engagable with at least a portion of said one or more first sloped surfaces, said one or more second sloped surfaces and/or said bottom portion of said first clutch member.

8. The clutch assembly of claim 1, wherein said second clutch member further comprises one or more slots extending from an outermost surface of said second clutch member toward an inner surface of said second clutch member; and wherein said one or more slots in said second clutch member allow at least a portion of said second clutch member to be elastically deformed when said clutch assembly is in said engaged position.

9. The clutch assembly of claim 1, further comprising one or more first biasing members; and wherein said one or more first biasing members aid in transitioning said clutch assembly between said engaged position and said disengaged position by driving said second clutch member into or out of engagement with said first clutch member.

10. The clutch assembly of claim 1, further comprising one or more coatings; and wherein said one or more coatings are disposed on at least a portion of one or more components of said clutch assembly and/or one or more components of said actuation assembly.

11. The clutch assembly of claim 10, wherein said one or more coatings are heat resistant and/or have a high coefficient of dynamic friction.

12. The clutch assembly of claim 1, further comprising one or more second biasing members; and wherein said one or more second biasing members aid in transitioning said clutch assembly between said engaged position and said disengaged position.

13. The clutch assembly of claim 1, wherein said actuation assembly further comprises an electro-magnetic coil, a first engagement member and a second engagement member;

wherein an inner surface of said first engagement member is operably configured in order to rotate said second plate of said ball and ramp assembly when a first engagement portion of said first engagement member is engaged with a second engagement portion of said second engagement member of said actuation assembly; and wherein said electro-magnetic coil is operably configured in order to selectively engage said first engagement portion with said second engagement portion.

14. The clutch assembly of claim 13, wherein said first engagement member is integrally formed as part of said second plate of said ball and ramp assembly.

15. The clutch assembly of claim 13, wherein said second engagement member is integrally formed as part of a housing of said electro-magnetic coil.

16. The clutch assembly of claim 13, wherein said actuation assembly further comprises an armature; and
  wherein said electro-magnetic coil is operably configured to drive said armature toward said first engagement member and selectively engage said first engagement portion with said second engagement portion thereby selectively transitioning said clutch assembly between said disengaged position and said engaged position.

17. The clutch assembly of claim 1, wherein said actuation assembly further comprises one or more first friction plates, one or more second friction plates, and/or an armature;
  wherein said one or more first friction plates and/or said one or more second friction plates form a first clutch pack; and
  wherein said one or more first friction plates, said one or more second friction plates, and/or said armature are selectively engagable with each other in order to selectively transition said clutch assembly between said engaged position and said disengaged position.

18. The clutch assembly of claim 1, wherein said actuation assembly further comprises one or more first friction plates and/or one or more second friction plates;
  wherein said one or more first friction plates and/or said one or more second friction plates form a second clutch pack;
  wherein said second clutch pack is interposed between said ball and ramp assembly and said second clutch member; and
  wherein said one or more first friction plates, said one or more second friction plates, and/or said ball and ramp assembly are selectively engagable with each other in order to selectively transition said clutch assembly between said engaged position and said disengaged position.

* * * * *

UNITED STATES PATENT AND TRADEMARK OFFICE
CERTIFICATE OF CORRECTION

| | |
|---|---|
| PATENT NO. | : 11,428,277 B2 |
| APPLICATION NO. | : 16/677739 |
| DATED | : August 30, 2022 |
| INVENTOR(S) | : Seung Tark Oh |

It is certified that error appears in the above-identified patent and that said Letters Patent is hereby corrected as shown below:

In the Claims

Column 75, Lines 39-52 Claim 5 should read:
The clutch assembly of claim 1, wherein said first clutch member has a wall portion;
wherein at least a portion of a first side of said wall portion of said first clutch member provides a reaction surface for at least a portion of said second clutch member;
wherein when said at least a portion of said second clutch member is engaged with said at least a portion of said first side of said wall portion of said first clutch member said clutch assembly is in said engaged position; and
wherein when said at least a portion of said second clutch member is not engaged with said at least a portion of said first side of said wall portion of said first clutch member said clutch assembly is in said disengaged position.

Signed and Sealed this
Twentieth Day of December, 2022

Katherine Kelly Vidal
*Director of the United States Patent and Trademark Office*